United States Patent
Nohdomi

(10) Patent No.: US 8,934,137 B2
(45) Date of Patent: *Jan. 13, 2015

(54) PRINTING DEVICE AND METHOD OF CONTROLLING PRINTING DEVICE

(75) Inventor: Shinya Nohdomi, Kanagawa (JP)

(73) Assignee: Ricoh Company, Limited, Tokyo (JP)

(*) Notice: Subject to any disclaimer, the term of this patent is extended or adjusted under 35 U.S.C. 154(b) by 298 days.

This patent is subject to a terminal disclaimer.

(21) Appl. No.: 13/233,704

(22) Filed: Sep. 15, 2011

(65) Prior Publication Data

US 2012/0069363 A1 Mar. 22, 2012

(30) Foreign Application Priority Data

Sep. 16, 2010 (JP) .................................. 2010-208549
Aug. 22, 2011 (JP) .................................. 2011-181001

(51) Int. Cl.
*H04N 1/60* (2006.01)
*H04N 1/327* (2006.01)
*H04N 1/00* (2006.01)
*H04N 1/23* (2006.01)
*H04N 1/32* (2006.01)
*H04N 1/40* (2006.01)

(52) U.S. Cl.
CPC ....... *H04N 1/32793* (2013.01); *H04N 1/00567* (2013.01); *H04N 1/2346* (2013.01); *H04N 1/32363* (2013.01); *H04N 1/32771* (2013.01); *H04N 1/40* (2013.01); *H04N 2201/0082* (2013.01); *H04N 2201/3288* (2013.01)
USPC ........................... 358/1.9; 358/1.15; 358/1.16

(58) Field of Classification Search
USPC .......... 358/1.4, 1.5, 1.9, 1.15, 1.16, 1.17, 2.1, 358/448, 498
See application file for complete search history.

(56) References Cited

U.S. PATENT DOCUMENTS

| | | | |
|---|---|---|---|
| 6,179,409 B1* | 1/2001 | Takahashi | 358/448 |
| 7,463,370 B2* | 12/2008 | Yada et al. | 358/1.1 |
| 2005/0099660 A1* | 5/2005 | Yada et al. | 358/498 |
| 2006/0023231 A1* | 2/2006 | Ohmiya | 358/1.7 |
| 2012/0069362 A1* | 3/2012 | Konno | 358/1.9 |

FOREIGN PATENT DOCUMENTS

| | | |
|---|---|---|
| JP | 2002-254736 | 9/2002 |
| JP | 2002-254763 | 9/2002 |
| JP | 4123993 | 5/2008 |

* cited by examiner

*Primary Examiner* — Kimberly A Williams
(74) *Attorney, Agent, or Firm* — Oblon, Spivak, McClelland, Maier & Neustadt, L.L.P.

(57) ABSTRACT

A printing device includes at least one station and a transmission control unit. The station includes a printing unit that prints image data of a plurality of colors generated by an upper level device on a printing medium, and a plurality of holding units that receive and hold the image data of the plurality of colors transmitted from the upper level device through a plurality of first transmission paths respectively corresponding to the image data of the plurality of colors. The transmission control unit controls the plurality of holding units to receive printing information from the upper level device through a second transmission path, and controls, on the basis of the printing information, the plurality of holding units to respectively receive and hold the image data of the plurality of colors transmitted from the upper level device.

7 Claims, 36 Drawing Sheets

(TO IMAGE OUTPUT UNIT)

FIG.9

| No | CLASSIFICATION | NAME | DIRECTION (DFE⇔PCTL) | CONTENTS |
|---|---|---|---|---|
| 1 | JOB INFORMATION | JOB START | ⇔ | ·NOTIFICATION OF JOB START/RESPONSE<br>·JOB IDENTIFIER (JOBID) COMMUNICATION |
| 2 | | JOB END | ⇔ | ·NOTIFICATION OF END OF FULL PRINTING PROCESS REQUESTED IN CORRESPONDING JOB/RESPONSE<br>·JOB IDENTIFIER (JOBID) COMMUNICATION |
| 3 | PRINTER STATE/ PRINTING PROCESS | PRINTING PROCESS RECEPTION START | ← | ·NOTIFICATION THAT PRINTER CAN RECEIVE PRINTING PROCESS |
| 4 | | PRINTER INFORMATION REQUEST/ NOTIFICATION | ⇔ | ·NECESSARY PRINTER INFORMATION REQUEST/NOTIFICATION |
| 5 | | PRINTING PROCESS START | ⇔ | ·NOTIFICATION THAT IMAGE DATA IS PREPARED/RESPONSE<br>·OUTPUT ORDER, PAGE (PROCESS) UNIT |
| 6 | | PRINTING PROCESS REQUEST | ⇔ | ·PRINTING PROCESS REQUEST FROM PRINTER CONTROLLER/RESPONSE<br>·REQUEST IN ORDER OF COLOR, PROCESS IDENTIFICATION NUMBER, PLANE IDENTIFICATION NUMBER, PLANE UNIT, ENGINE REQUEST<br>*BITMAP IS TAKEN FROM ENGINE |
| 7 | | DATA TRANSMISSION COMPLETION | → | ·NOTIFICATION OF TRANSMISSION COMPLETION FOR REQUESTED PLANE |
| 8 | | DATA RECEPTION COMPLETION | ← | ·NOTIFICATION OF RECEPTION COMPLENTION FOR REQUESTED PLANE |
| 9 | | PRINTING PROCESS COMPLETION | → | ·COMPLETION OF REQUEST FOR FULL-PAGE (PROCESS) PRINTING |
| 10 | | PROCESS STATE REPORT | ← | NOTIFICATION OF PROCESS-PRINTING STATE<br>·SHEET FEEDING<br>·SHEET DISCHARGE<br>·PRINTING START |
| 11 | | SC NOTIFICATION ERROR OCCURRENCE/ RELEASE | ⇔<br>→ | ·ACQUISITION/NOTIFICATION OF PRINTER FAILURE INFORMATION<br>·NOTIFICATION OF OCCURENCE/RELEASE OF FAILURE OF UPPER LEVEL DEVICE |
| 12 | PRINTING CONDITION | PRINTING CONDITION SETTING | ⇔ | NOTIFICATION/RESPONSE OF PRINTING CONDITION<br>·PRINTING FORM (DUPLEX/SINGLE)<br>·PRINTING TYPE (DATA/BLANK PAGE)<br>·SHEET FEED/DISCHARGE INFORMATION (SHEET FEED SOURCE, SHEET DISCHARGE DESTINATION)<br>·PRINTING SURFACE ORDER (SURFACE→REAR/REAR→SURFACE)<br>·PRINTING SHEET SIZE<br>·PRINT DATA SIZE<br>·RESOLUTION, GRADATION<br>·COLOR INFORMATION AND THE LIKE |
| 13 | CONNECTION | REGISTRATION /RELEASE | ⇔ | ·MUTUAL REGISTRATION AND RELEASE OF UPPER LEVEL DEVICE AND PRINTER CONTROLLER |

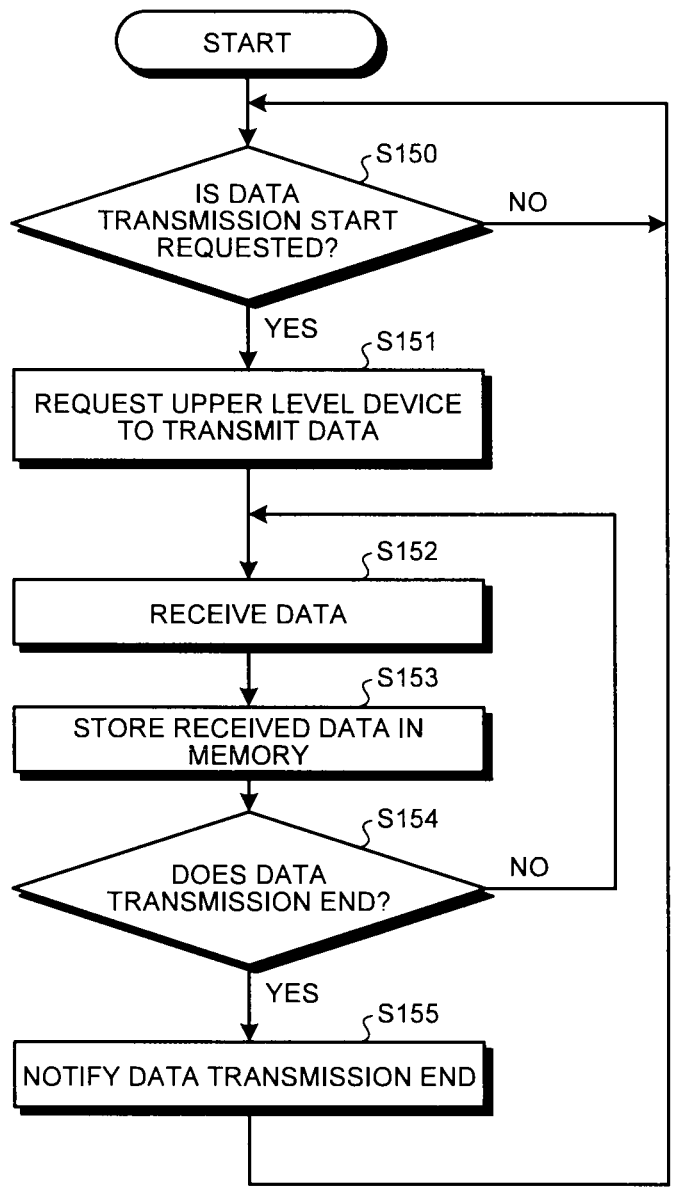

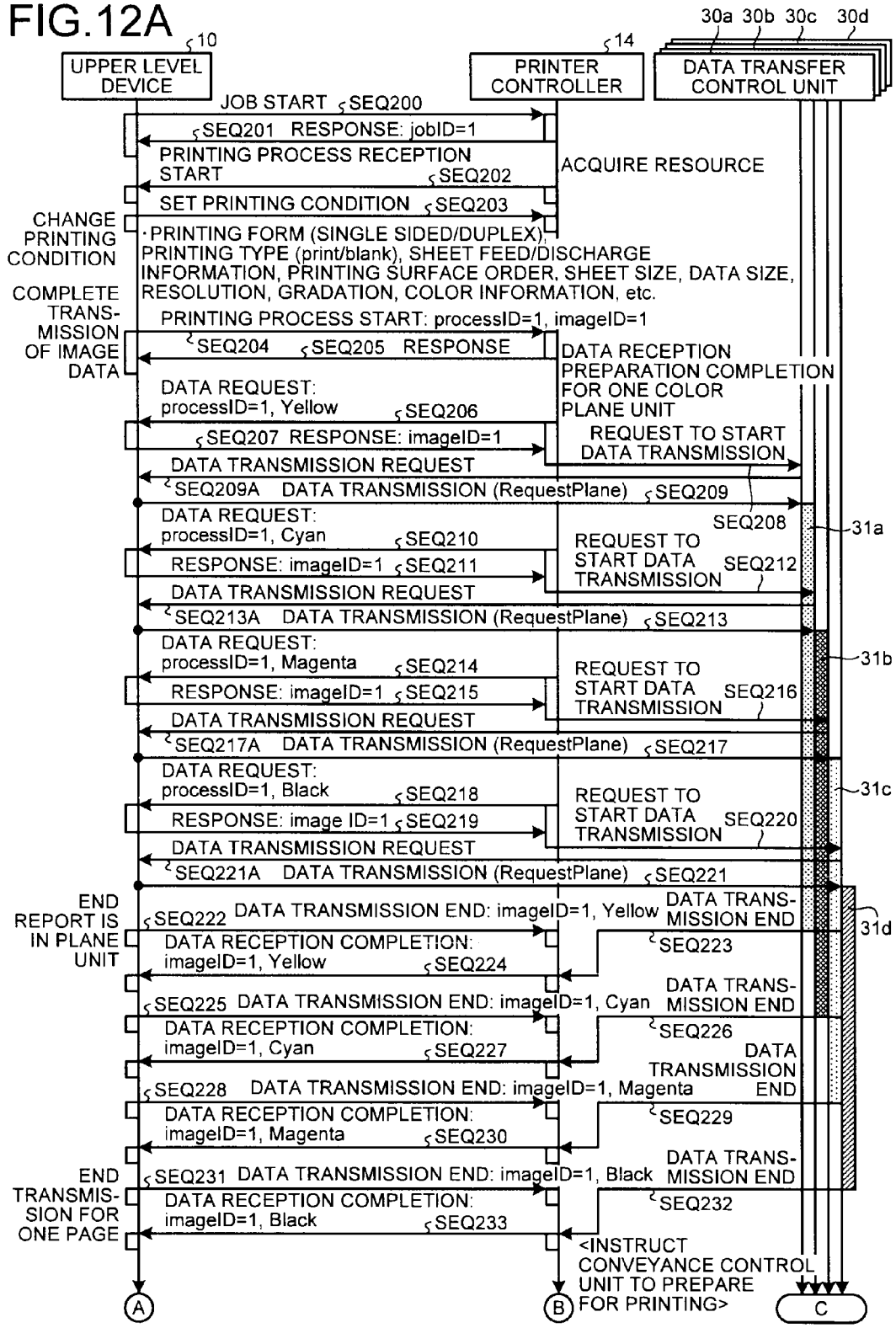

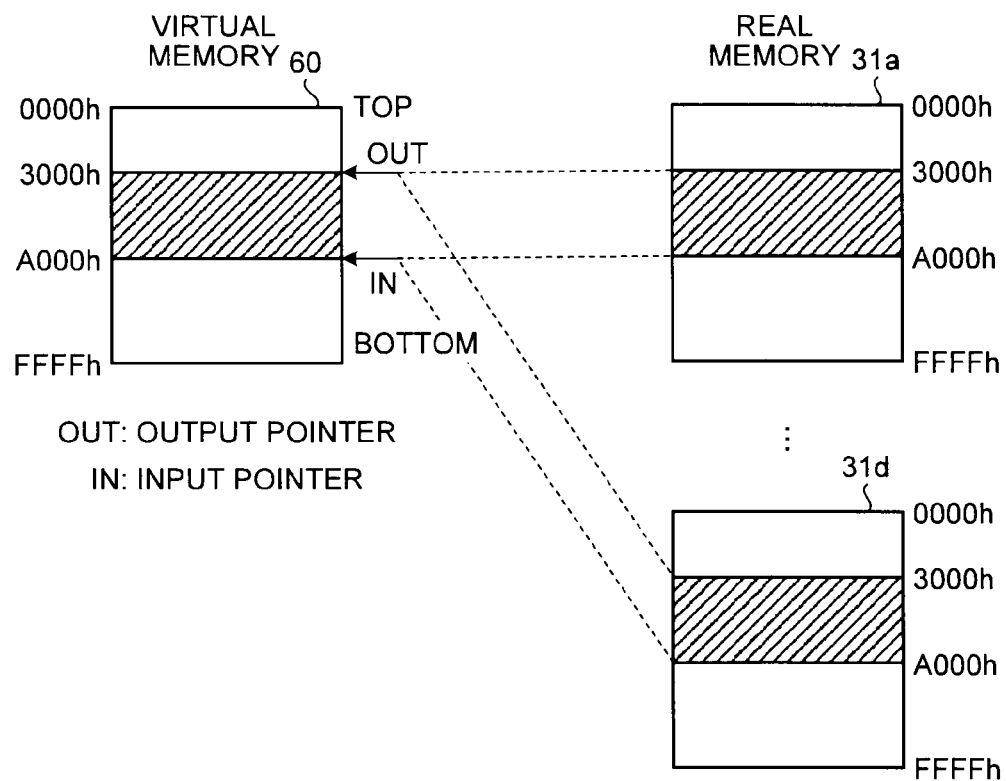

FIG.21

| COLOR | CONTENTS | | | SETTING CONTENTS |
|---|---|---|---|---|
| COMMON | PBID | | | PAGE IDENTIFIER |
| | STATION NUMBER | | | STATION IDENTIFICATION (1 TO 4) |
| | NUMBER OF PIECES OF DTA PER PAGE | | | NUMBER OF COLORS (MONOCHROME: 1, FULL COLOR: 4) |
| | FOR DATA TRANSMISSION | | | |
| | | DATA STORAGE DESTINATION ADDRESS | | |
| | | SINGLE RASTER DATA TRANSMISSION SIZE | | BYTE SIZE INCLUDING BOUNDARY ADJUSTMENT SIZE (X*Y) |
| | | ADDRESS UPDATE VALUE | | TRANSMISSION DATA SIZE × 4 |
| | | NUMBER OF UPDATES | | TRANSMISSION DATA SIZE ÷ 4 |
| | FOR PRINTING | | | |
| | | RESOLUTION | | MAIN SCANNING: PRINTING RESOLUTION |
| | | | | SUB-SCANNING: PRINTING RESOLUTION |
| | | GRADATION | | NUMBER OF BITS PER PIXEL |
| | | SHEET FEED LENGTH | | NUMBER OF DOTS IN SHEET FEED DIRECTION |
| | | SHEET WIDTH | | NUMBER OF DOTS IN SHEET WIDTH DIRECTION |
| | | PRINTING SURFACE (FRONT/REAR) | | PRINTING SURFACE |
| | | UPPER SIDE PRINTING PROHIBITED AREA | | PRINTING PROHIBITED AREA ON UPPER SIDE OF SHEET |
| | | LOWER SIDE PRINTING PROHIBITED AREA | | PRINTING PROHIBITED AREA ON LOWER SIDE OF SHEET |
| | | LEFT SIDE RINTING PROHIBITED AREA | | PRINTING PROHIBITED AREA ON LEFT SIDE OF SHEET |
| | | RIGHT SIDE PRINTING PROHIBITED AREA | | PRINTING PROHIBITED AREA ON RIGHT SIDE OF SHEET |
| | | IMAGE INFORMATION | | |
| | | | BITMAP PRINTING POSITION X | ADDRESS WITH UPPER LEFT OF SHEET AS ORIGIN |
| | | | BITMAP PRINTING POSITION Y | ADDRESS WITH UPPER LEFT OF SHEET AS ORIGIN |
| | | | X DIRECTION EFFECTIVE SIZE | EFFECTIVE WITHOUT BOUNDARY ADJUSTMENT |
| | | | Y DIRECTION EFFECTIVE SIZE | |
| C | COLOR IDENTIFIER | | | CYAN |
| | FOR DATA TRANSMISSION | | | |
| | | DATA TRANSMISSION SOURCE ADDRESS | | BITMAP DATA HEAD RASTER+ α |
| | | NEED FOR DATA TRANSMISSION | | IN CASE OF BLANK SHEET, SET DATA TRANSMISSION FOR ALL COLORS TO "NO" |
| | | | | SET DATA TRANSMISSION TO "NO" FOR COLORS OTHER THAN COLOR INSTRUCTED WITH COLOR |
| | | TRANSMISSION COMPLETION FLAG | | ON WHEN TRANSMISSION COMPLETION IS RECEIVED |
| | FOR PRINTING | | | |
| | | NEED FOR PRINTING | | IN CASE OF BLANK SHEET, SET PRINTING FOR ALL COLORS TO "NO" |
| | | | | SET PRINTING TO "NO" FOR COLORS OTHER THAN COLOR INSTRUCTED WITH COLOR |
| M | SAME AS C (COLOR IDENTIFIER IS MAGENTA) | | | |
| Y | SAME AS C (COLOR IDENTIFIER IS YELLOW) | | | |
| K | SAME AS C (COLOR IDENTIFIER IS BLACK) | | | |

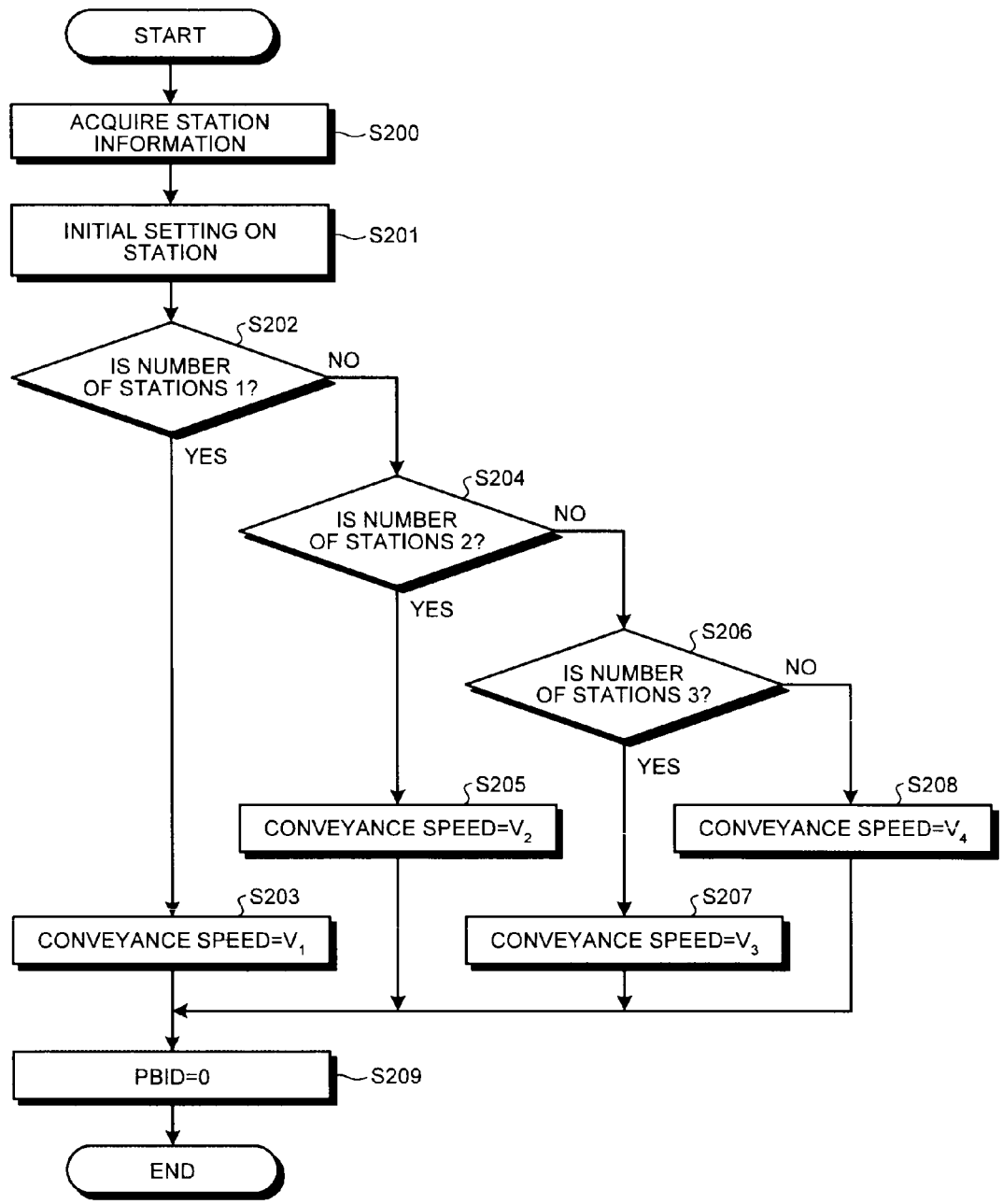

FIG.28

| COLOR | CONTENTS | | | SETTING CONTENTS |
|---|---|---|---|---|
| COMMON | PBID | | | PAGE IDENTIFIER |
| | STATION NUMBER | | | STATION IDENTIFICATION (1 TO 4) |
| | NUMBER OF PIECES OF DATA FOR PER PAGE | | | NUMBER OF COLORS (MONOCHROME: 1, FULL COLOR: 4) |
| | FOR PRINTING | | | |
| | | RESOLUTION | | MAIN SCANNING: PRINTING RESOLUTION |
| | | | | SUB-SCANNING: PRINTING RESOLUTION |
| | | GRADATION | | NUMBER OF BITS PER PIXEL |
| | | SHEET FEED LENGTH | | NUMBER OF DOTS IN SHEET FEED DIRECTION |
| | | SHEET WIDTH | | NUMBER OF DOTS IN SHEET WIDTH DIRECTION |
| | | PRINTING SURFACE (FRONT/REAR) | | PRINTING SURFACE |
| C | COLOR IDENTIFIER | | | CYAN |
| | FOR DATA TRANSMISSION | | | |
| | | NEED FOR DATA TRANSMISSION | | IN CASE OF BLANK SHEET, SET DATA TRANSMISSION FOR ALL COLORS TO "NO" |
| | | | | SET DATA TRANSMISSION TO "NO" FOR COLORS OTHER THAN COLOR INSTRUCTED WITH COLOR |
| | | TRANSMISSION COMPLETION FLAG | | ON WHEN TRANSMISSION COMPLETION IS RECEIVED |
| | | DATA TRANSMISSION SOURCE ADDRESS | | BITMAP DATA HEAD RASTER+$\alpha$ |
| | | DATA STORAGE DESTINATION ADDRES | | |
| | | TRANSMISSION SIZE OF ONE PIECE OF RASTER DATA | | BYTE SIZE THAT INCLUDES BOUNDARY ADJUSTMENT SIZE |
| | | ADDRESS UPDATE VALUE | | TRANSMISSION DATA SIZE × 4 |
| | | NUMBER OF UPDATES | | TRANSMISSION DATA SIZE ÷ 4 |
| | FOR PRINTING | | | |
| | | NEED FOR PRINTING | | IN CASE OF BLANK SHEET, SET PRINTING FOR ALL COLORS TO "NO" |
| | | | | SET PRINTING TO "NO" FOR COLORS OTHER THAN COLOR INSTRUCTED WITH COLOR |
| | | PRINTING PROHIBITED AREA ON UPPER SIDE | | PRINTING PROHIBITED AREA ON UPPER SIDE OF SHEET |
| | | PRINTING PROHIBITED AREA ON LOWER SIDE | | PRINTING PROHIBITED AREA ON LOWER SIDE OF SHEET |
| | | PRINTING PROHIBITED AREA ON LEFT SIDE | | PRINTING PROHIBITED AREA ON LEFT SIDE OF SHEET |
| | | PRINTING PROHIBITED AREA ON RIGHT SIDE | | PRINTING PROHIBITED AREA ON RIGHT SIDE OF SHEET |
| | | IMAGE INFORMATION | | |
| | | | BITMAP PRINTING POSITION X | ADDRESS WITH UPPER LEFT OF SHEET AS ORIGIN |
| | | | BITMAP PRINTING POSITION Y | ADDRESS WITH UPPER LEFT OF SHEET AS ORIGIN |
| | | | X-DIRECTION EFFECTIVE SIZE | EFFECTIVE SIZE WITHOUT BOUNDARY ADJUSTMENT |
| | | | Y-DIRECTION EFFECTIVE SIZE | |
| M | SAME AS C (COLOR IDENTIFIER IS MAGENTA) | | | |
| Y | SAME AS C (COLOR IDENTIFIER IS YELLOW) | | | |
| K | SAME AS C (COLOR IDENTIFIER IS BLACK) | | | |

PRINTING DEVICE AND METHOD OF CONTROLLING PRINTING DEVICE

CROSS-REFERENCE TO RELATED APPLICATIONS

The present application claims priority to and incorporates by reference the entire contents of Japanese Patent Application No. 2010-208549 filed in Japan on Sep. 16, 2010 and Japanese Patent Application No. 2011-181001 filed in Japan on Aug. 22, 2011.

BACKGROUND OF THE INVENTION

1. Field of the Invention

The present invention relates to a printing device which prints image data transmitted from an upper level device, and a method of controlling a printing device.

2. Description of the Related Art

In the related art, a printing system has been known which includes a printing device and an upper level device delivering print data to the printing device as well as instructing the printing device to perform printing. In this printing system, for example, the upper-level device generates a raster image type of print image data by using a raster image processor (RIP), on the basis of print data written in PDL (Page Description Language) that is transmitted from a host device, and transmits the generated print image data to a printing control unit of the printing device (for example, refer to Japanese Patent Application Laid-open No. 2004-287519).

Unlike the above-described printing system, a printing device is known which includes a printer controller, a printer engine, and data lines for connecting the printer controller and the printer engine (see Japanese Patent Application Laid-open No. 2002-254763). In the printing device described in Japanese Patent Application Laid-open No. 2002-254763, a control line through which various kinds of control information are transmitted and received between the printer controller and the printer engine is separated from the data lines through which printing image data is transmitted and received, thereby realizing high-speed data transmission.

In recent years requirements for a printing system become diversified. Therefore systems that can smoothly meet such a diversity of requirements are in demand. For example, there is likely to be a chance to improve printing performance to cope with an increase in the amount of print which results from expansion of business after a printing system has been introduced already. In such a case, it is possible to cope with an increase in the amount of print by increasing the process performance of a printer controller and a printer engine, in addition to an increase in the process performance of an upper level device. It is also achieved by increasing both of the process performance of an upper level device and the printing performance of a station if the printing type is an ink jet type and the station configured by an ink jet head that ejects ink has room in its printing performance.

As to the upper level device, it is easy to increase the process performance in a way of expanding the hardware configuration. However, printing devices according to the related art are not configured to be able to cope with the expansion of the hardware configuration. Accordingly, there is a problem in that it is difficult to improve the printing performance once a printing system is introduced.

SUMMARY OF THE INVENTION

It is an object of the present invention to at least partially solve the problems in the conventional technology.

According to an aspect of the present invention, there is provided a printing device includes at least one station and a transmission control unit. The station includes a printing unit that prints image data of a plurality of colors generated by an upper level device on a printing medium, and a plurality of holding units that receive and hold the image data of the plurality of colors transmitted from the upper level device through a plurality of first transmission paths respectively corresponding to the image data of the plurality of colors. The transmission control unit controls the plurality of holding units to receive printing information from the upper level device through a second transmission path, and controls, on the basis of the printing information, the plurality of holding units to respectively receive and hold the image data of the plurality of colors transmitted from the upper level device.

According to another aspect of the present invention, there is provided a method of controlling a printing device. The method includes causing a printing unit of a station to print image data of a plurality of colors generated by an upper level device on a printing medium; causing a plurality of holding units of the station to hold image data of the plurality of colors transmitted from the upper level device through a plurality of first transmission paths respectively corresponding to the image data of the plurality of colors; and causing a transmission control unit to control the plurality of holding units to receive printing information from the upper level device through a second transmission path, and to control, on the basis of the printing information, the plurality of holding units to respectively receive and hold image data of the plurality of colors transmitted from the upper level device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a schematic diagram illustrating an example of control information which is transmitted and received between an upper level device and a printer controller of a printer device;

FIG. 11D is a flowchart illustrating an example of a process of each data transmission control unit which can be applied to an embodiment;

FIG. 12A is a sequence diagram specifically illustrating an example of a printing process which can be applied to an embodiment;

FIGS. 15A and 15B are schematic diagrams illustrating a specific example of a virtual memory;

FIG. 21 is a schematic diagram illustrating an example of a transmission management table which is applied to an embodiment;

FIG. 23 is a flowchart illustrating an example of an initialization process which is performed at the time of power-on or the like in the printer device;

FIG. 28 is a schematic diagram illustrating the configuration of an example of a transmission management table according to a second embodiment.

DETAILED DESCRIPTION OF THE PREFERRED EMBODIMENTS

Hereinafter, embodiments of a printing system according to the present invention will be described in detail with reference to the accompanying drawings. First, in order to help with understanding, production printing to which a printing system according to each embodiment is applied will be schematically described. In general, the production printing is used when a large capacity of printing is performed in a short time. For this reason, in the production printing, there is constructed a work flow system for controlling from a print data generation to a print distribution, in order to efficiently perform a job control or a print data control, as well as improving the print speed.

The print system according to each embodiment involves a part for implementing the print operation in the work flow for the production printing. In the system, a process using the RIP (hereinafter may be called "RIP process") is performed by a device different from a device for printing the bitmap data obtained through the RIP process. Since the RIP process requires the most long processing time in the printing process, it is possible to improve the print speed by performing the RIP process and the printing process by different devices.

Outline of Printing System Applicable to Each Embodiment

Figure 1:
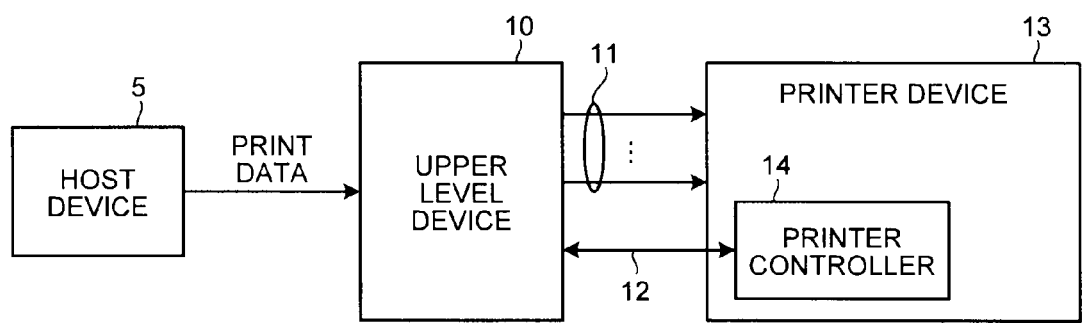
FIG. 1 is a block diagram illustrating the configuration of an example of a printing system which can be applied to an embodiment.

FIG. 1 illustrates an example of the configuration of a printing system that can be applied to each embodiment of the present invention. The printing system is provided with an upper level device 10, a printer device 13 as an image forming device, a plurality of data lines 11, and a control line 12. The upper level device 10 is connected with the printer device 13 via the plurality of data lines 11 and the control line 12. A host device 5 may be a computer for example to generate print job data including print image data and print set information.

The print job data may include data written in PDL (hereinafter referred to as "PDL data") for example. The print set information relating to the print setting including print page information, layout information, print run information, as well as the print image data composed of the bitmap image for printing, is generated by interpreting the PDL data.

The upper level device 10 performs the RIP process in accordance with the print job data supplied from the host device 5 to generate the each color bitmap data as print image data. Along with that, the upper level device 10 generates control information for controlling the print operation, on the basis of the print job data and the information from the host device 5.

The print image data for each color generated by the upper level device 10 is supplied to a printer engine unit (not shown)

of the printer device 13 through the plurality of data lines 11. Between the upper level device 10 and a printer controller 14, the control information for controlling the print operation is transmitted/received through the control line 12. The printer controller 14 controls the printer engine unit on the basis of the transmitted/received control information to form an image on a print medium, thereby perform the print operation according to the print job. Incidentally, the specific example of the control information will be described later with reference to FIGS. 12A to 12C.

The printing method is not limited in particular. However, in each embodiment, printing paper is used as the printing medium and a printing image is formed on the printing paper using an inkjet system. However, the present invention is not limited thereto and each embodiment can be applied to the printing device that forms a printing image on the printing paper using toner. As the printing paper, continuous paper (continuous stationery) where perforations to be cut are provided at a predetermined interval is used. In the production printing, the continuous paper is mainly used as the printing paper. However, the present invention is not limited thereto and cut paper where a size is fixed to an A4 size or a B4 size may be used as the printing paper. In the continuous paper, a page means a region that is interposed by perforations provided at a predetermined interval.

The printing medium that is printed by a printing system according to each embodiment is not limited to printing paper such as paper. That is, other printing media that can be printed by a printing system applied to each embodiment and can be provided as a roll may be used. For example, a plastic film or cloth may be used as the printing medium.

Upper Level Device

Figure 2A:
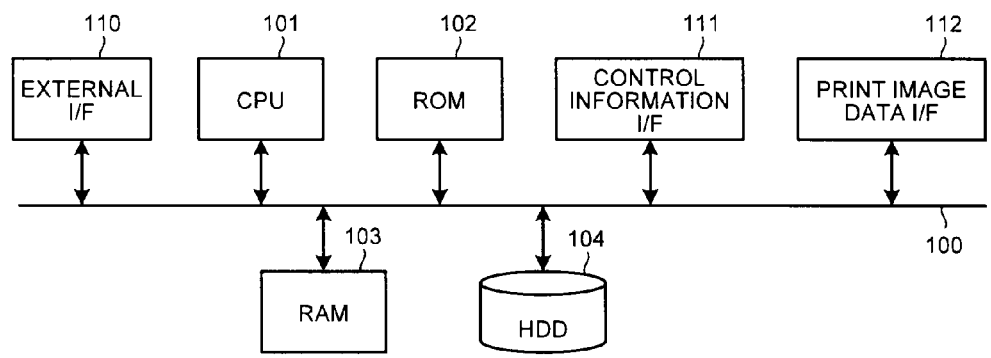
FIG. 2A is a block diagram illustrating the configuration of an example of an upper level device.

FIG. 2A illustrates an example of the configuration of the upper level device 10. A control processing unit (CPU) 101, a read only memory (ROM) 102, a random access memory (RAM) 103, and a hard disk drive (HDD) 104 are connected to a bus 100. An external I/F 110, a control information I/F 111, and a print image data I/F 112 are connected to the bus 100. The individual units that are connected to the bus 100 can communicate with each other through the bus 100.

In the ROM 102 and the HDD 104, a program to operate the CPU 101 is stored in advance. The RAM 103 is used as a work memory of the CPU 101. That is, the CPU 101 uses the RAM 103 as the work memory according to the program stored in the ROM 102 and the HDD 104 and controls all the operations of the upper level device 10.

The external I/F 110 corresponds to, for example, a transmission control protocol/Internet Protocol (TCP/IP) and controls communication with the host device 5. The control information I/F 111 controls communication of control information. Since the print image data I/F 112 controls communication of print image data, the print image data I/F 112 has plural channels. For example, print image data of each color such as yellow (Y), cyan (C), and magenta (M), and black (K) that is generated in the upper level device 10 is output from the plural channels. Since a high-speed transmission speed is required in the print image data I/F 112, the peripheral component interconnect bus express (PCI Express) may be employed. A type of the control information I/F 111 is not limited in particular. However, in this case, similar to the print image data I/F 112, the PCI Express is used.

In this configuration, print job data that is transmitted from the host device 5 is received in the external I/F 110 of the upper level device 10 and is stored in the HDD 104 through the CPU 101. The CPU 101 executes the RIP process on the basis of the print job data read from the HDD 104, generates bitmap data of each color, and writes the bitmap data in the RAM 103. For example, the CPU 101 renders page description language (PDL) data by the RIP process, generates bitmap data of each color, and writes the bitmap data in the RAM 103. The CPU 101 compresses and encodes the bitmap data of each color that is written in the RAM 103 and temporarily stores the bitmap data in the HDD 104.

For example, when a print operation starts in the printer device 13, the CPU 101 reads the compressed and encoded bitmap data of each color from the HDD 104, decodes the compressed code, and writes the extended bitmap data of each color in the RAM 103. The CPU 101 reads the bitmap data of each color from the RAM 103, outputs the bitmap data as the print image data of each color from each channel of the print image data I/F 112, and supplies the bitmap data to the printer device 13. The CPU 101 transmits/receives control information to control printing through the control information I/F 111 between the CPU 101 and the printer device 13, according to a progress situation of the print operation.

Figure 2B:
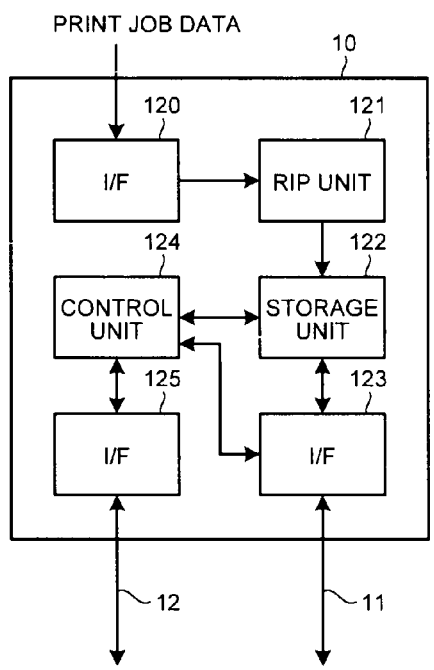
FIG. 2B is a functional block diagram illustrating an example of the function of the upper level device.

FIG. 2B is a functional block diagram illustrating an example of a function of the upper level device 10. The upper level device 10 includes interfaces (I/F) 120, 123, and 125, an RIP unit 121, a storage unit 122, and a control unit 124. The interfaces 120, 123, and 125 correspond to the external I/F 110, the print image data I/F 112, and the control information I/F 111, respectively. The RIP unit 121 and the control unit 124 are configured by a program operating on the CPU 101 in FIG. 2A. The storage unit 122 corresponds to at least one of the RAM 103 or the HDD 104 in FIG. 2A.

The print job data that includes the PDL data is generated by the host device 5 and is transmitted to the upper level device 10. The print job data is received in the interface 120 and is supplied to the RIP unit 121. The RIP unit 121 performs rendering on the basis of the PDL data included in the supplied print job data and generates print image data based on the bitmap data of each color of Y, C, M, and K. The RIP unit 121 sequentially stores the generated print image data of each color of Y, C, M, and K in the storage unit 122.

The control unit 124 communicates with the printer controller 14 of the printer device 13 through the interface 125. For example, the control unit 124 generates control information to control printing in the printer device 13, on the basis of the print job data supplied from the host device 5 through the interface 120. The control information is transmitted from the control unit 124 to the printer controller 14 through the interface 125.

The interface 123 is configured to have independent access to the print image data of each color of Y, C, M, and K stored in the storage unit 122. The interface 123 is connected to the printer device 13 through the plurality of data lines 11 corresponding to the individual colors of Y, C, M, and K, and exchanges control information related to print image data transfer of each color of Y, C, M, and K between the interface 123 and the printer device 13 or transmits print image data of each color of Y, C, M, and K.

Printer Device

Figure 3A:
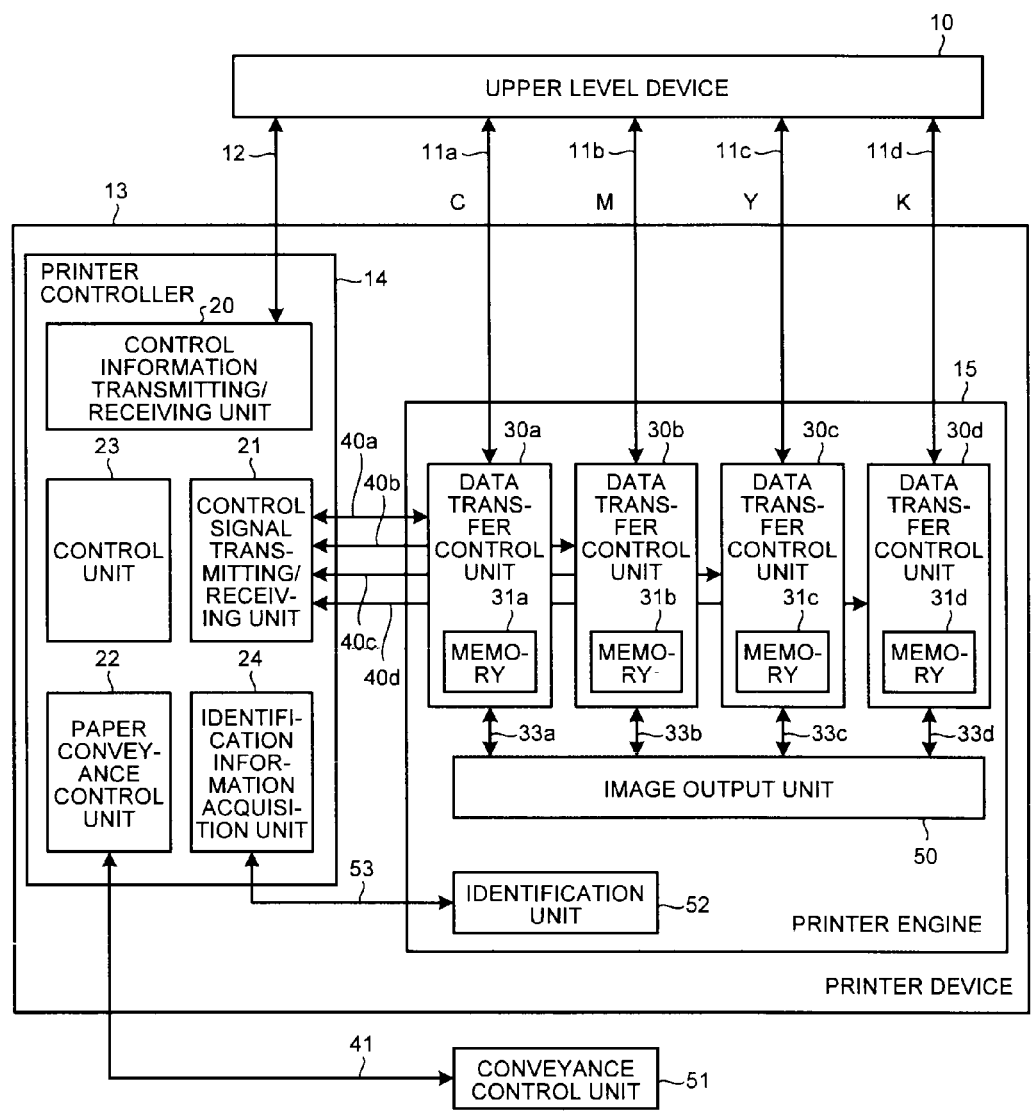
FIG. 3A is a block diagram illustrating an example of the basic configuration of a printer device 13 which can be applied to each embodiment.

FIG. 3A illustrates an example of the basic configuration of a printer device 13 which can be applied to each embodiment. The printer device 13 has a printer controller 14 and a printer engine 15. The printer controller 14 has a control line 12 connected thereto, and transmits and receives control information with respect to an upper level device 10 through the control line 12 to control a printing operation. The printer engine 15 has a plurality of data lines 11*a*, 11*b*, 11*c*, and 11*d* connected thereto, and performs a printing process on the basis of printing image data of respective colors transmitted from the upper level device 10 through the data lines 11a, 11b, 11c, and 11d under the control of the printer controller 14.

The printer controller 14 and the printer engine 15 will be described in more detail. The printer controller 14 includes a control information transmitting/receiving unit 20, a control signal transmitting/receiving unit 21, a paper conveyance control unit 22, a control unit 23 and an identification information acquisition unit 24.

The control information transmitting/receiving unit 20 exchanges control information to control printing with the upper level device 10 through the control line 12. The control signal transmitting/receiving unit 21 is connected to data transfer control units 30a, 30b, 30c, and 30d to be described below through engine I/F control lines 40a, 40b, 40c, and 40d. The control signal transmitting/receiving unit 21 exchanges a control signal individually with the data transfer control units 30a, 30b, 30c, and 30d. The paper conveyance control unit 22 is connected to a conveyance control unit 51 to be described below through a conveyance control line 41 and exchanges a control signal with the conveyance control unit 51 to control paper conveyance.

The control unit 23 includes a CPU, a ROM, and a RAM, and uses the RAM as a work memory to control the individual units of the printer controller 14 according to a program previously stored in the ROM. The control unit 23 analyzes control information that is transmitted from the upper level device 10 and is received by the control information transmitting/receiving unit 20 and delivers the control information to the control signal transmitting/receiving unit 21 or the paper conveyance control unit 22.

The control information transmitting/receiving unit 20, the control signal transmitting/receiving unit 21, and the paper conveyance control unit 22 may be configured as hardware controlled by the control unit 23 and may be configured as a program module that operates on the control unit 23.

Figure 3B:
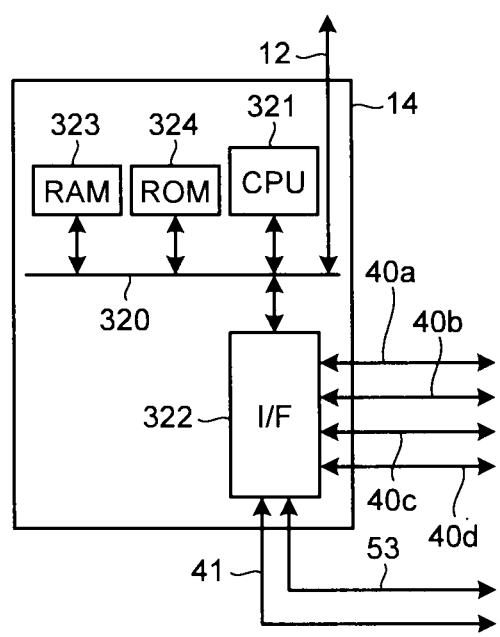
FIG. 3B is a block diagram illustrating the configuration of an example of a printer controller.

FIG. 3B illustrates the hardware configuration of an example of the printer controller 14. The printer controller 14 has a CPU 321, an interface (I/F) 322, a RAM 323, and a ROM 324. The CPU 321, the interface 322, the RAM 323, and the ROM 324 are communicably connected to a bus 320. The control line 12 is connected to the bus 320 through a communication I/F (not shown). The CPU 321 operates using the RAM 323 as a work memory in accordance with a program stored in the ROM 324, and controls the entire operation of the printer device 13. The interface 322 includes a logic circuit which is constituted by hardware, and controls communication with the printer controller 14, the data transfer control units 30a, 30b, 30c, and 30d, a conveyance control unit 51, and an identification unit 52.

In this configuration, for example, functions of the control signal transmitting/receiving unit 21 and the paper conveyance control unit 22 illustrated in FIG. 3A are realized by the I/F 322. The function of the control unit 23 is realized by the program operated on the CPU 321. The function of the control information transmitting/receiving unit 20 is realized by a communication I/F not illustrated in the drawings and the bus 320.

Returning to the description of FIG. 3A, the printer engine 15 has a plurality of data transfer control units 30a, 30b, 30c, and 30d having the same configuration, and also has an image output unit 50 which outputs an image based on printing image data onto a sheet to perform image formation.

The printer engine 15 further has an identification unit 52 which outputs identification information for allowing the printer controller 14 to identify the printer engine 15. The identification unit 52 includes, for example, a dip switch, and the user sets identification information for identifying the printer engine 15. In the printer controller 14, the identification information acquisition unit 24 acquires the identification information from the identification unit 52 through a signal line 53.

The data lines 11a, 11b, 11c, and 11d are connected to the data transfer control units 30a, 30b, 30c, and 30d, respectively. The data transfer control units 30a, 30b, 30c, and 30d include memories 31a, 31b, 31c, and 31d, respectively, and store the print image data of the individual colors transmitted from the upper level device 10 through the data lines 11a, 11b, 11c, and 11d in the memories 31a, 31b, 31c, and 31d.

Each of the memories 31a, 31b, 31c, and 31d has the same memory capacity and the same address configuration. Each of the memories 31a, 31b, 31c, and 31d preferably has the memory capacity that can store print image data of at least three pages. For example, the three pages of the print image data correspond to print image data of a page during transmission from the upper level device 10, print image data of a page during an output, and print image data of the next page. However, the present invention is not limited thereto and each of the memories 31a, 31b, 31c, and 31d may store print image data of two pages or less.

The memories 31a, 31b, 31c, and 31d are controlled by the printer controller 14 using an input pointer and an output pointer in a batched manner. The input pointer indicates the address of a head when image data is transmitted to each of the memories 31a, 31b, 31c, and 31d. The output pointer indicates a head address when image data is output from each of the memories 31a, 31b, 31c, and 31d. The details of batch management of the memories 31a, 31b, 31c, and 31d using the input pointer and the output pointer will be described below.

The data transfer control units 30a, 30b, 30c, and 30d are respectively connected to the printer controller 14 by engine control lines 40a, 40b, 40c, and 40d. The printer controller 14 can individually transmit and receive control signals with respect to the data transfer control units 30a, 30b, 30c, and 30d through the engine control lines 40a, 40b, 40c, and 40d. In more detail, the engine control lines 40a, 40b, 40c, and 40d are connected to a control signal transmitting/receiving unit 21 in the printer controller 14. Communication is performed between the control unit 23 and the data transfer control units 30a, 30b, 30c, and 30d through the engine control lines 40a, 40b, 40c, and 40d and the control signal transmitting/receiving unit 21.

The printer controller 14 and the conveyance control unit 51 which controls conveyance of a printing sheet are connected to each other by the conveyance control line 41; and communication is performed between the printer controller 14 and the conveyance control unit 51. In more detail, the conveyance control unit 51 and the paper conveyance control unit 22 which is included in the printer controller 14 are connected to each other by the conveyance control line 41; and communication is performed between the conveyance control unit 51 and the paper conveyance control unit 22 in the printer controller 14.

Figure 4A:
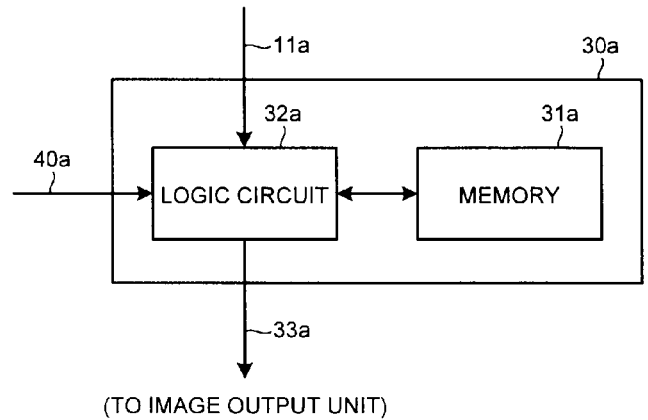
FIG. 4A is a block diagram schematically illustrating the configuration of an example of a data transmission control unit.

FIG. 4A schematically illustrates an example of the configuration of the data transfer control unit 30a. Since the common configuration is applied to the data transfer control units 30a, 30b, 30c, and 30d, the configuration of the data transfer control unit 30a among the data transfer control units 30a, 30b, 30c, and 30d is illustrated representatively in FIG. 4A.

The data transfer control unit 30a includes a memory 31a and a logic circuit 32a. The engine I/F control line 40a and the data line 11a are connected to the logic circuit 32a. The logic circuit 32a stores the print image data transmitted from the upper level device 10 through the data line 11a in the memory 31a, according to the control signal received from the control signal transmitting/receiving unit 21 through the engine I/F control line 40a. Likewise, the logic circuit 32a reads the print image data from the memory 31a according to a control signal received from the control signal transmitting/receiving unit 21 through the engine I/F control line 40a and supplies the print image data to an image output unit 50 to be described through an output line 33a.

The control by the logic circuit 32a that is configured in a hardware manner with a combination of logic circuits is advantageous in that a high-speed process can be executed, over the control by a CPU which uses interrupts to make a program diverge into processes. For example, the logic circuit 32a performs logic determination with respect to a control signal based on a bit string that is received through the engine I/F control line 40a and determines a process to be executed. However, the present invention is not limited thereto and the same function as that of the logic circuit 32a may be realized in a software manner using the CPU.

The print image data of the individual colors that are output from the data transfer control units 30a, 30b, 30c, and 30d is supplied to the image output unit 50. The image output unit 50 executes printing based on the print image data of each color. In each embodiment, printing of the print image data is performed by an inkjet system that ejects ink from nozzles in heads and performs printing. However, the printing system is not limited to the inkjet system and a laser printer system may be used.

Figure 4B:
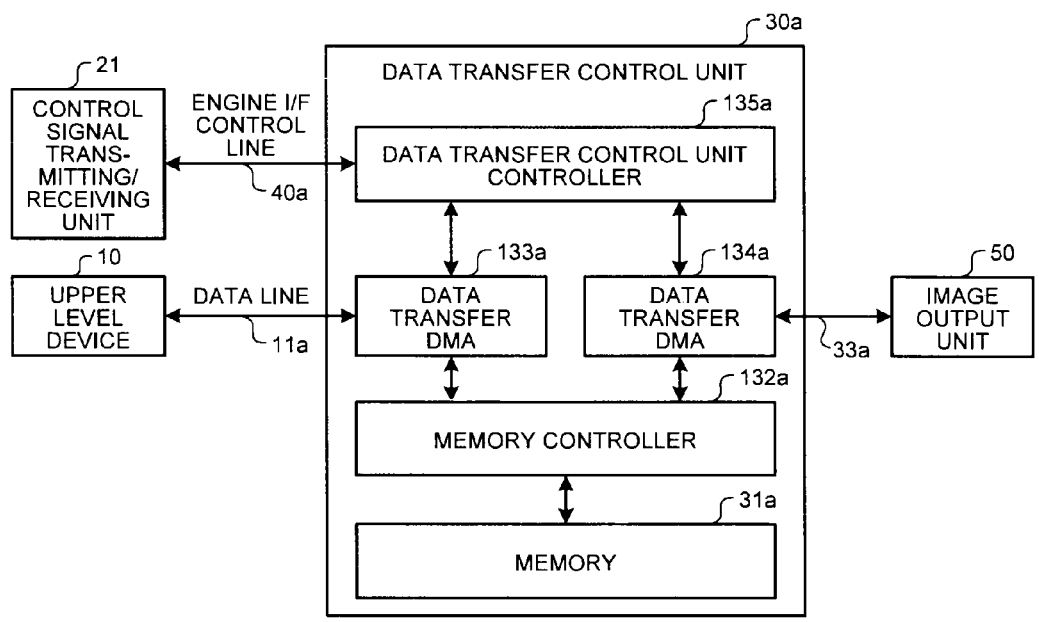
FIG. 4B is a block diagram illustrating the configuration of an example of a data transmission control unit in more detail.

FIG. 4B specifically illustrates an example of the configuration of the data transfer control unit 30a. In FIG. 4B, components that are common to those of FIG. 4A are denoted by the same reference numerals and the redundant description will not be repeated. The data transfer control unit 30a includes a memory 31a, a memory controller 132a, data transfer direct memory accesses (DMA) 133a and 134a, and a data transfer control unit controller 135a. Among these components, the memory controller 132a, the data transfer DMAs 133a and 134a, and the data transfer control unit controller 135a are included in the logic circuit 32a illustrated in FIG. 4A.

The memory controller 132a controls access with respect to the memory 31a. The data transfer DMA 133a receives print image data from the upper level device 10 and writes the print image data in the memory through the memory controller 132a. The data transfer DMA 134a reads data from the memory 31a through the memory controller 132a and transmits the data to the image output unit 50 through the output line 33a. The data transfer control unit controller 135a receives control information that is transmitted from the control signal transmitting/receiving unit 21 in the printer controller 14 through the engine I/F control line 40a and controls the data transfer DMAs 133a and 134a according to the received control information.

For example, once a data transfer start request transmitted from the control signal transmitting/receiving unit 21 is received in the data transfer control unit controller 135a through the engine I/F control line 40a, the data transfer control unit controller 135a instructs the data transfer DMA 133a to start to transmit data, according to the data transfer start request. The data transfer DMA 133a transmits the data transfer request to the upper level device 10 through the data line 11a according to the instruction. For example, the data that is transmitted from the upper level device 10 according to the data transfer request is received in the data transfer DMA 133a and is written at a predetermined address of the memory 31a through the memory controller 132a.

Once the printing instruction that is transmitted from the control signal transmitting/receiving unit 21 is received in the data transfer control unit controller 135a through the engine I/F control line 40a, the data transfer control unit controller 135a instructs the data transfer DMA 134a to read data from the memory 31a. The data transfer DMA 134a reads data from the memory 31a through the memory controller 132a, according to the instruction. The data transfer DMA 134a transmits the read data to the image output unit 50 through the output line 33a.

Figure 5:
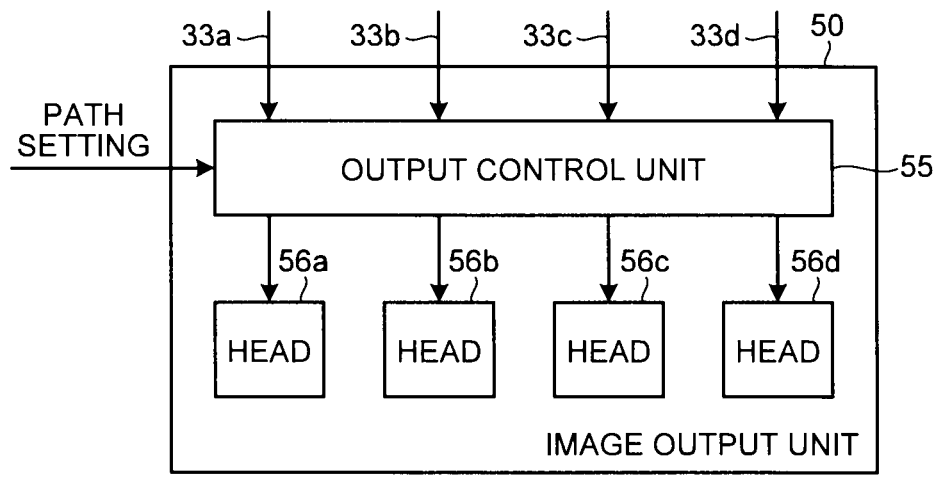
FIG. 5 is a block diagram illustrating the configuration of an example of an image output unit.

FIG. 5 illustrates an example of the configuration of the image output unit 50. The image output unit 50 includes an output control unit 55 and heads 56a, 56b, 56c, and 56d of the individual colors of Y, C, M, and K. A relation between the colors and the heads 56a, 56b, 56c, and 56d is not limited to the above example. The output control unit 55 controls connection of output lines 33a, 33b, 33c, and 33d to which print image data of the data transfer control units 30a, 30b, 30c, and 30d is output and the heads 56a, 56b, 56c, and 56d. That is, the output control unit 55 can set a path such that each of the heads 56a, 56b, 56c, and 56d is connected to any one output line selected from the output lines 33a, 33b, 33c, and 33d.

For example, the output control unit 55 may set the output lines 33a, 33b, 33c, and 33d and the heads 56a, 56b, 56c, and 56d to be connected in a one-to-one relation. Further, the output lines 33a, 33b, 33c, and 33d may be set to be connected to the heads 56a, 56b, 56c, and 56d in a one-to-multiple relation, such that the heads 56a, 56b, 56c, and 56d are connected to the output line 33a.

Paths to connect the output lines 33a, 33b, 33c, and 33d with the heads 56a, 56b, 56c, and 56d may be set by an operation from the user using a DIP switch. However, the present invention is not limited thereto and the paths may be set by a control signal from the control signal transmitting/receiving unit 21.

Figure 6:
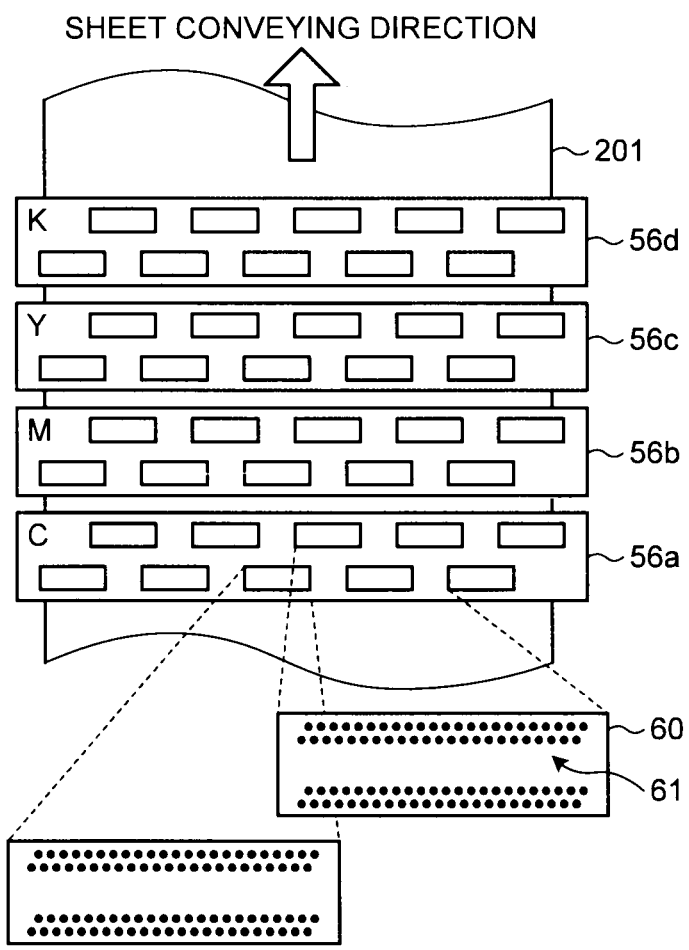
FIG. 6 is a schematic diagram schematically illustrating the configuration of an example of each head in the image output unit.

FIG. 6 illustrates the configuration of an example of each of the heads 56a, 56b, 56c, and 56d in the image output unit 50. For example, with regard to the head 56a, nozzle blocks 60 each of which includes two nozzle arrays 61 having multiple nozzles arranged to eject ink at a predetermined pitch are arranged in a zigzag pattern with respect to the width direction of a printing paper 201. Each nozzle block 60 is arranged in the head 56a such that the ends of the nozzle arrays 61 overlap each other with respect to the traveling direction of the printing paper 201. The other heads 56b, 56c, and 56d have the same configuration as the head 56a.

In the example of FIG. 6, the heads 56a, 56b, 56c, and 56d corresponding to the colors C, M, Y, and K are arranged in an order of the heads 56a, 56b, 56c, and 56d with respect to the traveling direction of the printing paper 201. Thus, printing is performed on the printing paper 201 in an order of the colors C, M, Y, and K.

As described above, in the printer device 13 according to each embodiment, transmission of the print image data from the upper level device 10 and transmission/reception of a control signal to control printing of the print image data between the upper level device 10 and the printer device 13 are performed through different paths. The print image data of the individual colors is transmitted from the upper level device 10 through the different data lines 11a, 11b, 11c, and 11d and the print image data of the individual colors that is transmitted through the data lines 11a, 11b, 11c, and 11d is independently controlled and is supplied to the data transfer control units 30a, 30b, 30c, and 30d that have the same configuration. Further, in the image output unit 50, connection paths of outputs of the data transfer control units 30a, 30*b*, 30*c*, and 30*d* and the heads 56*a*, 56*b*, 56*c*, and 56*d* of the individual colors can be set by a user operation or the like.

Therefore, the printer device 13 according to each embodiment can easily change the configuration of the printer engine 15, according to the number of colors of the print image data (four colors of Y, C, M, and K or only color of K) or the number of heads used by the image output unit 50. At this time, the printer engine 15 may be provided with only the necessary units among the data transfer control units 30*a*, 30*b*, 30*c*, and 30*d* according to the required configuration.

For example, at the time of full color printing using four colors of Y, C, M, and K, it should suffice that all the data transfer control units 30*a*, 30*b*, 30*c*, and 30*d* are provided in the printer engine 15, and in the output control unit 55, the outputs of the data transfer control units 30*a*, 30*b*, 30*c*, and 30*d* are respectively connected to the heads 56*a*, 56*b*, 56*c*, and 56*d*.

For example, at the time of printing using one color of K, only one data transfer control unit 30*a* and one head 56*a* are provided in consideration of device cost with more preference, and the output of the data transfer control unit 30*a* in the output control unit 55 can be connected to the head 56*a*. For example, when printing is performed with one color of K, one data transfer control unit 30*a* and four heads 56*a*, 56*b*, 56*c*, and 56*d* are provided in consideration of a printing speed with more preference, and the output of the data transfer control unit 30*a* in the output control unit 55 can be connected to the heads 56*a*, 56*b*, 56*c*, and 56*d*. In this case, the same color is printed multiple times in an overlapping manner. Thus, for example, it is considered that the ink ejection time in each of the heads 56*a*, 56*b*, 56*c*, and 56*d* is ¼ of the normal, and the conveyance speed of the printing sheet is four times higher than the normal, thereby performing high-speed printing.

Conveyance System of Printing Sheet

Figure 7:
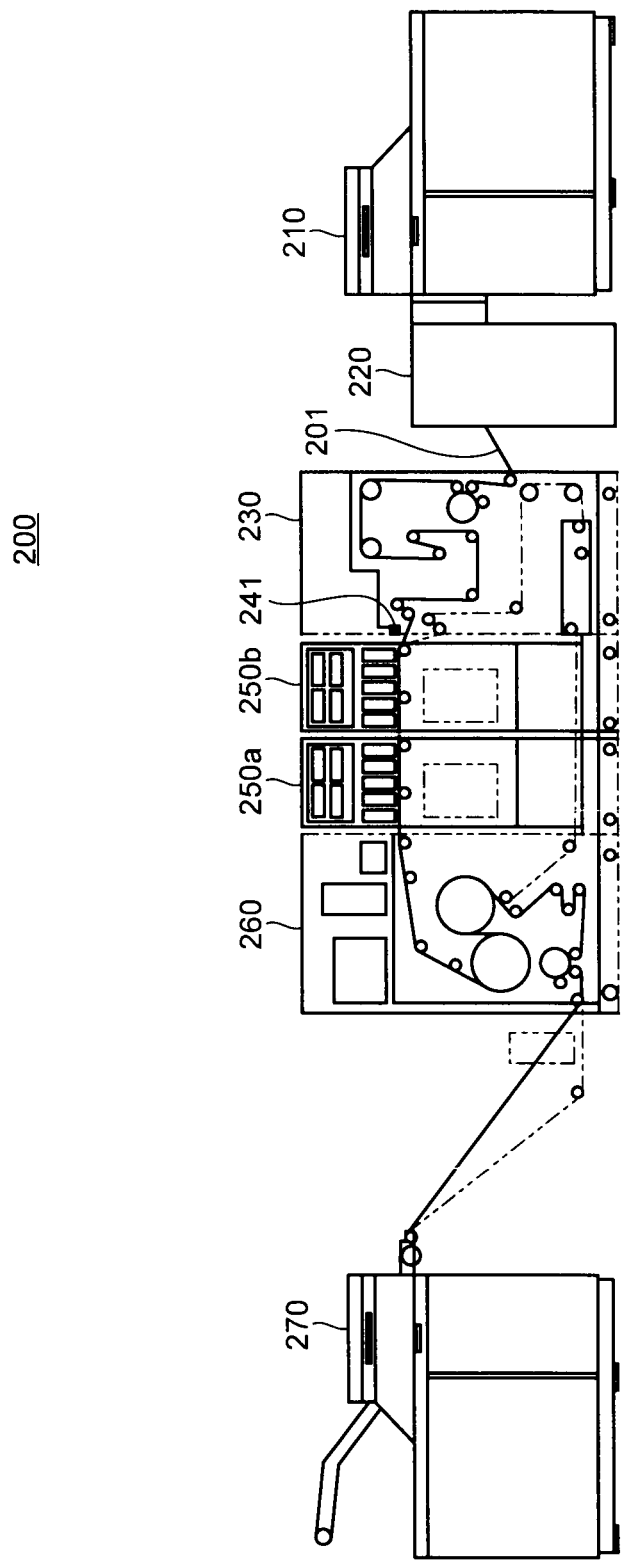
FIG. 7 is a schematic diagram schematically illustrating the structure of an example of a printer device including a sheet conveying system which can be applied to an embodiment.

The conveyance control unit 51 performs communication with the printer controller 14 through the conveyance control line 41, and controls the conveyance of a sheet on which an image based on printing image data is formed by the image output unit 50. FIG. 7 schematically illustrates the structure of an example of a printer device 200 including a sheet conveying system, which can be applied to each embodiment. As already described, in each embodiment, the printer device 200 uses a continuous-form sheet as a printing sheet.

The printing paper 201 is fed from a printing sheet feed unit 210 to a first conveyance unit 230 through a power supply operation box 220. Here, it is assumed that the printing sheet feed unit 210 includes the printer controller 14. The printing paper 201 is conveyed through a plurality of rollers and the like in the first conveyance unit 230, and is fed to a second conveyance unit 260 through stations 250*a* and 250*b*. The second conveyance unit 260 has the above-described conveyance control unit 51, and performs conveyance control of the fed printing paper 201. For example, the printing paper 201 is driven in the printing direction (sheet feed direction) by a conveyance driving roller provided in the second conveyance unit 260, and a slight load in the direction opposite to the printing direction is applied to the first conveyance unit 230, thereby eliminating sagging.

A position sensor 241 is provided on the output side of the first conveyance unit 230, and the printing paper 201 is aligned with respect to a reference position. For example, if the printing paper 201 is a continuous-form sheet in which perforations are put at predetermined intervals, and alignment is performed such that the perforations and the reference position are aligned with each other. The alignment of the sheet in the width direction can be done by adjusting the allocation of image data of a line for each nozzle of the nozzle array 61 in each of the heads 56*a*, 56*b*, 56*c*, and 56*d*.

Each of the stations 250*a* and 250*b*, corresponding to the above-described printer engine 15, has the data transfer control units 30*a* to 30*d* and the image output unit 50, and performs printing on the printing paper 201. The stations 250*a* and 250*b* are expandable in the printer device 200. FIG. 7 illustrates an example where two stations 250*a* and 250*b* are connected to the printer device 200. Each of the stations 250*a* and 250*b* is identified by the identification information output from the identification unit (not shown) in the printer controller 14.

Here, the positional relation between the reference position and each of the stations 250*a* and 250*b* should be fixed. Meanwhile, when the stations 250*a* and 250*b* are expandable, it is preferable that the stations 250*a* and 250*b* are separated from the printer device 200.

Figure 8:
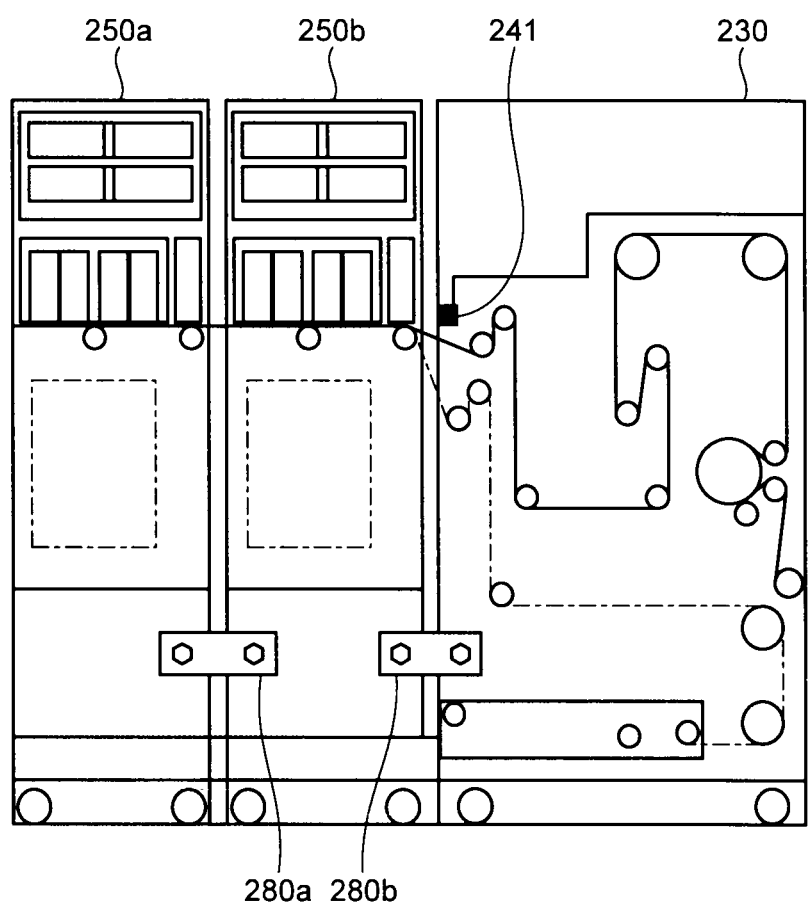
FIG. 8 is a schematic diagram illustrating an example of a connection portion which connects stations.

As an example, it is considered that the first conveyance unit 230 in which the reference position exists, the station 250*a* and the station 250*b* are connected to each other using connectors. FIG. 8 illustrates an example where the first conveyance unit 230 and the station 250*a*, and the station 250*a* and the station 250*b* are respectively connected to each other using connectors 280*a* and 280*b*. The connector 280*a* or the connector 280*b* is attached to the station 250*a* or the station 250*b* and the first conveyance unit 230 by, for example, bonding parts, such as bolts and nuts. Thus, the positional relation between the reference position and each of the station 250*a* and the station 250*b* can be fixed.

The embodiment is not limited to the above-described example, and the first conveyance unit 230, the station 250*a*, and the station 250*b* may be connected to each other using connectors having a latch structure or the like, such that the positional relation between the reference position and each of the station 250*a* and the station 250*b* may be fixed.

The stations 250*a* and 250*b* and the second conveyance unit 260 are connected to the first conveyance unit 230 by predetermined cables (not shown), and communication by the engine control lines 40*a* to 40*d* or communication by the conveyance control line 41 is performed through the cables. The stations 250*a* and 250*b* are connected to the upper level device 10 (not shown) through the cables and the first conveyance unit 210, and transmission of image data of each color by the data lines 11*a* to 11*d*, or the like is performed.

The printing paper 201 after printing is discharged from the second conveyance unit 260 and fed to a cutting unit 270. The printing paper 201 after printing is cut in accordance with the perforations by the cutting unit 270 and separated by page.

Here, the printer device 200 performs printing on the printing paper 201 which is a continuous-form sheet having continuous pages. Thus, the printing paper 201 is present in an uncut state in a path until the printing paper 201 is discharged from the second conveyance unit 260 after printing on the printing paper 201 in the stations 250*a* and 250*b*.

Another set of the first conveyance unit 230, the stations 250*a* and 250*b*, and the second conveyance unit 260 is prepared, such that the printing paper 201 after printing discharged from the front second conveyance unit 260 is reversed and fed to the rear first conveyance unit 230. Thus, it becomes possible to perform duplex printing on the printing paper 201.

Detail of Printing Process Applicable to Each Embodiment

Next, a printing process applicable to each embodiment will be further described in detail. FIG. 9 illustrates an example of control information that is transmitted/received between the upper level device 10 and the printer controller 14 of the printer device 13 through the control line 12. In FIG.

9, the upper level device 10 is illustrated as a digital front end processor (DFE) and the printer controller 14 is illustrated as a PCTL. The control information roughly includes (i) job information, (ii) information indicating a printer status and a printing process, (iii) information indicating a printing condition, and (iv) information indicating a connection.

Job information of (1) is used to notify a job start and a job end. The job start includes a notification of the job start from the upper level device 10 to the printer controller 14, and a response from the printer device 13 to the upper level device 10 with respect to the notification. The job start includes information relating to image data to be printed which is notified by the job start. The job end includes a notification of the end of a full printing process requested by the job start from the upper level device 10 to the printer controller 14, and a response from the printer controller 14 to the upper level device 10 with respect to the notification. At the time of a response in the job start and the job end, a job identifier (JOBID) for identifying a job is transmitted from the printer controller 14 to the upper level device 10.

The information indicating a printer status and a printing process includes a printing process reception start notification, a request/notification of printer information, a printing process start notification, a printing process request, a data transfer completion notification, a data reception completion notification, a printing process completion notification, a process status report, a service control (SC) notification, and an error occurrence and removal notification.

As for the printing process reception start notification, the printer device 13 notifies the upper level device 10 that the printer controller 14 is ready to receive a printing process. The request/notification of printer information includes a request of necessary printer information from the upper level device 10 to the printer controller 14, as well as a response to the request from the printer controller 14 to the upper level device 10.

The printing process start notification includes a notification from the upper level device 10 to the printer controller 14 indicating that the preparation of the print image data is completed and a response to the notification from the printer device 13 to the upper level device 10. The notification indicating that the preparation of the print image data is completed is notified in accordance with the sequence of the output of the print image data, page-by-page (process-by-process). It can be said that the page is a print unit by which a series of printing operation is performed.

The printing process request includes a notification of printing process from the printer controller 14 to the upper level device 10 and a response to the notification from the upper level device 10 to the printer controller 14. The printer controller 14 notifies the upper level device 10 of color information (yellow, cyan, magenta, or black) indicating the colors Y, C, M, and K to perform printing, a process identification number (process ID), and a plane identification number. Incidentally, the plane corresponds to each image based on each color print image data to be printed in one page. The printer controller 14 notifies these kinds of information for every plane in accordance with the sequence of requests from engine, i.e. the data transfer control units 30a, 30b, 30c and 30d. That is, the printer engine 15 retrieves the print image data composed of bitmap data from the upper level device 10.

As for the data transfer completion notification, the completion of transferring the print image data as for the requested plane is notified from the upper level device 10 to the printer controller 14. As for the data reception completion notification, the completion of receiving the print image data as for the requested plane is notified from the printer controller 14 to the upper level device 10. As for the printing process completion notification, the completion of print request for all pages (process) is notified from the upper level device 10 to the printer controller 14. As for the process status report, the print status of pages (process) is notified from the printer controller 14 to the upper level device 10. At this time, the printer controller 14 acquires from the printer engine 15 the information about feeding or discharging of sheets or the information about the print start timing, and adds the acquired information to the completion notification. Then, the notification to which the acquired information is added is transmitted to the upper level device 10.

As for the SC notification, an acquisition of obstacle information is requested from the upper level device 10 to the printer controller 14. The obstacle information acquired according to the request is notified from the printer controller 14 to the upper level device 10. As for the error occurrence and removal, an occurrence of any error and a removal thereof at the upper level device 10 is notified from the upper level device 10 to the printer controller 14.

The information indicating printing conditions includes setting the printing conditions, that is, a notification of the printing conditions from the upper level device 10 to the printer controller 14 and a response from the printer controller 14 to the notification. Examples of the printing conditions include a printing form, a printing type, feeding/discharging information, printing surface order, a printing paper size, a print data size, resolution and gradation, and color information.

The printing form indicates, for example, whether both-sided printing or a single-sided printing is performed on the printing paper 201. The printing type indicates whether print image data exists and thus the print image data is printed or the print image data does not exist and thus a white page is output without printing the print image data. The feeding/discharging information indicates identification information, such as a stacker of a discharging destination or a feeding origin of the printing paper 201. The printing surface order indicates whether printing is performed from a front surface to a back surface of the printing paper 201 or is performed from the back surface to the front surface. The printing paper size indicates, for example, the length of a page to be printed in a conveyance direction of the printing paper 201, when continuous paper is used as the printing paper 201. The print data size indicates a data size of the print image data. That is, the print data size indicates a size of the print image data corresponding to one page. The resolution and gradation indicates resolution and gradation of the case where the print image data is printed on the printing paper 201. The color information indicates, for example, whether to perform printing using a full color in which the colors Y, C, M, and K are used, or to perform printing using a single color in which only the color K is used.

The information indicating the connection includes registration and release, and specifically includes registration of information in each opponent between the upper level device 10 and the printer controller 14, and release of the registered information.

Printing Sequence

Figure 10:
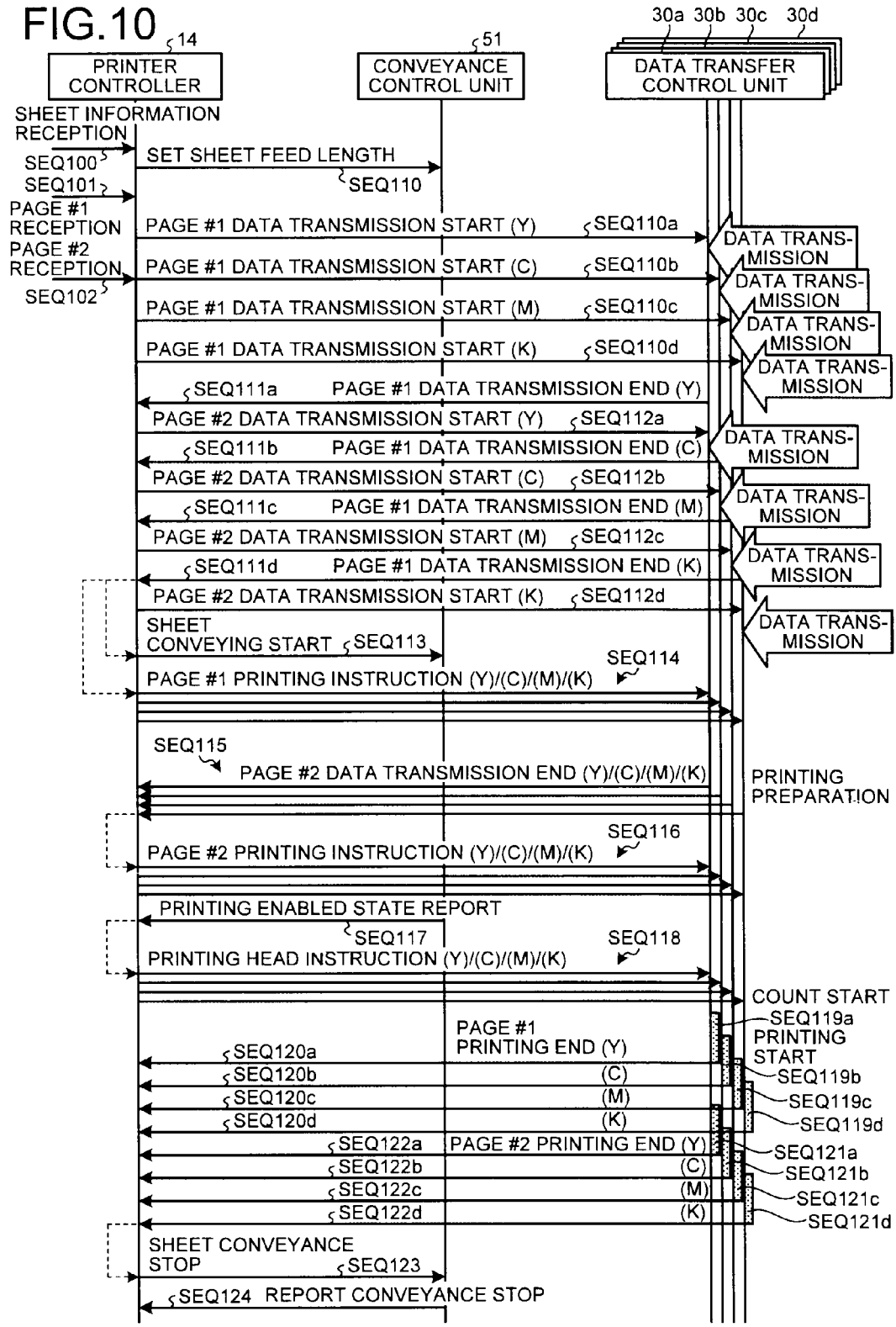
FIG. 10 is a sequence diagram conceptually illustrating an example of printing process which can be applied to an embodiment.

Next, a printing process which can be applied to each embodiment will be described. FIG. 10 is a sequence diagram conceptually illustrating an example of a printing process which can be applied to each embodiment. Here, it is assumed that the printer device 13 includes only the station 250a from among the stations 250a and 250b (that is, one printer engine 15 is provided), and performs full-color printing using the colors of Y, C, M, and K. The printer controller 14 receives information relating to the printing paper 201 as control information from the upper level device 10 (SEQ100), and then sets the sheet feed length for the conveyance control unit 51 on the basis of the received information (SEQ110). The sheet feed length is, for example, the size of one page in the conveyance direction.

The printer controller 14 receives control information representing the job start of the first page (page #1) from the upper level device 10 (SEQ101), creates a transmission management table described below on the basis of the received control information and sheet information received in SEQ100, and requests the data transfer control units 30a, 30b, 30c, and 30d to start data transmission of a page identifier representing the first page and a page represented by the page identifier for each color of C, Y, M, and K in accordance with the created transmission management table (SEQ110a, SEQ110b, SEQ110c, and SEQ110d). The data transfer control unit 30a requests the upper level device 10 for printing image data of the first page of the color Y through the data line 11a according to the request, and stores printing image data of the first page of the color Y transmitted from the upper level device 10 in the memory 31a in response to the request.

Similar to the data transfer control unit 30a, the data transfer control units 30b, 30c, and 30d request the upper level device 10 to transmit the print image data of the individual colors C, M, and K of the first page through the data lines 11b, 11c, and 11d according to the requests from SEQ110b, SEQ110c, and SEQ110d. Each of the data transfer control units 30b, 30c, and 30d stores the print image data of the first page of the individual colors C, M, and K transmitted from the upper level device 10 according to the request in the memories 31b, 31c, and 31d.

In the example of FIG. 10, while data transmission of the first page is requested from the printer controller 14 to each of the data transfer control units 30a, 30b, 30c, and 30d, the printer controller 14 receives control information representing the job start of the next second page transmitted from the upper level device 10 (SEQ102). The printer controller 14 creates a transmission management table described below on the basis of the received control information and stores the transmission management table in, for example, the RAM 323.

Once the print image data transfer of the first page of each color from the upper level device 10 ends, each of the data transfer control units 30a, 30b, 30c, and 30d notifies the printer controller 14 of the end of the transmission (SEQ111a, SEQ111b, SEQ111c, and SEQ111d). The printer controller 14 requests each of the data transfer control units 30a, 30b, 30c, and 30d to start the data transfer of the second page (page #2), in response to the notification (SEQ112a, SEQ112b, SEQ112c, and SEQ112d).

Each of the data transfer control units 30a, 30b, 30c, and 30d requests the upper level device 10 to transmit the print image data of the second page of each color, according to the request, and stores the print image data of the second page of each color transmitted from the upper level device 10 in the memories 31a, 31b, 31c, and 31d, according to the request.

Each of the data transfer control units 30a, 30b, 30c, and 30d can recognize the end of the data transfer on the basis of the data amount of the transmitted print image data. The information indicating the data amount of the printing image corresponding to one page, for example, is added to the head of the print image data by the upper level device 10 and is transmitted, when the data transfer starts with respect to each of the data transfer control units 30a, 30b, 30c, and 30d. In a case that a predetermined unit of the print image data is transferred, it may be configured that the upper level device 10 adds any end information for indicating the completion of transferring one page to the last transferred unit of the print image data corresponding to the end of one page. Alternatively, it may be configured that the upper level device 10 transmits any information for indicating the completion of transferring the print image data corresponding to one page to each transfer control unit 30a, 30b, 30c and 30d independently of the print image data, for example immediately after the print image data corresponding to one page is transferred.

Meanwhile, once the printer controller 14 receives the notification of the completion of transferring the data of the first page from all of the data transfer control units 30a, 30b, 30c, and 30d, the printer controller 14 requests the conveyance control unit 51 to start the paper conveyance (SEQ113). The conveyance control unit 51 starts conveyance at a predetermined speed of the printing paper 201 according to the request. The printer controller 14 requests the conveyance control unit 51 to start the paper conveyance and instructs each of the data transfer control units 30a, 30b, 30c, and 30d to start printing of the first page (SEQ114).

If the printing paper 201 reaches a predetermined position, the conveyance control unit 51 notifies the printer controller 14 of a printing enabled state (SEQ117). The printer controller 14 instructs each of the data transfer control units 30a, 30b, 30c and 30d of the print start position, according to the printing enabled state report from the conveyance control unit 51 (SEQ118).

Each of the data transfer control units 30a, 30b, 30c and 30d starts the printing operation according to the print start position instruction. In this example, the heads of the individual colors Y, C, M, and K are arranged in order of the heads 56a, 56b, 56c, and 56d along a conveyance direction of the printing paper 201. In this case, once the print start position of the first page in the printing paper 201 reaches a position to be printed by the head 56a, the data transfer control unit 30a firstly starts reading out the print image data of the first page from the memory 31a. The print image data of the color Y read from the memory 31a is transmitted to the image output unit 50. The print image data is supplied to the head 56a through the output control unit 55 and printing with respect to the printing paper 201 is performed (SEQ119a). Once printing the first page of the color Y is completed, the completed of the printing is notified to the printer controller 14 (SEQ120a).

Next, once the print start position of the first page in the printing paper 201 reaches a position to be printed by the head 56b, the data transfer control unit 30b starts reading out the print image data of the first page from the memory 31b. The print image data of the color C read from the memory 31b is transmitted to the image output unit 50. The print image data is supplied to the head 56b through the output control unit 55 and printing with respect to the printing paper 201 is performed (SEQ119b). Once printing the first page of the color C ends, the end of the printing is notified to the printer controller 14 (SEQ120b).

Hereinafter, in the same way as mentioned above, the printing operations with the colors M and K are sequentially started (SEQ119c and SEQ119d). Once the printing operations with the colors M and K are completed, the completion of the printing operation is notified to the printer controller 14 (SEQ120c and SEQ120d).

Meanwhile, once transferring each color print image data of the second page started at SEQ112a to SEQ112d are completed, each of the data transfer control units 30a, 30b, 30c and 30d notifies the printer controller 14 of the completion of transferring the data (SEQ115). The printer controller 14 instructs each of the data transfer control units 30a, 30b, 30c and 30d to start printing the second page, according to the data transfer completion notification (SEQ116).

Each of the data transfer control units 30a, 30b, 30c and 30d starts to print the second page after the completion of printing the first page. For example, when the print start position of the second page in the printing paper 201 reaches a position to be printed by the head 56a after the completion of printing the first page (SEQ120a), the data transfer control unit 30a reads out the print image data of the color Y of the second page from the memory 31a, supplies the print image data to the image output unit 50, and starts printing on the printing paper 201 (SEQ121a). Once the printing operation of the color Y is completed, the completion of the printing operation is notified to the printer controller 14 (SEQ122a).

In the same way, also in the data transfer control units 30b, 30c, and 30d, when the print start position of the second page reaches each position to be printed by the heads 56b, 56c, and 56d, each color print image data is read from the memories 31b, 31c and 31d, respectively, and printing with respect to the printing paper 201 is started (SEQ121b to SEQ121d). When the printing operation of each color is completed, the completion of the printing operation of each color is notified to the printer controller 14 (SEQ122b to SEQ122d).

Once the printer controller 14 receives the printing process completion notification of the color K of the second page from the data transfer control unit 30d, the printer controller 14 assumes that the printing operation of the final page according to the print job ends and requests the conveyance control unit 51 to stop conveyance of the printing paper 201 (SEQ123). The conveyance control unit 51 stops conveyance of the printing paper 201 according to the request and reports the stop of conveyance to the printer controller 14 (SEQ124). Thereby, a series of printing processes terminates.

Detail of Printing Process

Next, a printing process applicable to each embodiment will be described in detail. In each embodiment, each of the data transfer control units 30a to 30d acquires control information to control printing, from the upper level device 10, under the control of the printer controller 14. Each of the data transfer control units 30a to 30d stores print image data of each color transmitted from the upper level device 10 in the memories 31a to 31d, under the control of the printer controller 14.

A data transfer process of the print image data that can be applied to each embodiment will be described using flowcharts of FIGS. 11A to 11D. Hereinafter, the data lines 11a, 11b, 11c, and 11d transmit print image data of the colors Y, C, M and K, respectively, and the data transfer control units 30a, 30b, 30c and 30d control the transfer of the print image data of the colors Y, C, M and K, respectively.

Figure 11A:
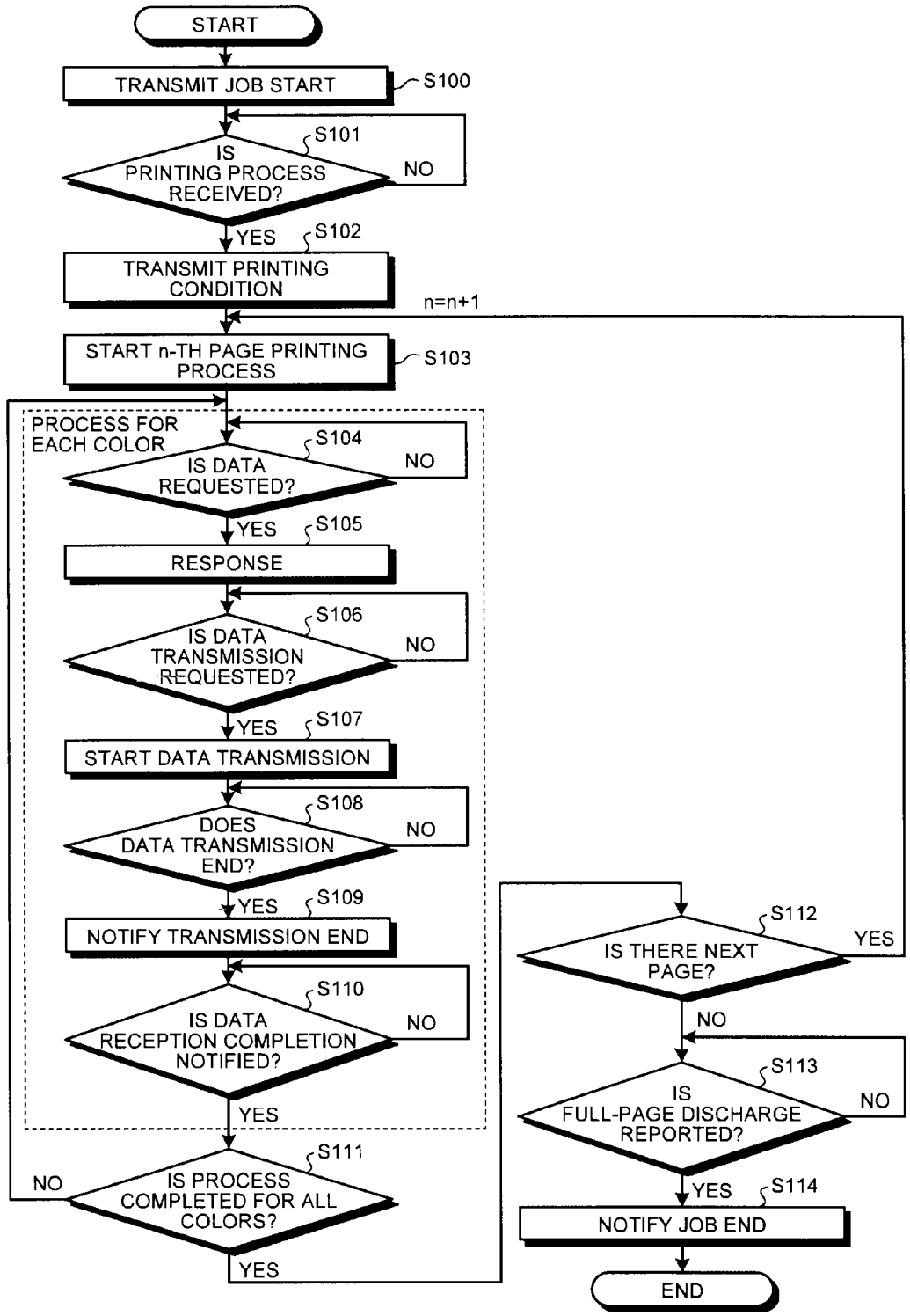
FIG. 11A is a flowchart illustrating an example of a process of an upper level device which can be applied to an embodiment.

FIG. 11A is a flowchart illustrating an example of a process in the upper level device 10 relating to data transfer. Once the upper level device 10 receives job data from the host device 5, the upper level device 10 transmits control information indicating a job start to the printer controller 14 through the control line 12, in step S100. The upper level device 10 stands by a control signal that is transmitted from the printer controller 14 in response to the control signal and indicates printing process reception (step S101).

Once the upper level device 10 receives the control signal indicating the printing process reception from the printer controller 14, the upper level device 10 transmits control information indicating printing conditions in job data to the printer controller 14 through the control line 12 in step S102. Next, in step S103, the upper level device 10 sets a page number to "n" and transmits a control signal to control a printing process start of the n-th page to the printer controller 14 through the control line 12. The processes from step S103 to step S112 are executed in a page unit.

The processes of steps S104 to S110 become processes that are executed on the individual colors of Y, C, M, and K. Hereinafter, a process that is related to the color Y will be mainly described. In step S104, the upper level device 10 stands by a request for transmission of the print image data of the color Y from the printer controller 14. Once the upper level device 10 receives a data transfer request transmitted from the printer controller 14 through the control line 12, the upper level device 10 returns a response to the received data request to the printer controller 14 in step S105. Next, in step S106, the upper level device 10 stands by a data transfer request that is transmitted from the data transfer control unit 30a through the data line 11a.

Once the upper level device 10 receives the data transfer request from the data transfer control unit 30a through the data line 11a, the upper level device 10 starts the transfer of the print image data of the color Y with respect to the data transfer control unit 30a in step S107. The print image data of the color Y is transmitted to the data transfer control unit 30a through the data line 11a. At this time, the upper level device 10 adds information indicating a size of the print image data to the transmitted print image data of the color Y.

In step S108, the upper level device 10 stands by the completion of transferring the data corresponding to one page of the color Y. Referring to FIG. 2B, the upper level device 10 monitors the storage unit 122 and the interface 123 using the control unit 124 and determines whether transferring the data corresponding to one page is performed with respect to the individual colors Y, C, M, and K. When it is determined that the transfer of the data corresponding to one page of the color Y terminates, the upper level device 10 makes the process proceed to step S109 and the data transfer completion notification indicating that the transfer of the data corresponding to one page terminates is transmitted to the printer controller 14 through the control line 12. In step S110, the upper level device 10 stands by a data reception completion notification with respect to the color Y, from the printer controller 14.

In step S111, the upper level device 10 determines whether the data reception completion notification is received for all of the colors Y, C, M, and K. When it is determined that the data reception completion notification is not received, the process returns to step S104 and the upper level device 10 executes a process on the next color.

In FIG. 11A, the processes of steps S104 to S110 has been described to be sequentially executed with respect to the individual colors Y, C, M, and K. However, the present invention is not limited thereto. For example, the processes of steps S104 to S110 may be executed in parallel with respect to the individual colors Y, C, M, and K. In this case, in step S111, the upper level device 10 stands by the data reception completion notification in step S110 in the processes of the individual colors Y, C, M, and K.

Once the upper level device 10 determines that the data reception completion notifications is received with respect to all of the colors of Y, C, M, and K in step S111, the upper level device 10 makes the process proceed to step S112 and determines whether a printing process of the next page is executed. The number of pages to be printed can be acquired from the print job data that is received from the host device 5. When it is determined that the printing process of the next page exists, the page number n becomes n+1 and the process returns to step S103.

Meanwhile, when it is determined that transmission of the data corresponding to all of the pages in the print job data terminates, the upper level device 10 makes the process proceed to step S113 and stands by transmission of a discharging report of all of the pages from the printer controller 14. When the upper level device 10 receives the discharging report of all of the pages from the printer controller 14, the upper level device 10 makes the process proceed to step S114 and the upper level device 10 transmits a job end notification indicating that all of the print jobs end to the printer controller 14 through the control line 12.

Figure 11B:
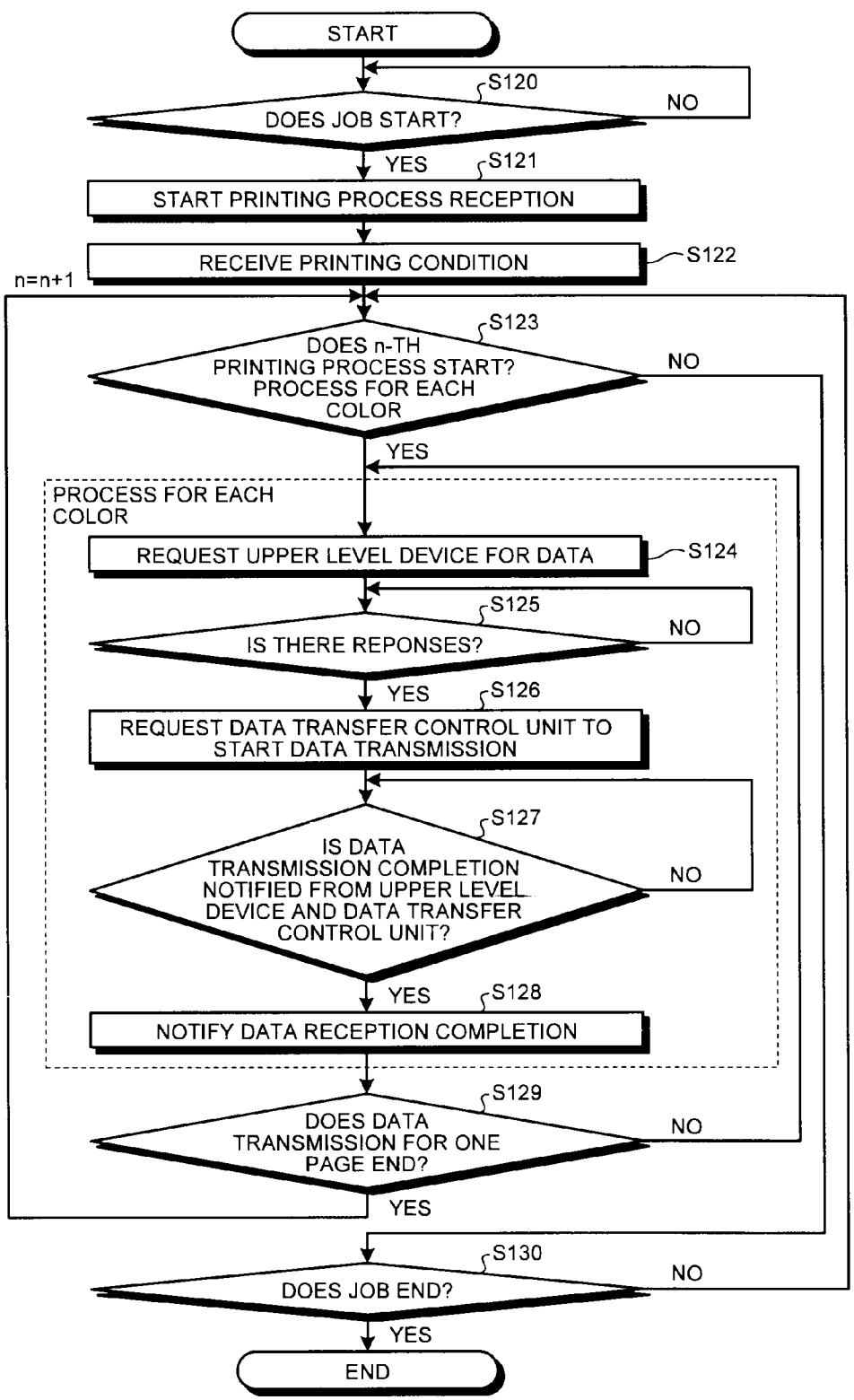
FIG. 11B is a flowchart illustrating an example of a process of a printer controller which can be applied to an embodiment.

FIG. 11B is a flowchart illustrating an example of a process in the printer controller 14 according to data transmission. In Step S120, the printer controller 14 waits for control information which represents the job start and is transmitted from the upper level device 10 through the control line 12. After receiving the control information, in Step S121, the printer controller 14 returns a response to the upper level device 10 through the control line 12. In Step S121, the printer controller 14 transmits control information representing a printing process reception start to the upper level device 10 through the control line 12. In Step S122, control information is received which represents a printing condition transmitted from the upper level device 10 through the control line 12. The printer controller 14 creates a transmission management table described below with reference to FIG. 21 on the basis of the received control information and holds the transmission management table.

In the next step S123, the printer controller 14 determines whether the control signal transmitted from the upper level device 10 through the control line 12 and indicating the printing process start of the n-th page is received. When it is determined that the control signal is not received, the printer controller 14 makes the process proceed to step S130 and determines whether the job end notification is received from the upper level device 10 through the control line 12. When it is determined that the job end notification is not received, the process returns to step S123. Meanwhile, when it is determined that the job end notification is received in step S130, a series of printing processes terminates.

In step S123, when it is determined that the control signal transmitted from the upper level device 10 through the control line 12 and indicating the printing process start is received, the printer controller 14 makes the process proceed to step S124. The subsequent processes of steps S124 to S128 become the processes of the individual colors Y, C, M, and K. In this case, a transfer process of the print image data of the color Y will be described.

In step S124, the printer controller 14 requests the upper level device 10 to transfer the print image data through the control line 12. Next, in step S125, the printer controller 14 stands by a response from the upper level device 10 with respect to the request. Once the printer controller 14 receives the response from the upper level device 10, the printer controller 14 requests the data transfer control unit 30a to start to transfer the data through the engine I/F control line 40a in step S126.

At this time, the printer controller 14 extracts at least a page identifier PBID representing a page (n-th page) to be printed and a transmission source address representing the address of the transmission source of printing image data from the held transmission management table. The printer controller 14 attaches the extracted page identifier PBID and transmission source address to a data transmission start request to request the start of data transmission and transmits the data transmission start request to, for example, the data transfer control unit 30a.

In next step S127, the printer controller 14 stands by the data transfer completion notification from the upper level device 10 and the data transfer completion notification from the data transfer control unit 30a. Once the data transfer completion notification is received from the upper level device 10 and the data transfer control unit 30a through the control line 12 and the engine I/F control line 40a, the printer controller 14 makes the process proceed to step S128 and transmits the data reception completion notification with respect to the color Y to the upper level device 10 through the control line 12.

In step S129, the printer controller 14 determines whether the data transfer of all of the colors of Y, C, M, and K terminates. When it is determined that the data transfer does not terminate, the printer controller 14 makes the process to return to step S124 and executes the process with respect to the next color. Meanwhile, when it is determined that the data transfer of all of the colors Y, C, M, and K ends in step S129, the printer controller 14 sets the page number "n" to "n+1" and returns the process to step S123.

In FIG. 11B, the processes of steps S124 to S128 are sequentially executed with respect to the individual colors Y, C, M, and K. However, the present invention is not limited thereto. For example, the processes of steps S124 to S128 may be executed in parallel with respect to the individual colors Y, C, M, and K. In this case, in step S129, the printer controller 14 stands by the data reception completion notification in step S128 in the processes of the individual colors Y, C, M, and K.

The printer controller 14 transmits a printing instruction to the data transfer control units 30a to 30d through each of the engine I/F control lines 40a to 40d. By the printing instruction, the print image data is read from the memories 31a to 31d in the data transfer control units 30a to 30d and printing of the print image data with respect to the printing paper is executed.

The printing instructions that are transmitted from the printer controller 14 to the individual data transfer control units 30a to 30d can be generated as a table based on information needed to perform printing, which is setting information of printing conditions, among the control information described using FIG. 9. The printer controller 14 transmits the table generated in the above-described way to each of the data transfer control units 30a to 30d.

Figure 11C:
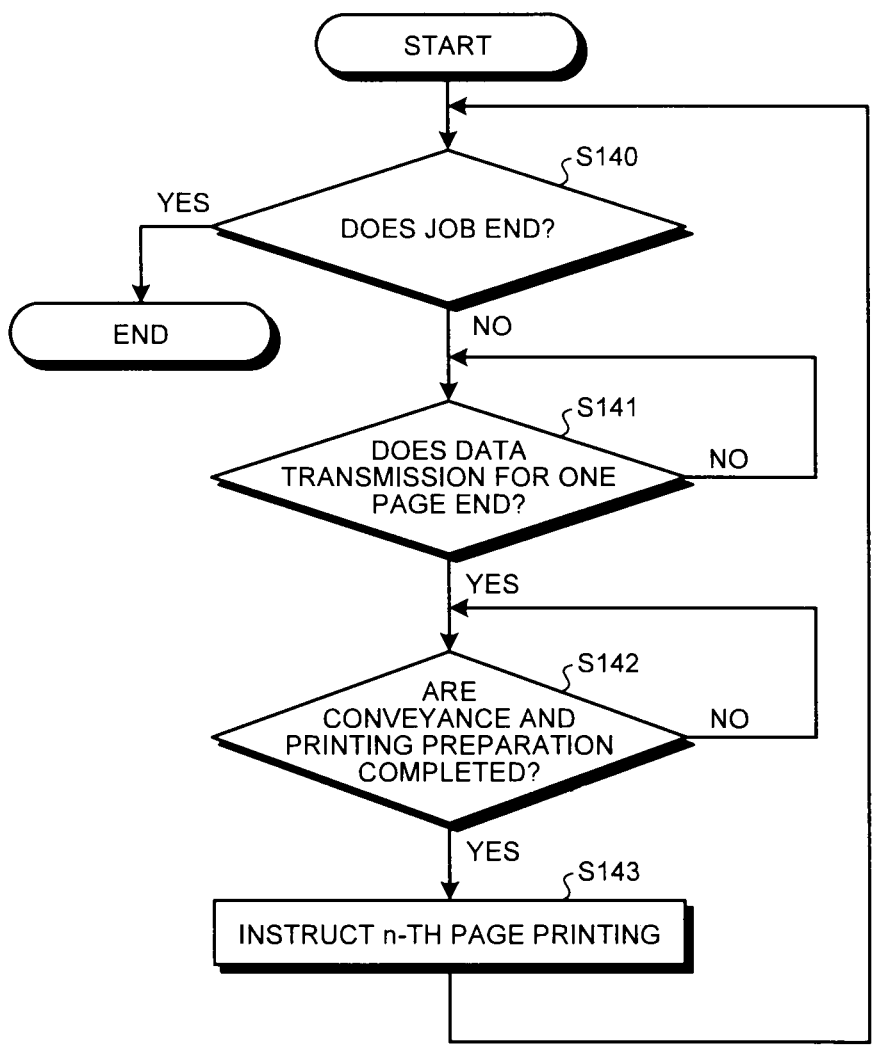
FIG. 11C is a flowchart illustrating an example of a process of a printing instruction of a printer controller which can be applied to an embodiment.

FIG. 11C is a flowchart illustrating an example of a process that is executed when the printer controller 14 instructs printing. Before the flowchart is executed, the printer controller 14 transmits a printing preparation instruction to the conveyance control unit 51.

In step S140, the printer controller 14 determines whether the job end notification is transmitted from the upper level device 10. When it is determined that the job end notification is transmitted, the printer controller 14 terminates a series of processes. When it is determined that the job end notification is not transmitted from the upper level device 10, the printer controller 14 makes the process proceed to step S141.

In step S141, the printer controller 14 stands by the completion of transferring the print image data corresponding to at least one page with respect to each of the colors Y, C, M, and K. When it is determined that the transfer of the print image data corresponding to one page terminates, the printer controller 14 makes the process proceed to step S142 to stand by reception of a response indicating the printing preparation completion from the conveyance control unit 51. Once the printer controller 14 receives the response indicating the printing preparation completion transmitted from the conveyance control unit 51 through the conveyance control line 41, the printer controller 14 transmits a printing instruction to instruct to perform printing of the n-th page to the data transfer control units 30a to 30d through the engine I/F control lines 40a to 40d, respectively in step S143.

FIG. 11D is a flowchart illustrating an example of a process in each of the data transfer control units 30a to 30d relating to the data transfer. In this case, in order to simplify the description, the process in the color Y and the data transfer control unit 30a will be described. In step S150, the data transfer control unit 30a stands by a data transfer start request that is transmitted from the printer controller 14 through the engine I/F control line 40a.

Once the data transfer control unit 30a receives the data transfer start request, the data transfer control unit 30a transmits a data transfer request to request to transfer the print image data of the color Y to the upper level device 10 through the data line 11a in step S151. The print image data of the color Y that is transmitted from the upper level device 10 through the data line 11a according to the data transfer request is received by the data transfer control unit 30a (step S152). The data transfer control unit 30a controls a data transfer DMA 133a and stores the received print image data of the color Y in a predetermined area of the memory 31a (step S153).

In step S154, the data transfer control unit 30a determines whether the transfer of the print image data of the color Y from the upper level device 10 terminates. The data transfer control unit 30a can determine whether the transfer of the print image data terminates, on the basis of size information added to the transferred print image data. When it is determined that the transfer of the print image data does not terminate, the data transfer control unit 30a makes the process return to step S152 and continues to receive data and store the data in the memory 31a. Meanwhile, when it is determined that the transfer of the print image data terminates, the process proceeds to step S155. The data transfer control unit 30a transmits the data transfer completion notification to the printer controller 14 through the engine I/F control line 40a. Then, the process returns to step S150.

Figure 12B:
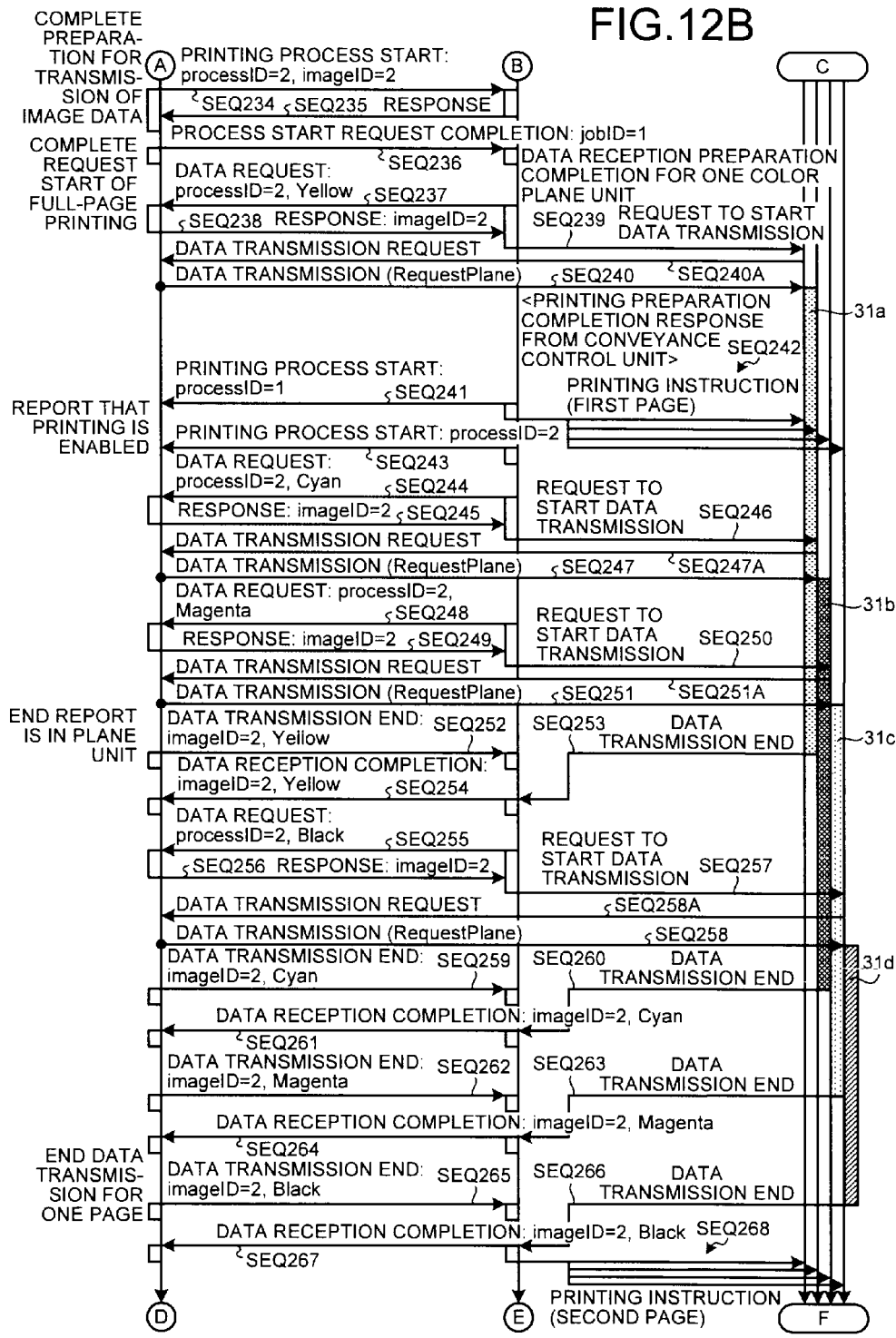
FIG. 12B is a sequence diagram specifically illustrating an example of a printing process which can be applied to an embodiment.
Figure 12C:
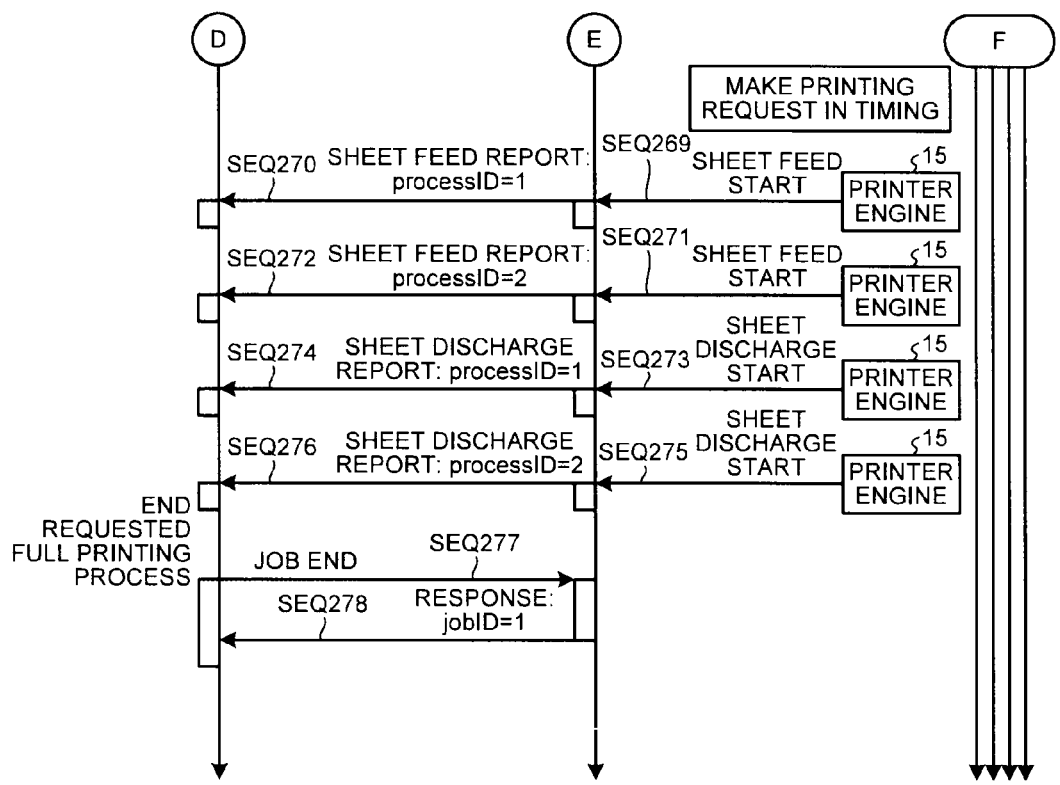
FIG. 12C is a sequence diagram specifically illustrating an example of a printing process which can be applied to an embodiment.

FIGS. 12A to 12C are sequence diagrams illustrating a specific example of a printing process which is performed in accordance with each flowchart of FIGS. 11A to 11D and can be applied to each embodiment. In FIGS. 12A to 12C, reference signs A to F represent that a process is changed to a corresponding reference sign between different drawings. Hereinafter, it is assumed that the printer device 13 includes only the station 250a from among the stations 250a and 250b (that is, one printer engine 15 is provided), and a print job is printing of two pages in total.

Referring to FIG. 12A, first, control information of the print job is transmitted from the upper level device 10 to the printer controller 14 through the control line 12 (SEQ200). The printer controller 14 transmits control information indicating the job identifier jobID=1 responding to the control information to the upper level device 10 through the control line 12 (SEQ201). The printer controller 14 acquires resources to execute a job according to the start of the job. The printer controller 14 transmits control information indicating a printing process reception start to the upper level device 10 through the control line 12 (SEQ202).

Next, the upper level device 10 transmits control information to determine printing conditions to the printer controller 14 through the control line 12 (SEQ203). The printing conditions that are set to the printer controller 14 include a printing form, a printing type, feeding/discharging information, order of printing surfaces, a size of printing paper, a data size of print image data, resolution and gradation, and color information as described with reference to FIG. 9. Further, the printing conditions may include information of the number of pages to be printed. Once the control information is received in the printer controller 14, the various printing conditions that are included in the received control information are written in a register of the printer controller 14, for example, and the printing conditions are set.

Next, the upper level device 10 transmits the control information of the printing process start of the first page to the printer controller 14 through the control line 12 (SEQ204). The control information includes a process identification number processID=1 to identify the process and an image identification number imageID=1 indicating an image constituting the first page. The printer controller 14 returns control information of the printing process start to be a response to the printing process start, to the upper level device 10 (SEQ205).

Next, the printer controller 14 transmits control information of the printing process request to the upper level device 10 and requests the upper level device 10 to transmit the print image data. The printing process request is sequentially processed in arrangement order of the colors of the printer engine 15, with respect to the individual colors Y, C, M, and K. In this example, the heads of the colors Y, C, M, and K along a conveyance direction of the printing paper 201 are arranged in order of the heads 56a, 56b, 56c, and 56d.

First, the printer controller 14 transmits the control information of the printing process request to request to transmit the print image data of the color Y to the upper level device 10 through the control line 12 (SEQ206). The control information includes process identification number processID=1 to designate a process and color information Yellow to designate the color Y. The upper level device 10 returns the control information including the image identification number imageID=1 to the printer controller 14 in response to the control information (SEQ207). Once the printer controller 14 receives the control information, the printer controller 14 requests the data transfer control unit 30a corresponding to the color Y to start to transmit the print image data (SEQ208). At this time, the printer controller 14 transmits a data size of the print image data requiring the start of the transmission and the request to the data transfer control unit 30a.

The data transfer control unit 30a receives the request and requests the upper level device 10 to transmit the print image data of the plane of the color Y through the data line 11a (SEQ209A), and the print image data of the color Y is transmitted from the upper level device 10 to the data transfer control unit 30a (SEQ209) according to the request. The transmitted print image data is stored in an area in the memory 31a of the data transfer control unit 30a that is allocated for the print image data of the first page.

Hereinafter, the same processes as those of SEQ206, SEQ207, SEQ208, SEQ209A, and SEQ209 are repeated with respect to each of the other colors C, M, and K, the print image data of each color is transmitted from the upper level device 10 to the data transfer control units 30b, 30c, and 30d through the data lines 11b, 11c, and 11d and are stored in the areas of the memories 31b, 31c, and 31d that are allocated for the print image data of the first page (SEQ210 to SEQ221).

Once the print image data transfer of one plane completes, the upper level device 10 transmits the control information of the data transfer completion to the printer controller 14. The printer controller 14 transmits the control information of the reception completion of the print image data to the upper level device 10, according to the control information.

For example, once the print image data transfer of the plane of the color Y completes, the upper level device 10 transmits the control information of the data transfer completion including the image identification number imageID=1 and the color information Yellow to the printer controller 14 (SEQ222). Meanwhile, once the print image data transfer from the upper level device 10 through the data line 11a completes, the data transfer control unit 30a notifies the printer controller 14 of the completion of the transfer (SEQ223). The printer controller 14 transmits the control information of the data reception completion including the image identification number imageID=1 and the color information Yellow to the upper level device 10, in response to the notification (SEQ224).

Hereinafter, the same processes as those of SEQ222 to SEQ224 are repeated with respect to other colors C, M, and K, respectively, in accordance with the completion of transferring each print image data. And the control information of the data reception completion is transmitted to the upper level device 10 (SEQ225 to SEQ233).

After the printer controller 14 transmits the control information of the data reception completion with respect to the final print image data (that is, print image data of the color K) of the first page to the upper level device 10 at SEQ233, the printer controller 14 instructs the conveyance control unit 51 to prepare for printing. The conveyance control unit 51 starts to convey the printing paper 201 to the printing position, according to the instruction.

The description proceeds to FIG. 12B. Once the print image data transfer of each color of the first page is completed, the upper level device 10 transmits the control information of the printing process start of the second page to the printer controller 14 through the control line 12 (SEQ234). The control information includes the process identification number processID=2 to identify the process of the second page and the image identification number imageID=2 indicating the image constituting the second page. The printer controller 14 returns the control information of the printing process start to be a response to the printing process start to the upper level device 10 (SEQ235).

For example, when printing of the second page is performed, the printing process start request is completed by the processes of SEQ234 and SEQ235. For this reason, once the upper level device 10 receives the response to the printing process start request of the second page at SEQ235, the upper level device 10 transmits the control information of the process start request completion where the job identifier jobID=1 is designated to the printer controller 14, at SEQ236.

Next, similar to SEQ206 to SEQ221, the printer controller 14 transmits the control information of the printing process request to the upper level device 10 and requests the upper level device 10 to transmit the print image data. The printing process request is sequentially processed according to arrangement order of the colors in the printer engine 15, with respect to each of the colors Y, C, M, and K.

First, the printer controller 14 transmits the control information of the printing process request to request to transmit the print image data of the color Y to the upper level device 10 through the control line 12 (SEQ237). The control information includes the process identification number processID=2 to designate the process and the color information Yellow to designate the color Y. The upper level device 10 returns the control information including the image identification number imageID=2 to the printer controller 14, in response to the control information (SEQ238). Once the printer controller 14 receives the control information, the printer controller 14 requests the data transfer control unit 30a corresponding to the color Y to start to transmit the print image data (SEQ239).

The data transfer control unit 30a receives the request and requests the upper level device 10 to transmit the print image data of the plane of the color Y through the data line 11a (SEQ240A), and the print image data of the color Y is transmitted from the upper level device 10 to the data transfer control unit 30a according to the request (SEQ240). The transmitted print image data is stored in an area in the memory 31a of the data transfer control unit 30a that is allocated for the print image data of the second page.

Hereinafter, the same processes as those of SEQ237, SEQ238, SEQ239, SEQ240A, and SEQ240 are repeated with respect to each of the other colors C, M, and K, the print image data of each color is transmitted from the upper level device 10 to the data transfer control units 30b, 30c, and 30d through the data lines 11b, 11c, and 11d and are stored in the areas of the memories 31b, 31c, and 31d that are allocated for the print image data of the second page (SEQ244 to SEQ251 and SEQ255 to SEQ258).

Similar to the above case, the upper level device 10 transmits the control information of the data transfer completion to the printer controller 14, whenever the transmission of the print image data of one plane ends. The printer controller 14 transmits the control information of the reception completion of the print image data to the upper level device 10, in response to the control information.

In the example of FIG. 12B, once the print image data transfer of the color Y at SEQ240 completes, the upper level device 10 transmits the control information of the data transfer completion to the printer controller 14 (SEQ252). Once the print image data transfer from the upper level device 10 through the data line 11a completes, the data transfer control unit 30a transmits the notification indicating the completion of the transfer to the printer controller 14 (SEQ253). The printer controller 14 transmits the control information of the data reception completion including the image identification number imageID=2 and the color information Yellow to the upper level device 10, in response to the notification (SEQ254).

Hereinafter, the same processes as those of SEQ252 to SEQ254 are repeated with respect to each of the other colors C, M, and K according to the completion of transferring each print image data, and the control information of the data reception completion is transmitted to the upper level device 10 (SEQ259 to SEQ267).

In the example of FIG. 12B, the response indicating that the printing preparation from the conveyance control unit 51 is completed according to the instruction of the printing preparation with respect to the conveyance control unit 51 immediately before SEQ234 described above is notified from the conveyance control unit 51 to the printer controller 14 immediately after SEQ240. Once the printer controller 14 receives the notification, the printer controller 14 transmits the two items of control information of the printing process start of the process identification number processID=1 and the process identification number processID=2 to the upper level device 10 (SEQ241 and SEQ243). Thereby, the notification indicating that it is ready to perform the printing of the first page and the second page is transmitted to the upper level device 10.

At the time point of SEQ241, the transfers of each color print image data of the first page with respect to the data transfer control units 30a, 30b, 30c, and 30d are completed. For this reason, the printer controller 14 notifies each of the data transfer control units 30a, 30b, 30c, and 30d of a printing instruction to perform printing of the first page (SEQ242). The printing instructions are stored in the memories 31a, 31b, 31c, and 31d in the data transfer control units 30a, 30b, 30c, and 30d. The actual print operation according to the printing instruction is executed by matching timing with timing of a print operation of a page to be executed hereinafter.

In the example of FIG. 12B, in the printer controller 14, the request with respect to the upper level device 10 of the print image data of the plane of the color C where transfer secondly starts is delayed due to transmission of the control information of the printing process start of SEQ241 and SEQ243 (refer to SEQ244). Due to the delay, the transfer of the print image data of the plane of the color Y where the transfer first starts may be completed before the transfer of the print image data of the plane of the color K starts (refer to SEQ253). After the notification process of the transfer completion of the print image data of the plane of the color Y (SEQ253), the transfer of the print image data of the plane of the color K starts (SEQ257 and SEQ258).

During the data transfer process of the first page illustrated in FIG. 12A, after the transfer of the print image data of each color is performed in order of the colors and the transfer of the print image data ends, the data transfer end process is executed in order of the colors. Meanwhile, during the data transfer process of the second page that is illustrated in FIG. 12B, the data transfer end process may start before the transmission of the print image data of each color ends.

As described above, the data transfer control units 30a, 30b, 30c, and 30d to control the transmission of the data of the colors Y, C, M, and K are independently configured and the printer controller 14 can independently communicate with the data transfer control units 30a, 30b, 30c, and 30d. The data transfer control units 30a, 30b, 30c, and 30d independently execute the process. For this reason, the process does not need to be changed, even though another process is interrupted during a series of processes executed by the data transfer control units 30a, 30b, 30c, and 30d.

At SEQ267, once the printer controller 14 notifies the upper level device 10 of completion of transmission of the print image data of the plane of the color K, the printer controller 14 notifies each of the data transfer control units 30a, 30b, 30c, and 30d of a printing instruction to instruct to perform printing of the second page (SEQ268).

The description proceeds to FIG. 12C. In the printer engine 15, printing of the first page is executed according to a printing instruction of SEQ242 and feeding of the printing paper 201 starts. The printer engine 15 notifies the printer controller 14 of the feeding start of the first page (SEQ269). Once the printer controller 14 receives the notification, the printer controller 14 transmits control information indicating that the process identification number processID is set to 1 and feeding of the first page starts, to the upper level device 10 (SEQ270). In addition, the printer controller 14 instructs the data transfer control units 30a, 30b, 30c, and 30d to execute printing in synchronization with each other. According to the printing instruction, the data transfer control units 30a, 30b, 30c, and 30d read the print image data of the colors Y, C, M, and K from the memories 31a, 31b, 31c, and 31d and sequentially execute printing of each plane of the first page with respect to the printing paper 201.

Similarly, once printing of the first page is completed and printing of the second page starts, the printer engine 15 notifies the printer controller 14 of the feeding start of the second page (SEQ271). Once the printer controller 14 receives the notification, the printer controller 14 transmits control information indicating that the process identification number processID is set to 2 and feeding of the second page starts, to the upper level device 10 (SEQ272). In addition, the printer controller 14 instructs the data transfer control units 30a, 30b, 30c, and 30d to execute printing in synchronization with each other. According to the printing instruction, the data transfer control units 30a, 30b, 30c, and 30d read the print image data of the colors Y, C, M, and K from the memories 31a, 31b, 31c, and 31d and sequentially execute printing of each plane of the second page with respect to the printing paper 201.

Once printing of each color of the first page ends and the first page of the printing paper 201 is discharged, the printer engine 15 notifies the printer controller 14 of the end of the printing and the discharge of the first page (SEQ273). Once the printer controller 14 receives the notification, the printer controller 14 transmits control information indicating that the process identification number processID is set to 1 and the printing paper 201 of the first page is discharged, to the upper level device 10 (SEQ274). Similar to the above case, once printing of each color of the second page ends and the second page of the printing paper 201 is discharged, the printer engine 15 notifies the printer controller 14 of the end of the printing and the discharge of the second page (SEQ275). The printer controller 14 transmits control information indicating that the process identification number processID is set to 2 and the printing paper 201 of the second page is discharged, to the upper level device 10, in response to the notification (SEQ276).

Once the upper level device 10 receives a discharge report corresponding to information indicating the number of pages to be printed included in the control information of setting of the printing conditions from the printer controller 14 at SEQ203, the upper level device 10 determines that the printing based on the job where the start is notified at SEQ200 ends, and transmits control information of the end of the job of the job identification number jobID=1 to the printer controller 14 (SEQ277). Once the printer controller 14 receives the control information, the printer controller 14 sets the job identification number jobID=1 and transmits control information of the response to the upper level device 10 (SEQ278). Accordingly, a series of printing processes ends.

As described above, the functions conventionally executed by each color data transfer control unit, such as the control of the transmission timing of the print image data from the upper level device 10 or the exchange of the control information with the upper level device 10, are collectively performed by the printer controller 14. The data transfer control units (data transfer control units 30a to 30d) that correspond to the individual colors only receive and read the print image data. For this reason, the transmission process of the print image data can be executed at a high speed.

The data transfer control units 30a, 30b, 30c, and 30d that control the transmission of the data of the individual colors Y, C, M, and K are independently configured. In addition, the printer controller 14 and the data transfer control units 30a, 30b, 30c, and 30d are connected by the engine I/F control lines 40a, 40b, 40c, and 40d, and communication between the printer controller 14 and the data transfer control units 30a, 30b, 30c, and 30d is independently performed by the data transfer control units 30a, 30b, 30c, and 30d. The data transfer control units 30a, 30b, 30c, and 30d independently execute the processes.

For this reason, the process does not need to be changed, even though another process is interrupted during a series of processes executed by the data transfer control units 30a, 30b, 30c, and 30d, from SEQ237 to SEQ266. Since the processes of the data transfer control units 30a, 30b, 30c, and 30d are independently executed, addition or removal of the data transfer control units 30a, 30b, 30c, and 30d can be easily performed and various variations of the system configuration can be provided with the common configuration.

Another Example of Data Transfer Process

Next, another example of the data transfer process will be described. In the above example, when the transfer process of the print image data of each color is executed, the upper level device 10 transfers the print image data of each color according to the data transfer request transmitted from the data transfer control units 30a to 30d of the individual colors through the data lines 11a to 11d. Meanwhile, in this example, the data transfer request is not transmitted from the data transfer control units 30a to 30d to the upper level device 10. After responding to the data request from the printer controller 14, the upper level device 10 directly transmits the print image data of each color to the data transfer control units 30a to 30d through the data lines 11a to 11d.

Figure 13A:
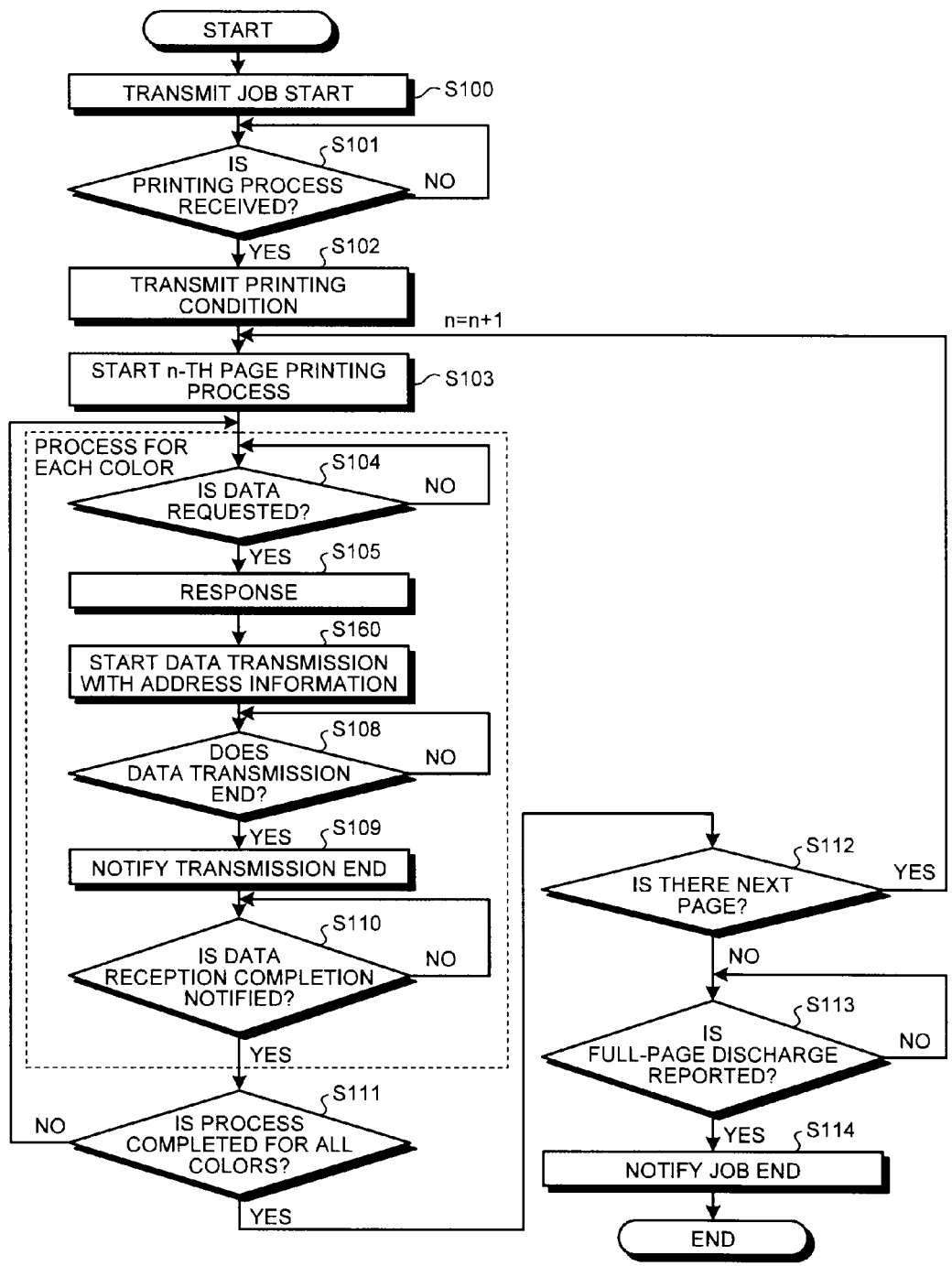
FIG. 13A is a flowchart illustrating another example of a process of an upper level device which can be applied to an embodiment.

The data transfer process of the print image data according to another example of the data transfer process will be described using flowcharts of FIGS. 13A and 13B. FIG. 13A is a flowchart illustrating an example of a process in the upper level device 10 according to the data transfer of this example. In FIG. 13A, the processes that are common to those of FIG. 11A described above are denoted by the same reference numerals and the redundant description will not be repeated.

As illustrated in the flowchart of FIG. 13A, the process of the upper level device 10 is the same as the process illustrated in FIG. 11A in the process until the response with respect to the data request from the printer controller 14 of step S105 is returned to the printer controller 14 from the transmission of the control information indicating the job start of step S100. Therefore, the redundant description will not be repeated.

In this example, after transmitting the response to the data request from the printer controller 14 to the printer controller 14 through the control line 12 in step S105, the upper level device 10 makes the process proceed to step S160. In step S160, the upper level device 10 transmits the print image data of the color Y to the data transfer control unit 30a through the data line 11a and stores the print image data in the memory 31a in the data transfer control unit 30a. At this time, the upper level device 10 adds the address information of the memory 31a to the transmitted print image data and transmits the print image data to the data transfer control unit 30a. The data transfer control unit 30a stores the print image data in the memory 31a, according to the address information added to the print image data.

The upper level device 10 executes the transmission process of the print image data of step S160 by the predetermined amount, for example, until the transmission of the print image data corresponding to one page ends. When it is determined that the transmission of the print image data ends in step S108, the upper level device 10 transmits the data transfer end notification to the printer controller 14 through the control line 12 in step S109, and stands by a response to the notification, from the printer controller 14, in step S110. Since the following processes are the same as those illustrated in FIG. 11A, the redundant description will not be repeated.

In this example, since the data transfer process and the printing instruction process in the printer controller 14 are the same as the processes descried using FIGS. 11B and 11C, the redundant description will not be repeated.

Figure 13B:
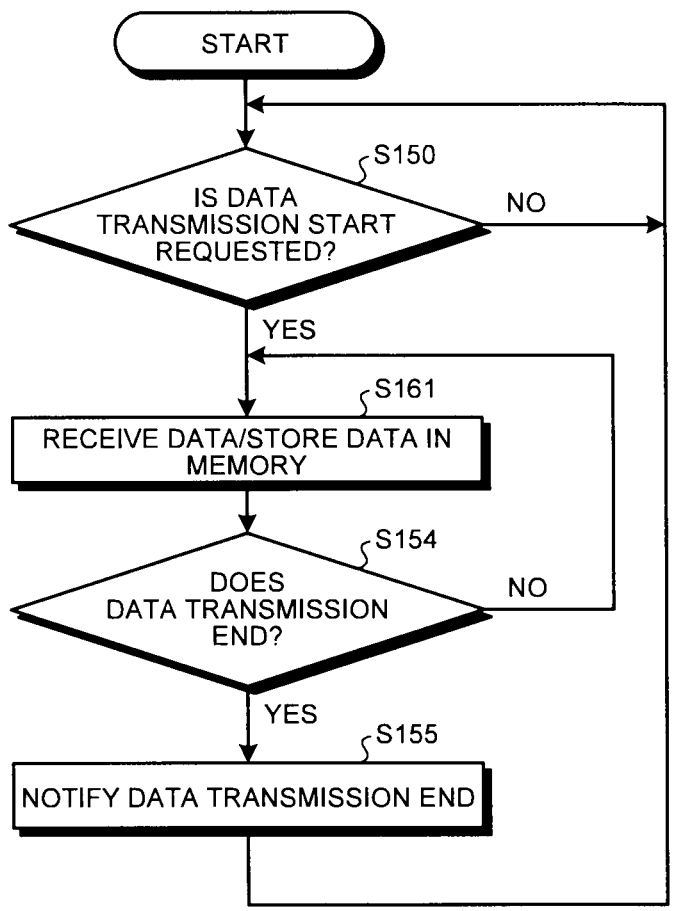
FIG. 13B is a flowchart illustrating another example of a process of a data transmission control unit which can be applied to an embodiment.

FIG. 13B is a flowchart illustrating another example of a process in the data transfer control unit 30a that is related to the data transfer. In FIG. 13B, components that are common to those of FIG. 11D are denoted by the same reference numerals and the redundant description will not be repeated.

In step S150, the data transfer control unit 30a stands by a data transfer start request transmitted from the printer controller 14 through the engine I/F control line 40a. Once the data transfer control unit 30a receives the data transfer start request from the printer controller 14, the data transfer control unit 30a makes the process proceed to step S161 and receives the print image data of the color Y transmitted from the upper level device 10 through the data line 11a. The data transfer control unit 30a stores the print image data in the memory 31a, according to the address information added to the print image data.

In step S154, the data transfer control unit 30a determines whether transmission of the print image data of the color Y from the upper level device 10 ends. For example, the data transfer control unit 30a determines whether the transmission of the print image data ends, on the basis of the size information added to the print image data transmitted by the upper level device 10. The upper level device 10 may transmit instruction information to the data transfer control unit 30a, when the transmission of the print image data ends. When it is determined that the transmission of the print image data does not end, the upper level device 10 makes the process return to step S161 and continuously receives the data and stores the data in the memory 31a.

Meanwhile, when it is determined that the transmission of the print image data ends, the upper level device 10 makes the process proceed to step S155 and transmits the data end notification to the printer controller 14 through the engine I/F control line 40a. Then, the process is returned to step S150.

As such, without transmitting the data transfer request from the data transfer control units 30a to 30d to the upper level device 10, after responding to the data request from the printer controller 14, the upper level device 10 may directly transfer the print image data of the individual colors to the data transfer control units 30a to 30d through the data lines 11a to 11d.

Batch Management of Memory

Next, the batch management of each of the memories 31a, 31b, 31c, and 31d by the input pointer and the output pointer will be described. In each embodiment, the management of the memories 31a to 31d in the data transfer control units 30a to 30d is performed in an integrated manner on the printer controller 14 side. Hereinafter, a case where printing image data is supplied from the upper level device 10 to the printer device 13 by bitmap data of the same size for the colors C, M, Y, and K will be described.

Figure 14:
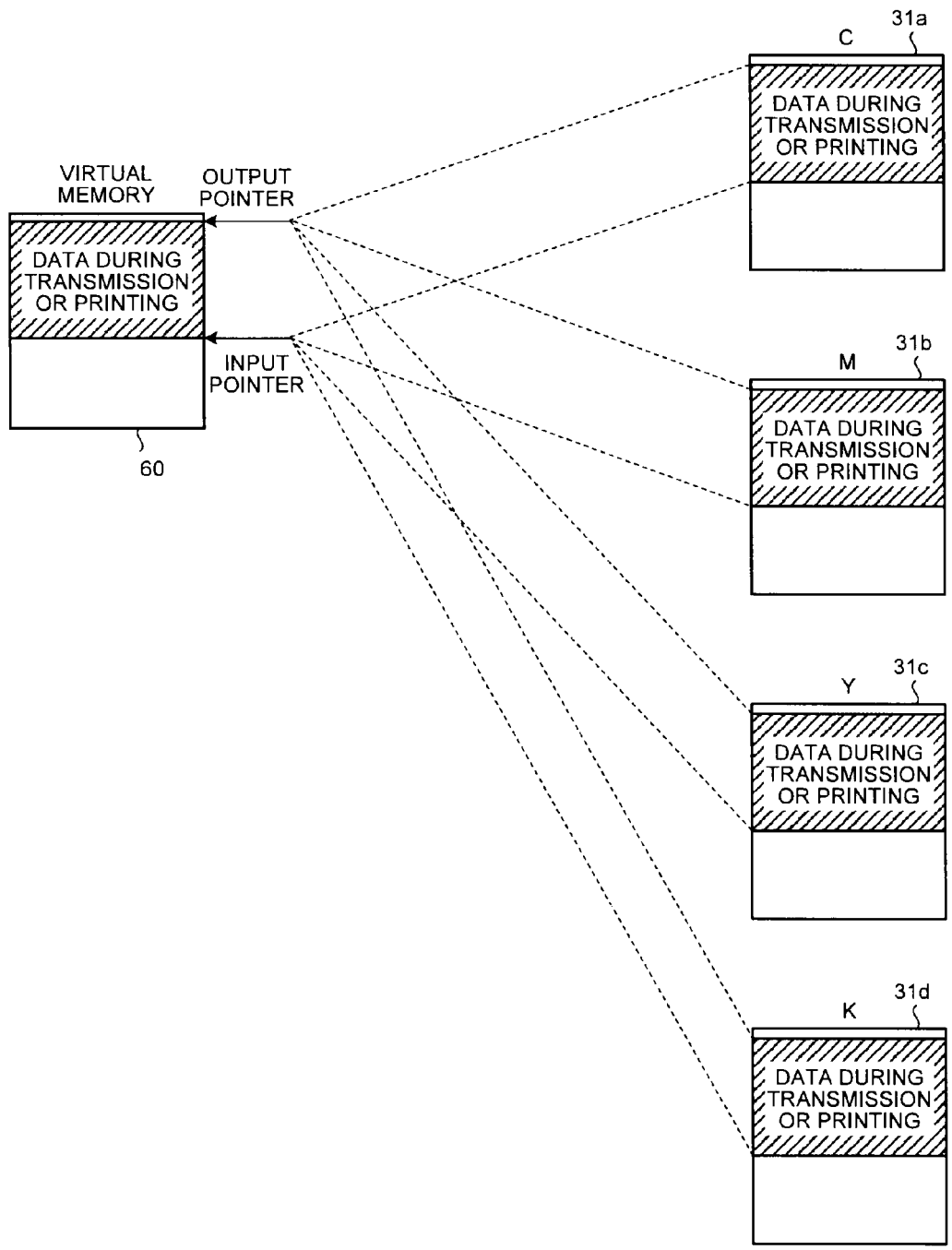
FIG. 14 is a schematic diagram for describing a virtual memory according to an embodiment.

In each embodiment, as illustrated in FIG. 14, a memory 60 (hereinafter, called a virtual memory 60), which is virtual and has the same memory space as the memory space of each of the memories 31a to 31d, is defined in the printer controller 14. The printer controller 14 manages, on the virtual memory 60, a head position (called an input pointer) where printing image data transmitted from the upper level device 10 is written in the memories 31a to 31d and a head address (called an output pointer) when printing image data is read from the memories 31a to 31d.

When the printer controller 14 performs the writing with respect to respective memories 31a to 31d, the controller 14 sends the address indicated by the input pointer to respective data transfer control units 30a to 30d. The respective data transfer control units 30a to 30d start to write the data using the address indicated by the input pointer sent from the printer controller 14 as the head address. Similarly, when the printer controller 14 performs the reading from respective memories 31a to 31d, the controller 14 sends the address indicated by the output pointer to respective data transfer control units 30a to 30d. The respective data transfer control units 30a to 30d start to read the data from respective memories 31a to 31d using the address indicated by the output pointer sent from the printer controller 14.

The printer controller 14 updates the input pointer by moving the address by one page when the writing of the data corresponding to one page is completed. Similarly, the printer controller 14 updates the output pointer by moving the address by one page when the reading of the data corresponding to one page is completed. Since the start point of writing and the start point of reading as for respective memories 31*a* to 31*d* are collectively managed by the printer controller 14, storage areas in respective memories 31*a* to 31*d* can be easily reserved and released page by page.

For example, the virtual memory 60 is configured as an address map that is information indicating memory spaces in respective memories 31*a* to 31*d*. FIGS. 15A and 15B illustrate a further specific example of the virtual memory 60. For example, as illustrated in FIG. 15A, in respective memories 31*a* to 31*d* which are real memories, each top address indicating each start point of available area is defined as "0000h" and each bottom address indicating each end point of available area is defined as "FFFFh". The address in respective memories 31*a* to 31*d* is increased by a predetermined unit in a direction from the top address to the bottom address. Incidentally, the denotation "h" means that a character string immediately before "h" in the address is a numeral in hexadecimal.

The top address and the bottom address of the virtual memory 60 are defined as "0000h" and "FFFFh", respectively, similarly to respective memories 31*a* to 31*d*. Furthermore, input pointers (IN) and output pointers (OUT) of respective memories 31*a* to 31*d* which are real memories are managed as the same addresses as the input pointer and the output pointer of the virtual memory 60. In the example of FIG. 15A, the output pointer is identified by the address "3000h" and the input pointer is identified by the address "A000h".

FIG. 15B illustrates an example of address map 60*a* which is to be an entity of the virtual memory 60. For example, the address map 60*a* is configured as an assembly of addresses that include a Top address, a Bottom address, and addresses of an output pointer and an input pointer at a current point of time. In the example of FIG. 15B, a write address (write) to write data is further included in the address map 60*a*.

In the addresses of the input pointer and the output pointer, an address corresponding to one page is increased and updated, when writing of one page ends and reading of one page ends. When data is written with respect to each of the memories 31*a* to 31*d*, the write address is increased in a data write unit and a write position of data with respect to each of the memories 31*a* to 31*d* is shown. As the update result of the input pointer, the output pointer, and the write address, when the resulted value is more than the Bottom address, the address is set cyclically from the Top address.

The address map 60*a* is constructed in the control unit 23 in the printer controller 14, for example. Specifically, the address map 60*a* is constructed by storing each value on the RAM 323 by the CPU 321, for example. The Top address and the Bottom address can be previously stored in the ROM 324. At the time of starting and an initialization process of the printer device 13, the control unit 23 communicates with each of the data transfer control units 30*a* to 30*d* through the control signal transmitting/receiving unit 21, acquires the Top address and the Bottom address of each of the memories 31*a* to 31*d*, and generates the address map 60*a*. However, the invention is not limited thereto and a memory space may be actually secured on the RAM 323 of the printer controller 14 and the virtual memory 60 may be constructed.

Figure 16A:
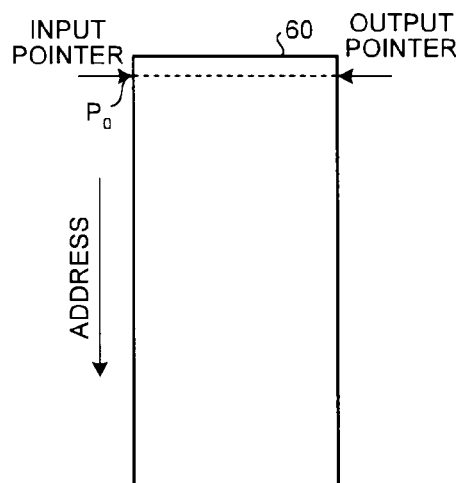
FIGS. 16A to 16D are schematic diagrams for describing control of an input pointer and an output pointer on a virtual memory.
Figure 16B:
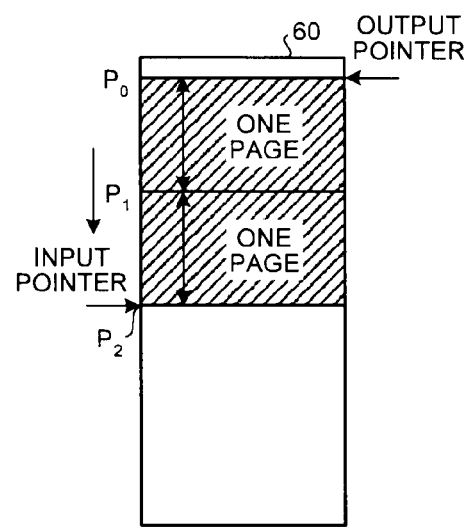

Referring to FIGS. 16A to 16D, control of the input pointer and the output pointer on the virtual memory 60 will be described. In FIGS. 16A to 16D, an address increases from the upper side to the lower side. As illustrated in FIG. 16A, in the virtual memory 60, in an initial state, the input pointer and the output pointer show an address $P_0$.

For example, in SEQ101 of FIG. 10, once the upper level device 10 requests the data transfer of the first page to the printer controller 14, the print image data corresponding to the first page starts to be written into respective memories 31*a* to 31*d* from the address P0 indicated by the input pointer on the virtual memory 60. If it is judged that the transfer of the print image data for all colors corresponding to the first page is completed, the printer controller 14 moves the input pointer on the virtual memory 60 by an amount of one page from the address P0 to the address P1 so that the input pointer is updated as the address P1. Thereby, the new address is designated to which the print image data corresponding to the next page is to be transferred. In the example of FIG. 10, if the completion of transferring the print image data of color K corresponding to the first page is notified to the printer controller 14 at SEQ111*d*, the printer controller 14 judges that transferring the print image data for all colors corresponding to the first page is completed.

Incidentally, in this example, the explanation was made on the case that the input pointer is updated, when the transfer of the print image data for all color corresponding to the first page is completed. However, the present invention is not limited to this example. For example, the input pointer may be updated, every time when the data transfer of the print image data for one color corresponding to the first page is completed.

The print image data corresponding to the second page is written into respective memories 31*a* to 31*d* from the address $P_1$ (that is the transfer destination address) indicated by the input pointer on the virtual memory 60. For example, if the data transfer of the print image data for all colors corresponding to the second page is completed and the data transfer of the print image data corresponding to the next page is requested at SEQ115 in FIG. 10, the printer controller 14 moves the input pointer by an amount of one page from the address $P_1$ to the address $P_2$ so that the input pointer is updated as the address $P_2$. Thereby, the new address is designated to which the print image data corresponding to the next page is to be transferred (see FIG. 16B).

Figure 16C:
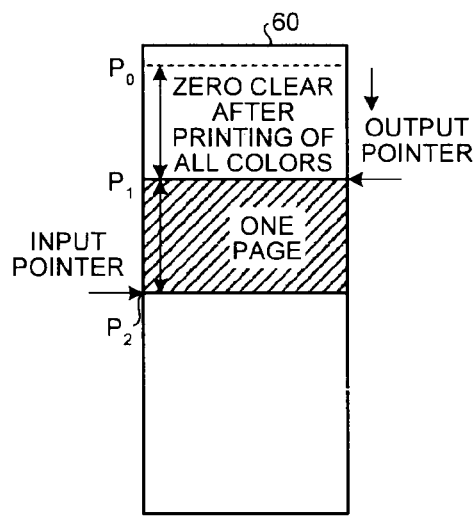
Figure 16D:
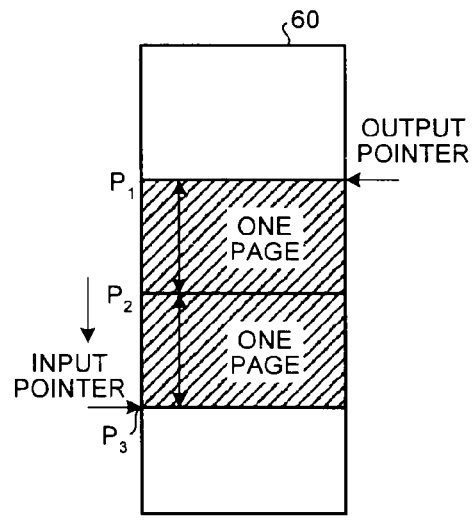

Once the printing operation for all colors corresponding to the first page is completed, the printer controller 14 moves the output pointer by an amount of one page from the address P0 to the address P1 so that the output pointer is updated as the address P1. Thereby, the print start position of the next page is designated to the top address of the second page, as illustrated in FIG. 16C. In the example of FIG. 10, if the printing operation for color K corresponding to the first page is completed at SEQ120*d*, the printer controller 14 judges that the printing operation for all colors corresponding to the first page is completed.

Incidentally, in this example, the explanation was made on the case that the output pointer is updated, when the printing operation for all colors corresponding to the first page is completed. However, the present invention is not limited to this example. For example, the output pointer may be updated, every time when the printing operation for one color corresponding to the first page is completed.

Once the printing operation for all colors corresponding to one page is completed, the printer controller 14 sends an instruction to respective data transfer control units 30*a* to 30*d* for clearing (so-called "zero-clear") the areas of respective memories 31*a* to 31*d* where the print image data is already written by the completed printing operation, as well as moving the output pointer. In accordance with this instruction, respective data transfer control units 30*a* to 30*d* perform the "zero-clear" by filling the areas of respective memories 31*a* to 31*d* where the printing operation is already completed (e.g. an area designated by addresses $P_0$ to $P_1$ on the virtual memory 60 for the first page) with zero. Thus, by filling the areas of respective memories 31a to 31d where the printing operation is completed with zero, any mistake can be avoided in the following printing operation.

In the above description, the areas where the print image data is already written by the completed printing operation is explained as the areas of respective memories 31a to 31d to which the "zero-clear" is performed. However, the present invention is not limited to this. For example, the areas of respective memories 31a to 31d to which the "zero-clear" is performed may be set to the discharge ended areas where the print image data is written. In this case, the data before discharged is stored into respective memories 31a to 31d of respective data transfer control units 30a to 30d. Therefore, it becomes not necessary to re-transfer the print image data from the upper level device 10, even in a case that the re-printing of page is needed because of a jam trouble of the printing paper 201.

In the above description, the "zero-clear" of respective memories 31a to 31d is performed at a time point when the print operation corresponding to one page is completed. However, the present invention is not limited to this. That is, the "zero-clear" of respective memories 31a to 31d may be performed at any time point from the time point when the print image data corresponding to a page before printing is transferred from the upper level device 10 until the time point when the transferred print image data is written into respective memories 31a to 31d. In this case, the output pointer may be moved in advance at the time point when the printing operation corresponding to one page is completed, or may be moved at the time point when the "zero-clear" is performed. Furthermore, the "zero-clear" may be performed almost simultaneously at respective memories 31a to 31d, or may be performed sequentially from the memory among memories 31a to 31d to which the print image data is transferred.

Then, the data transfer corresponding to the second page is completed, the printer controller 14 moves the input pointer on the virtual memory 60 by an amount of one page from the address $P_2$ to address $P_3$ so that the input pointer is updated as the address $P_3$. Thereby, the new address is designated to which the data corresponding to the third page is transferred.

As described above, in each embodiment, the input pointer representing the transmission source address of printing image data moves on the virtual memory 60 at the time of the end of data transmission for one page, and the output pointer representing the address of the read start position of printing image data moves on the virtual memory 60 at the time of the end of printing for one page of each color. The write and read operations of printing image data with respect to the memories 31a to 31d are performed in accordance with the addresses represented by the input pointer and the output pointer on the virtual memory 60. For this reason, the printer controller 14 can easily recognize the states of the memories 31a to 31d, and can thus easily determine whether or not printing of all colors is completed at the time of printing of the first page.

Incidentally, the writing and reading of the image print data corresponding to one page is not always performed at the same timing or the same speed. Specifically, in the necessity of performing the high speed printing, the print image data is often buffered to ensure the continuous printing. For this purpose, it is preferable to control the access of the print image data to respective memories 31a to 31d in such a manner that the writing speed becomes faster than the reading speed. In this case, the print image data corresponding to more than one page is stored into respective memories 31a to 31d. Thereby, the difference in address between the input pointer and the output pointer corresponds to a page size corresponding to more than one page.

Furthermore, the difference in address between the input pointer and the output pointer is affected by the development speed (RIP processing speed) of the print image data at the upper level device 10. Specifically, since the development speed of the print image data depends on the content of the print image data, the change speed of the input pointer depends on the content of the print image data. On the other hand, since the change speed of the output pointer depends on the printing speed at the image output unit 50 (data output speed to respective heads 56a to 56d), it becomes constant. Incidentally, in a case that the writing speed of the print image data into respective memories 31a to 31d is slower than the reading speed at the image output unit 50, the difference in address between the input pointer and the output pointer becomes zero.

First Embodiment

Figure 17A:
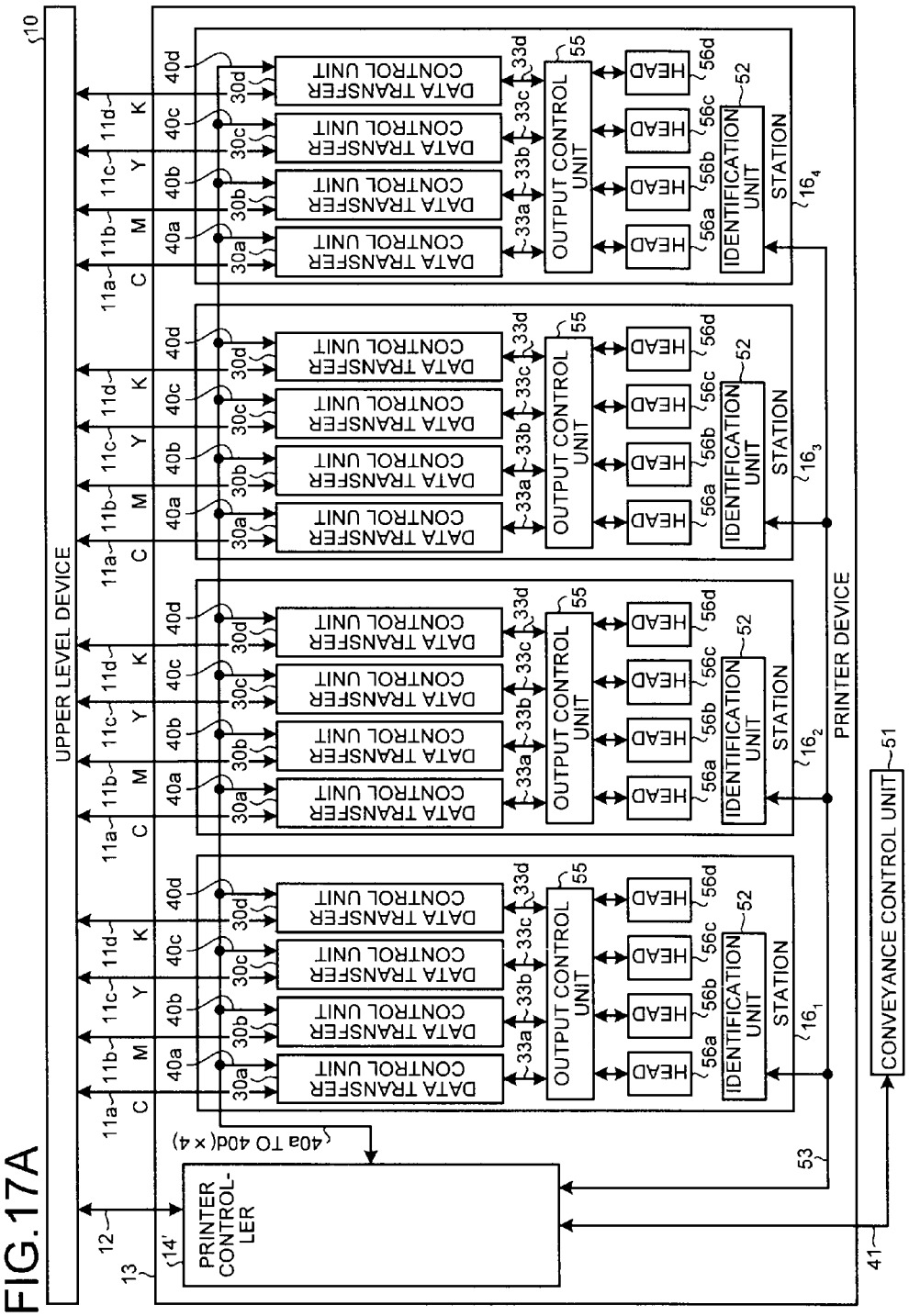
FIG. 17A is a block diagram illustrating the configuration of an example of a printer device according to a first embodiment.
Figure 17B:
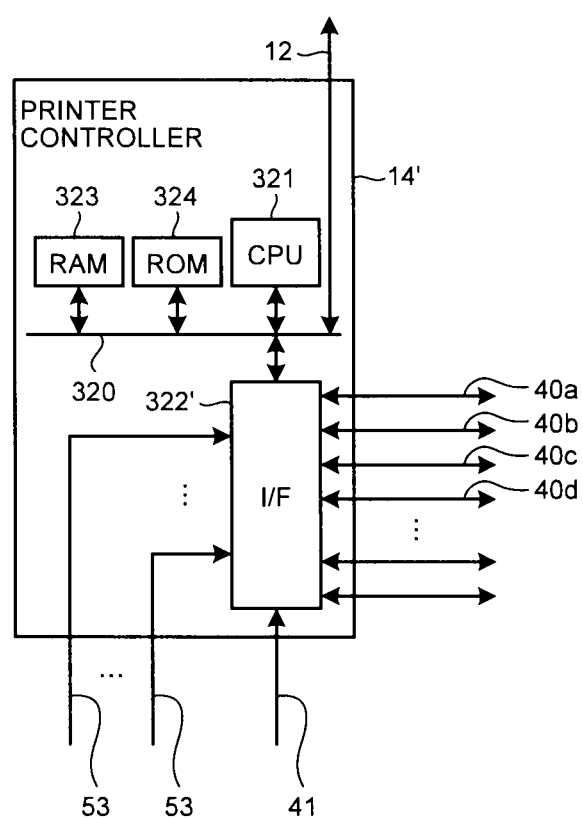
FIG. 17B is a block diagram illustrating the configuration of an example of a printer controller in the printer device according to the first embodiment.

Next, a first embodiment will be described. FIGS. 17A and 17B illustrate the configuration of an example of a printer device 13 according to the first embodiment. In this first embodiment, the printer device 13 can connect a plurality of stations 16 each corresponding to the printer engine 15. Hereinafter, when it is necessary to distinguish a plurality of stations 16 from each other, subscripts are attached to the reference numeral 16, that is, the stations are represented by $16_1$, $16_2$, ....

In the example of FIG. 17A, the printer device 13 includes four stations $16_1$, $16_2$, $16_3$, and $16_4$. That is, the stations $16_1$, $16_2$, $16_3$, and $16_4$ respectively include the data transfer control units 30a, 30b, 30c, and 30d, and the memories 31a, 31b, 31c, and 31d (not shown) to correspond to the colors C, M, Y, and K. The stations $16_1$, $16_2$, $16_3$, and $16_4$ also respectively include the output control unit 55 and the heads 56a, 56b, 56c, and 56d.

The stations $16_1$ to $16_4$ are provided such that the positional relation therebetween and the positional relation with respect to the first conveyance unit 230 and the second conveyance unit 260 are fixed. As an example, as described with reference to FIG. 8, the stations $16_1$ to $16_4$, and the first conveyance unit 230 and the second conveyance unit 260 are connected to each other using the connectors, and the positional relation therebetween is fixed.

Although in the example of FIG. 17A, the printer device 13 includes four stations $16_1$ to $16_4$, the invention is not limited to the example. The printer device 13 may include one station 16 or may include two or three stations 16. The printer device 13 may include five or more stations 16.

The stations $16_1$, $16_2$, $16_3$, and $16_4$ respectively have the identification units 52 which output station identification information for identifying the stations $16_1$, $16_2$, $16_3$, and $16_4$. Each identification unit 52 includes, for example, a dip switch, and outputs the station identification information according to the setting of the user. A printer controller 14' can identify the stations $16_1$, $16_2$, $16_3$, and $16_4$ on the basis of the station identification information output from the identification units 52 of the stations $16_1$, $16_2$, $16_3$, and $16_4$.

Although the details will be described below, the order of printing by the stations $16_1$, $16_2$, $16_3$, and $16_4$ or the order of data transmission requests for the upper level device 10 is determined in accordance with the station identification information. For this reason, in the stations $16_1$, $16_2$, $16_3$, and $16_4$, the station identification information may be determined for the identification units 52 using values which sequentially increase from a value "1" in order from the front side (first conveyance unit 230 side) of the sheet feed direction, for example, values "1", "2", "3", and "4". If the station identification information is set in the above-described manner, the printer controller 14' can specify the positions of the stations $16_1$, $16_2$, $16_3$, and $16_4$ on the printer device 13.

FIG. 17B corresponds to FIG. 17A and illustrates an example of the printer controller 14' in the printer device 13 including the four stations $16_1$, $16_2$, $16_3$, and $16_4$. In the printer controller 14', a CPU 321, a RAM 323, and a ROM 324 are connected to a bus 320. To the bus 320 is also connected an interface 322' to which all engine control lines 40a to 40d for communication with the data transfer control units 30a to 30d of the stations $16_1$ to $16_4$ and the identification units 52 of the stations $16_1$ to $16_4$ are connectable.

The invention is not limited thereto, and the printer controller 14' may include a plurality of interfaces 322', to which the engine control lines 40a, 40b, 40c, and 40d for communication with the data transfer control units 30a, 30b, 30c, and 30d of the stations 16 are connected, in accordance with the number of stations 16 of the printer device 13.

The stations $16_1$, $16_2$, $16_3$, and $16_4$ are respectively connected to the upper level device 10 by the data lines 11a, 11b, 11c, and 11d. The upper level device 10 transmits image data of the colors C, M, Y, and K stored in, for example, the separate areas of the RAM 103 to the stations $16_1$, $16_2$, $16_3$, and $16_4$ in response to the requests transmitted from the stations $16_1$, $16_2$, $16_3$, and $16_4$ through the data lines 11a, 11b, 11c, and 11d.

Figure 18:
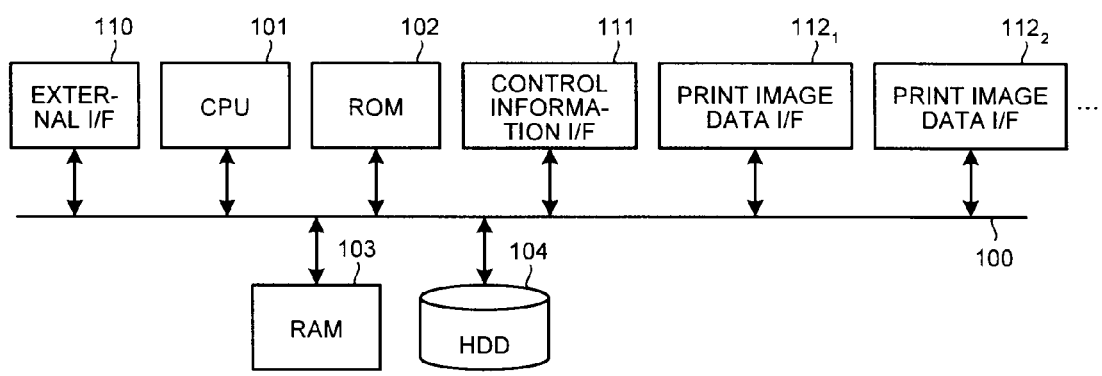
FIG. 18 is a block diagram illustrating the configuration of an example of an upper level device to which a plurality of printing image data I/Fs are connected.

According to the PCI Express standard, an address on a memory can be directly designated to read data from the memory. Thus, on the upper level device 10 side, with regard to reading image data from the RAM 103, it is not necessary to be conscious of the configuration of a lower level device (printer device 13). Thus, when the number of access channels for the print image data I/F 112 increases, as in the example of FIG. 18, interfaces, such as print image data I/Fs $112_1$, $112_2$, . . . , based on the PCI Expression standard may be additionally connected to a bus 100. Specifically, the print image data I/F 112 is constituted as an expansion board with respect to the upper level device 10 for communication based on, for example, PCI Express, and the expansion board is added to the upper level device 10 in accordance with the number of stations 16 in the printer device 13 to increase PCI Express ports.

Read Control of Printing Image Data

Next, a printing control method according to the first embodiment will be described. In the first embodiment, for each station 16, printing image data of the same color is thinned out and read in a raster unit (line unit) in accordance with the number m of stations. Here, it is assumed that a raster represents one row (pixel unit) in the horizontal direction of a printing image of one page, and a line represents bitmap data of a raster on a memory. Thus, when printing image data for one page is stored in a memory continuously in a raster form, a raster and a line become synonymous.

As an example, as shown in FIG. 17A, when the printer device 13 has the four stations $16_1$, $16_2$, $16_3$, and $16_4$, with regard to printing image data of the colors C, M, Y, and K, the station $16_1$ requests the upper level device 10 for (4n+1)th line, the station $16_2$ requests for the (4n+2)th line, the station $16_3$ requests for the (4n+3)th line, and the station $16_4$ requests for the (4n+4)th line. Here, n is an integer equal to or greater than 0.

As described above, in the upper level device 10, printing image data is stored in different areas of the RAM 103 for the colors. The invention is not limited thereto, and memories corresponding to the number of colors may be provided in the upper level device 10 and may store printing image data of the colors. The stations $16_1$ to $16_4$ designate the addresses with respect to the upper level device 10 in a raster unit including a boundary adjustment size, and can read printing image data of the colors for each line. The boundary adjustment size is the size of data which is used to arrange the size of the printing image data in a predetermined unit (for example, a byte unit).

Figure 19:
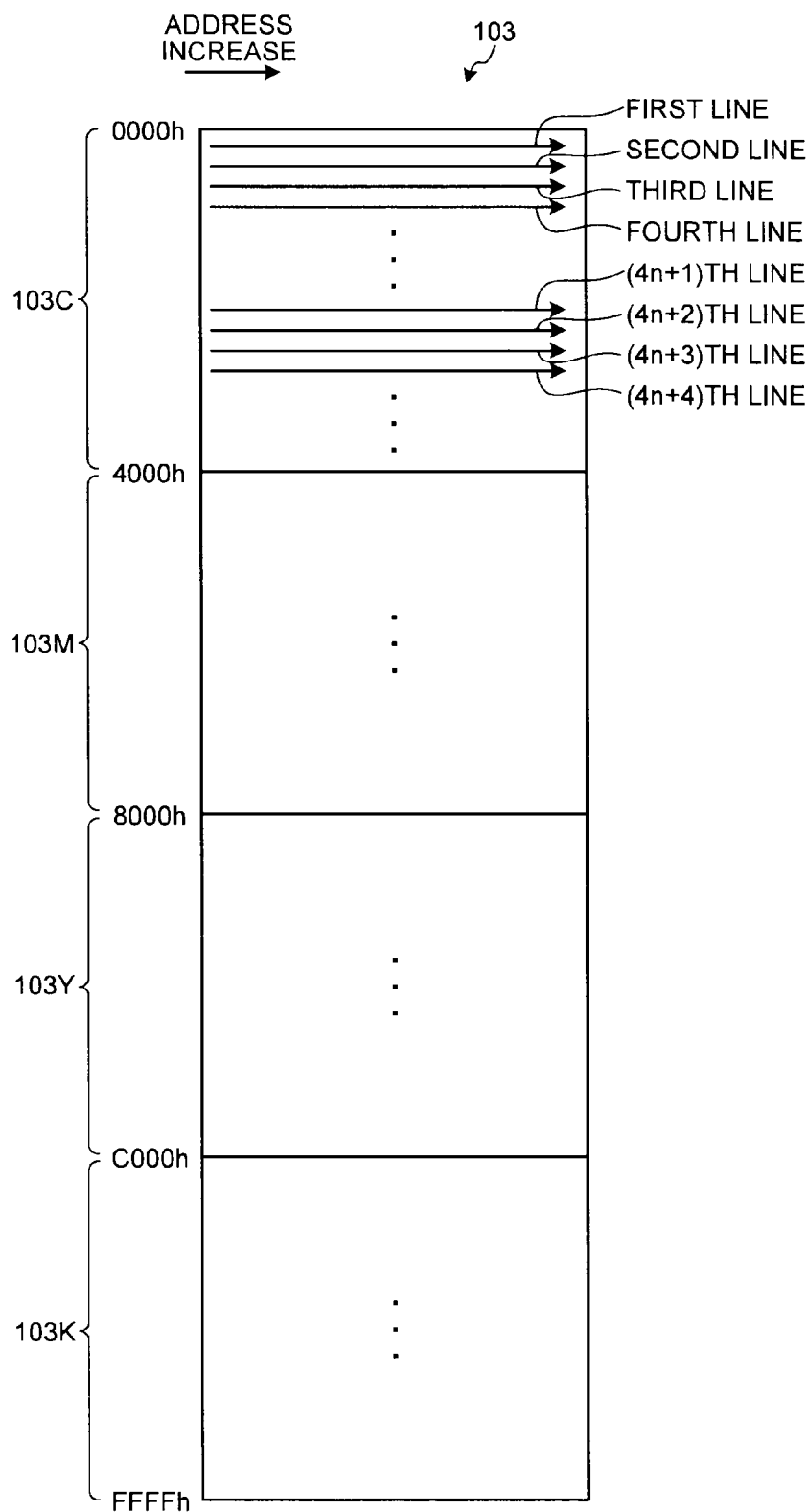
FIG. 19 is a schematic diagram illustrating the configuration of an example of a RAM.

FIG. 19 illustrates the configuration of an example of the RAM 103. In FIG. 19, it is assumed that an address increases from left to right in the row direction, and increases from above to below in the column direction. It is also assumed that one row corresponds to one line.

As an example, the address space in a range of an address "0000h" to an address "FFFFh" of the RAM 103 is quartered at an address "4000h", an address "8000h", and an address "C000h". The range from the address "0000h" as a head address to an address "3FFFh" is set as an area 103C of the color C. Similarly, the range from the address "4000h" as a head address to an address "7FFFh" is set as an area 103M of the color M, the range from the address "8000h" as a head address to an address "BFFFh" is set as an area 103Y of the color Y, and the range from the address "C000h" as a head address to the address "FFFFh" is set as an area 103K of the color K.

It is assumed that the areas 103C, 103M, 103Y, and 103K can store printing image data for multiple pages.

With regard to this address configuration, printing image data is read in terms of rows, that is, lines (rasters) from the head address in each of the areas 103C, 103M, 103Y, and 103K of the colors. In this example where the printer device 13 has the four stations $16_1$, $16_2$, $16_3$, and $16_4$, when n is an integer equal to or greater than 0, in the areas 103C to 103K of the colors, for example, the (4n+1)th line is read in response to the request from the station $16_1$. Similarly, the (4n+2)th line is read in response to the request from the station $16_2$, the (4n+3)th line is read in response to the request from the station $16_3$, and the (4n+4)th line is read in response to the request from the station $16_4$.

Figure 20A:
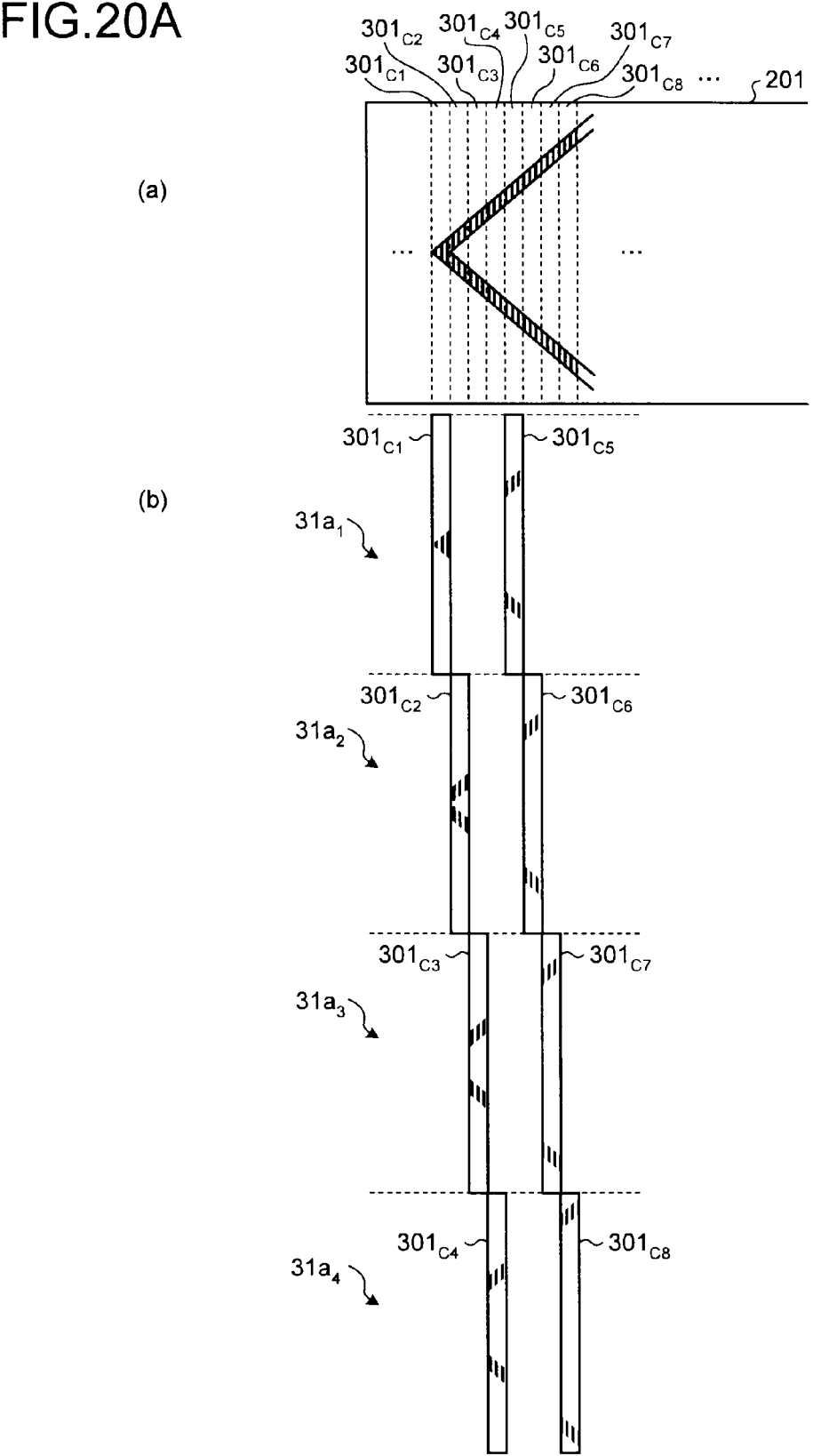
FIG. 20A is a schematic diagram for describing an image data reading process which is applied to the first embodiment.

FIG. 20A illustrates an example of the relation between an image to be actually printed and printing image data. As shown in FIG. 20A(a), it is assumed that a figure "<" is printed as a printing image on the printing paper 201, which is transmitted in the left direction of the drawing, using the color C. That is, the lines of the color C are sequentially printed in order of lines $301_{C1}$, $301_{C2}$, $301_{C3}$, . . . from the head in the sheet conveying direction.

FIG. 20A(b) schematically illustrates a form in which printing image data is stored in the memory 31a of the data transfer control unit 30a corresponding to the color C in each of the stations $16_1$ to $16_4$. Here, it is assumed that the memories 31a of the data transfer control units 30a in each of the stations $16_1$ to $16_4$ are a memory $31a_1$, a memory $31a_2$, a memory $31a_3$, and a memory $31a_4$.

For example, in the station $16_1$, the data transfer control unit $30a_1$ thins out the rasters of the color C in accordance with the number m of stations and requests the upper level device 10 for printing image data of the lines $301_{C1}$, $301_{C5}$, . . . , $301_{C(4n+1)}$ (not shown). As a result, printing image data of the first, fifth, . . . , and (4n+1)th lines $301_{C1}$, $301_{C5}$, . . . , $301_{4n+1}$ (not shown) of the color C is sequentially stored in the memory $31a_1$.

The same is applied to the stations $16_2$, $16_3$, and $16_4$. For example, in the station $16_2$, the data transfer control unit $30a_2$ thins out the rasters of the color C in accordance with the number m of stations and requests the upper level device 10 for printing image data of the lines $301_{C2}$, $301_{C6}$, . . . , and $301_{C(4n+2)}$ (not shown). As a result, for example, printing image data of the second line, the sixth line, . . . , and the (4n+2)th lines $301_{C2}$, $301_{C6}$, . . . , and $301_{4n+2}$ (not shown) is sequentially stored in the memory $31a_2$.

Figure 20B:
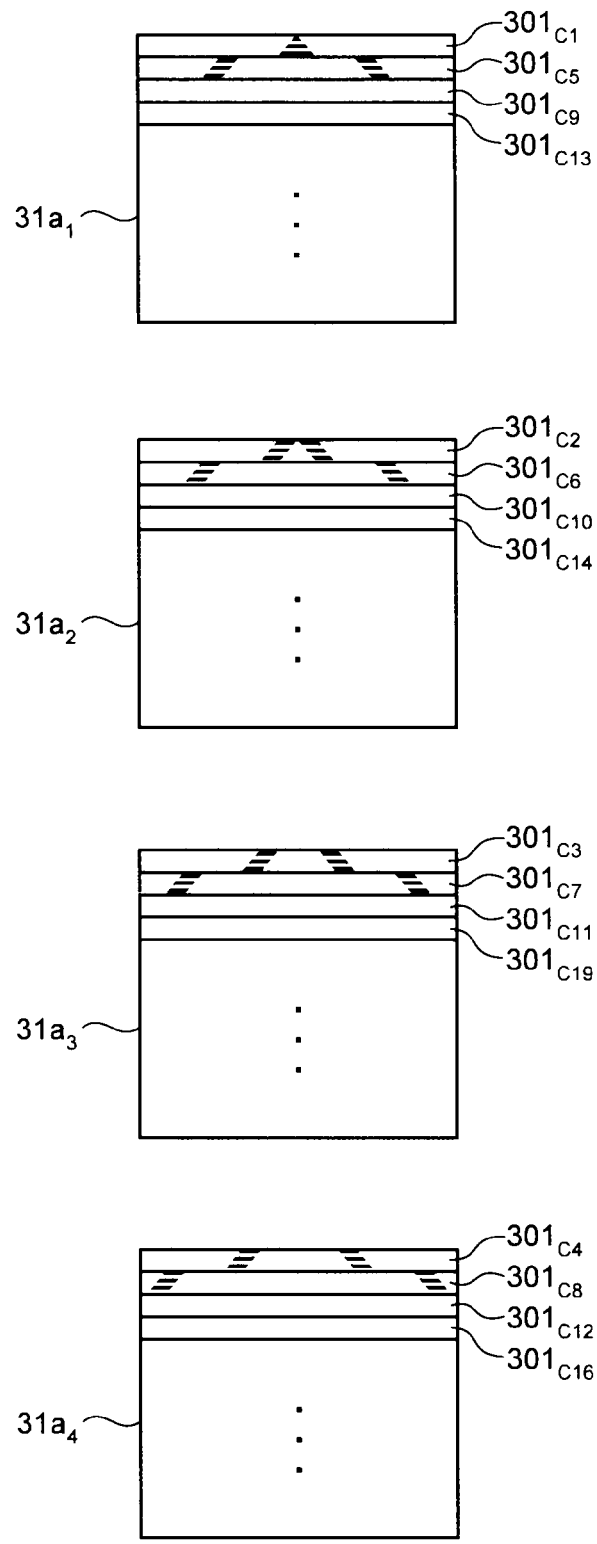
FIG. 20B is a schematic diagram illustrating a form in which printing image data is squeezed into each memory.

Although FIG. 20A(b) illustrates the lines at intervals for description, actually, printing image data of the lines is stored close together in the memories $31a_1$, $31a_2$, $31a_3$, and $31a_4$. For example, as illustrated in FIG. 20B, printing image data of the lines $301_{C1}$, $301_{C5}$, . . . , and $301_{C(4n+1)}$ (not shown) is stored close together in the memory $31a_1$ sequentially from the head. Similarly, printing image data of the lines is stored close together in the memories $31a_2$, $31a_3$, and $31a_4$ sequentially from the head.

Printing is performed in the reverse order to at the time of requesting printing image data. That is, the data transfer control units $30a_1$, $30a_2$, $30a_3$, and $30a_4$ respectively read printing image data from the memories $31a_1$, $31a_2$, $31a_3$, and $31a_4$ line by line in accordance with the arrangement order of the stations $16_1$, $16_2$, $16_3$, and $16_4$, and sequentially print printing image data.

The printer controller 14' acquires the identification information from the identification units 52 of the stations $16_1$ to $16_4$ during the initialization process at the time of power-on of the printer device 13, and determines the number m of stations being connected from the identification information. The printer controller 14' controls the data transfer control units 30a to 30d of the stations $16_1$ to $16_4$ on the basis of the number m of stations to realize the above-described data request and printing.

As described above, in the first embodiment, the data transfer control units 30a to 30d of the stations $16_1$ to $16_4$ perform thinning-out in a line unit in accordance with the number m of stations and requests the upper level device 10 for printing image data. For this reason, in the stations $16_1$, $16_2$, $16_3$, and $16_4$, the amount of printing image data which is transmitted through the data lines 11a, 11b, 11c, and 11d is reduced, making it possible to realize higher-speed data transmission. Simultaneously, the data amount of printing image data which is managed by the data transfer control units 30a to 30d of the stations $16_1$ to $16_4$ decreases, making it easy to process printing image data.

In the first embodiment, the conveyance speed of the printing paper 201 changes in accordance with the number m of stations of the printer device 13. The printer controller 14' sets a conveyance speed $V_m$ according to the number m of stations for the conveyance control unit 51 on the basis of the number m of stations determined by the identification information acquired from the identification units 52 of the stations $16_1$ to $16_4$. Specifically, as the number m of stations increases, the printer controller 14' increases the conveyance speed $V_m$. As an example, with a conveyance speed $V_1$ when the number m of stations is "1" as a reference, the conveyance speed $V_m$=m× $V_1$.

That is, as described above, in the first embodiment, since printing image data of each color is thinned out in a line unit in accordance with the number m of stations and printed, if the number m of stations increases, the printing intervals of the stations $16_1$ to $16_m$ are extended. Therefore, it is possible to increase the conveyance speed $V_m$ in accordance with the number m of stations, making it possible to perform higher-speed printing.

Even when the printer device 13 includes a plurality of stations $16_1$, $16_2$, . . . , a printing process is basically the same as the printing process when the number m of stations is 1 as described with reference to FIGS. 10, 11A to 11D, and 12A to 12C. That is, when the printer device 13 includes a plurality of stations $16_1$, $16_2$, . . . , the number of data transfer control units 30a to 30d increases in accordance with the number m of stations, and thus communication between the printer controller 14' and the data transfer control units 30a to 30d of the stations $16_1$, $16_2$, . . . merely increases. Each process is the same as that when the number m of stations is 1.

Transmission Management Table

Next, the transmission management table according to the first embodiment will be described. The transmission management table is used to manage the data transmission process by the data transfer control units 30a to 30d or the printing process by the image output unit 50 in a plurality of stations $16_1$, $16_2$, . . . . The printer controller 14' creates the transmission management table on the basis of a print job, sheet information, and the like transmitted from the upper level device 10, and holds the transmission management table on the RAM 23. Simultaneously, the printer controller 14' writes necessary information from among the information of the transmission management table in the registers of the data transfer control units 30a to 30d in a plurality of stations $16_1$, $16_2$, . . . when a data transmission start request or a printing instruction is issued to the data transfer control units 30a to 30d in a plurality of stations $16_1$, $16_2$, . . . .

The data transfer control units 30a to 30d in a plurality of stations $16_1$, $16_2$, . . . issue a transmission request of printing image data to the upper level device 10 or issues a printing instruction to the image output unit 50 in accordance with information of the transmission management table written in the registers. The transmission management table includes a page identifier for identifying a page, and the data transfer control units 30a to 30d in a plurality of stations $16_1$, $16_2$, . . . selects information of the transmission management table on the basis of the page identifier and performs data transmission and a printing process.

FIG. 21 illustrates an example of the transfer management table that is applied to the first embodiment. The transfer management table includes information that is common to the colors C, M, Y, and K and information for each color. The information common to each color and the information for each color include data transfer information that is used to transmit the print image data from the upper level device 10 and print information that is information related to the printing instruction with respect to the image output unit 50. A management form of each information that is included in the transfer management table is not limited to a table form and each information may be managed in another data management form.

Information common to the colors according to the first embodiment will be described. Of the information common to the colors, information other than information for data transmission and printing includes PBID, a station number representing the order of the station 16, the number of pieces of data per page, and the like. PBID is a page identifier for identifying a printing page, and the transmission management table is identified by PBID. As described above, the station number is the value of the station identification information set in the identification unit 52 of the station 16, and sequentially increases from the value "1" in order of "1", "2", "3", . . . from the front side of the sheet feed direction. Here, the printer device 13 includes the four stations $16_1$, $16_2$, $16_3$, and $16_4$, and the station number has the value "1" to the value "4". The number of pieces of data per page is the number of colors which are used for a page identified by PBID. For example, in the case of monochrome, the value is "1", and in the case of full-color, the value is "4".

Of the information common to the colors which is applied to the first embodiment, information for data transmission includes a data storage destination address, a single raster data transmission size, an address update value, and the number of updates. The data storage destination address is an address which is represented by the above-described input pointer. Thus, each time the input pointer is updated, the data storage destination address is also updated.

The single raster data transmission size represents the data size of printing image data for one raster (one line) which is transmitted in response to the requests of the data transfer control units $30a$ to $30d$ of the stations $16_1$ to $16_4$. The single raster data transmission size includes a boundary adjustment size.

The address update value is an increase in an address which is designated when single raster printing image data is requested for the upper level device 10 with respect to an address when previous single raster printing image data is designated. When an address is designated in accordance with the data size, the address update value has a value obtained by multiplying the number m of stations to the single raster data transmission size. In this example where the number m of stations is 4, the address update value=single raster data transmission size×4 is calculated. The number of updates represents how many times the address is updated by the address update value in one page, and a value obtained by dividing the printing image data size (including the boundary adjustment size) for one page by the number m of stations is used. In this example where the number m of stations is 4, the number of updates=printing image data size for one page÷4 is calculated.

Of the information common to the colors which is applied to the first embodiment, information for printing will be described. The information for printing includes a resolution and a gradation as information of printing image data to be printed, a sheet feed length, a sheet width, a printing surface (front/rear), a printing inhibited area (upper/lower/left/right), and image information as information relating to a printing target. The image information includes a bitmap printing position X, a bitmap printing position Y, an X-direction effective size, and a Y-direction effective size.

Of the information of printing image data to be printed, the resolution represents a printing resolution in each of the main scanning direction and the sub scanning direction. The gradation represents the number of bits per pixel.

Figure 22A:
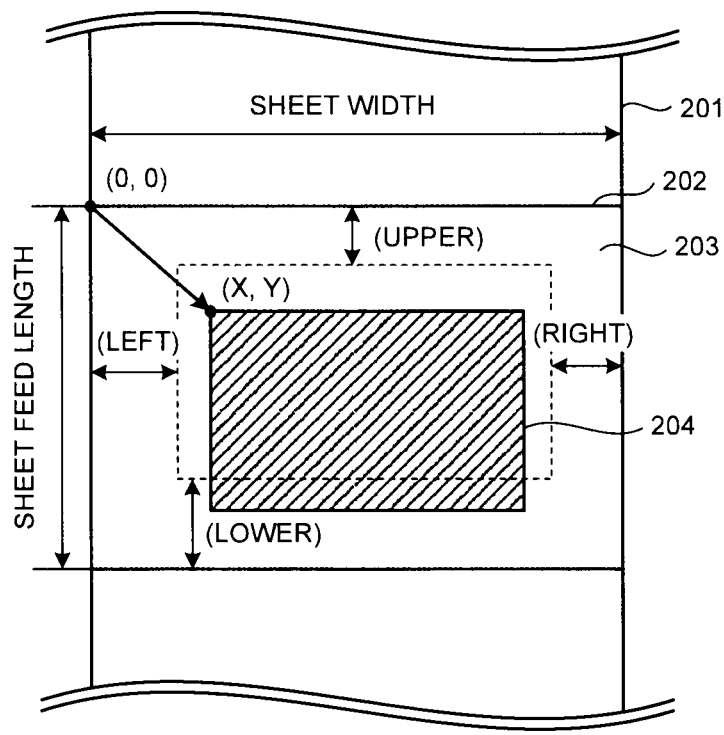
FIGS. 22A and 22B are schematic diagrams for describing information relating to a printing target.
Figure 22B:
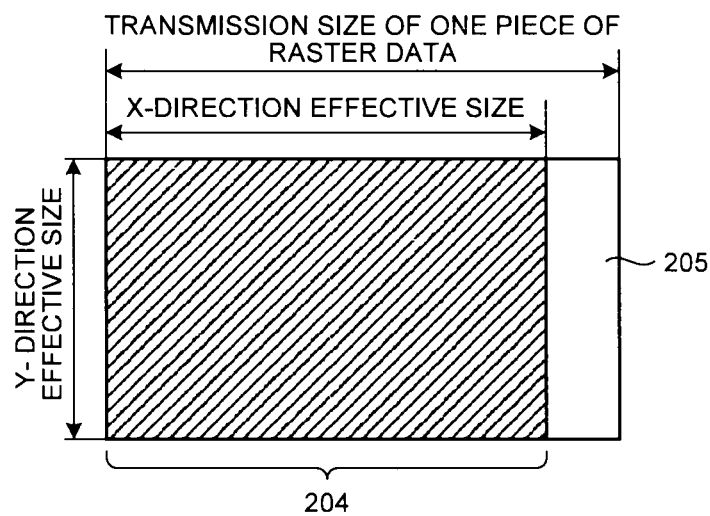

The information relating to a printing target will be described with reference to FIGS. 22A and 22B. FIG. 22A illustrates an example of a page area 202 with respect to the printing paper 201. FIG. 22B illustrates an example of an effective printing area 204 by printing image data. The sheet feed length represents the length for one page in the feed direction of the printing paper 201 by the number of dots, and the sheet width represents the length of the printing paper 201 in the width direction by the number of dots. The printing surface represents on which of the front and rear surfaces of the printing paper 201 which is the page to be printed.

The upper, lower, left, and right printing prohibited areas represent a printing prohibited area 203 at the upper end (the head in the sheet feed direction), the lower end (the rear end of the sheet feed direction), the left end (the left end of the sheet width direction toward the sheet feed direction), and the right end (the right end of the sheet width direction toward the sheet feed direction) of the page area 202 by the number of dots.

Of the image information, the bitmap printing positions X and Y represent the address (coordinate) of the printing start position by the number of dots with the upper left (the head in the sheet feed direction and the left end in the sheet width direction) of the page area 202 as an origin. Of the image information, the X-direction effective size represents the size not including a boundary adjustment area 205 in the X direction (sheet width direction) by the number of dots. The boundary adjustment area 205 is provided to arrange the data size in a predetermined unit when the data size of single raster data includes the number of fractions equal to or smaller than a predetermined unit (for example, a byte unit). The Y-direction effective size represents the size in the Y direction (sheet feed direction) by the number of dots. That is, the X-direction effective size represents the effective size to be printed by single raster data, and the Y-direction effective size represents the number of rasters (the number of lines) to be printed with the X-direction effective size.

That is, the bitmap printing positions X and Y are set to the upper left, and the area which is represented by the X-direction effective size and the Y-direction effective size becomes a printing area 204. In an area of the printing area 204 which overlaps the printing prohibited area 203, printing is not performed.

In the first embodiment, since the data transmission source address differs between the stations $16_1$, $16_2$, ... by the single raster data transmission size, it is necessary to make the bitmap printing position Y different between the stations in correspondence with the data transmission source address. That is, in the case of the station number "1", the printing position designated from the upper level device 10. Hereinafter, as the station number increases by 1, the bitmap printing position Y is shifted by one dot. Specifically, in the case of the station numbers "2", "3", and "4", the positions shifted in the Y direction with respect to the printing position designated from the upper level device 10 by one dot, two dots, and three dots become the bitmap printing position Y.

Information of each color according to the first embodiment will be described. Of the information of each color, information other than the information for data transmission and printing includes a color identifier representing a printing color whose information is described from among the colors C, M, Y, and K. The information of each color has the same configuration, thus information regarding the color identifier "cyan" will be described. The transmission management table includes the information of each color for the colors C, M, Y, and K.

Of the information of each color which is applied to the first embodiment, information for data transmission includes a data transmission source address, a need for data transmission, and a transmission completion flag. The transmission completion flag represents whether or not the transmission of printing image data for one page of a color identified by the color identifier is completed in the station 16 represented by the station number. At the time of transmission completion, the value is set to "ON". For example, in SEQ111a of FIG. 9, if a transmission completion notification of printing image data for one page is received from the data transfer control unit $30a$ of the station $16_1$, the printer controller 14' turns on the transmission completion flag of the transmission management table corresponding to the data transfer control unit $30a$ of the station $16_1$.

The data transmission source address represents the address of the upper level device 10 in which printing image data of a page represented by PBID is stored. The data transmission source address designates printing image data in a raster (line) unit. As described above, in the first embodiment, when the printer device 13 includes a plurality of stations $16_1$, $16_2$, ..., the stations $16_1$, $16_2$, ... request sequential transmission of printing image data of the same color in a raster order, such that the data transmission source address differs between the stations $16_1$, $16_2$, ... by one raster. For this reason, the data transmission source address should be shifted between the stations $16_1$, $16_2$, . . . by the single raster data transmission size.

Specifically, in this example where the printer device 13 includes the four stations $16_1$, $16_2$, $16_3$, and $16_4$, in the case of the station number "1" representing the station (the station where printing is first performed) on the most front side with respect to the sheet feed direction, the address of the head raster of bitmap data of one page is designated. With regard to the next station number "2", the address obtained by adding the single raster data transmission size to the head raster of bitmap data of one page is designated, and with regard to the station number "3", the address obtained by adding the size two times larger than the single raster data transmission size to the head raster of bitmap data of one page is designated. Similarly, with regard to the station number "4", the address obtained by adding the size three times larger than the single raster data transmission size to the head raster of bitmap data of one page is designated.

In the data transmission source address, a value "α" represents an offset in a page unit. As an example, printing image data for two pages is stored in the area 103C of the color C in the RAM 103 of the upper level device 10, and when the page identifier PBID represents the second page, the station $16_1$ should designate the address of the head raster of bitmap data of the second page in the area 103C. In this case, the address for the data transmission size of one page is provided as the value "a", such that the address of the head raster of bitmap data of the second page can be designated in the area 103C.

The need for data transmission represents the need for transmitting printing image data of the printing color. For example, in the case of a blank sheet, that is, when printing is not performed, the need for data transmission is set to "No" for all the colors C, M, Y, and K. For the colors other than the color instructed by the color identifier (Cyan, Magenta, Yellow, Black), the need for data transmission is set to "NO".

The print information in the information of each color that is applied to the first embodiment includes information that indicates whether printing is needed. The information that indicates whether the printing is needed indicates whether printing of print image data of the corresponding printing color is needed. For example, in the case of white paper, that is, in the case of not performing printing, the information that indicates whether the printing is needed is set to "non-necessity", with respect of all of the colors C, M, Y, and K. With respect to colors other than the colors designated by the Colors, the information that indicates whether the transmission of the data is needed is set to "non-necessity".

Printing Control Process

Next, a printing control process in the first embodiment will be described with reference to flowcharts of FIGS. 23 to 26. FIG. 23 is a flowchart illustrating an example of an initialization process, which is performed at the time of power-on, in the printer device 13. Here, it is assumed that the printer device 13 can connect the four stations 16 thereto to the maximum.

For example, if the initialization process starts at the time of power-on of the printer device 13, in Step S200, the printer controller 14' performs communication with the identification unit 52 through the signal line 53, and acquires the station identification information. The number m of stations 16 which are connected to the printer device 13 and the positions of the stations 16 are determined on the basis of the acquired station identification information. In Step S201, the printer controller 14' sets an initial state or the like for the stations 16 represented by the station identification information acquired in Step S200.

The process progresses to Step S202, and the printer controller 14' sets the conveyance speed $V_m$ according to the number m of stations for the conveyance control unit 51. That is, in Step S202, the printer controller 14' determines whether or not the number m of stations is "1". If it is determined that the number m of stations is "1", the process progresses to Step S203, and the conveyance speed $V_m$ is set to the conveyance speed $V_1$.

If it is determined in Step S202 that the number m of stations is not 1, the printer controller 14' progresses the process to Step S204, and determines whether or not the number m of stations is "2". If the number m of stations is "2", the printer controller 14' progresses the process to Step S205 and sets the conveyance speed $V_m$ to, for example, a conveyance speed $V_2$ two times higher than the conveyance speed $V_1$.

If it is determined in Step S204 that the number m of stations is not 2, the printer controller 14' progresses the process to Step S206, and determines whether or not the number m of stations is "3". If it is determined that the number m of stations is "3", the printer controller 14' progresses the process to Step S207 and sets the conveyance speed $V_m$ to, for example, a conveyance speed $V_3$ three times higher than the conveyance speed $V_1$. If it is determined in Step S206 that the number m of stations is not "3", it can be determined that the number m of stations is "4", the process progresses to Step S208 and the conveyance speed $V_m$ is set to, for example, the conveyance speed $V_4$ four times higher than the conveyance speed $V_1$.

In Step S203, S205, S207, or S208, if the setting of the conveyance speed for the conveyance control unit 51 ends, the process progresses to Step S209. In Step S209, the printer controller 14' initializes the value of PBID, which is the page identifier for identifying a page, to "0". A sequence of process in the flowchart of FIG. 23 ends. Although the conveyance speed $V_m$ is a multiple of the number m of stations with the conveyance speed $V_1$ when the number m of stations is 1 as a reference, the invention is not limited to this example.

Figure 24:
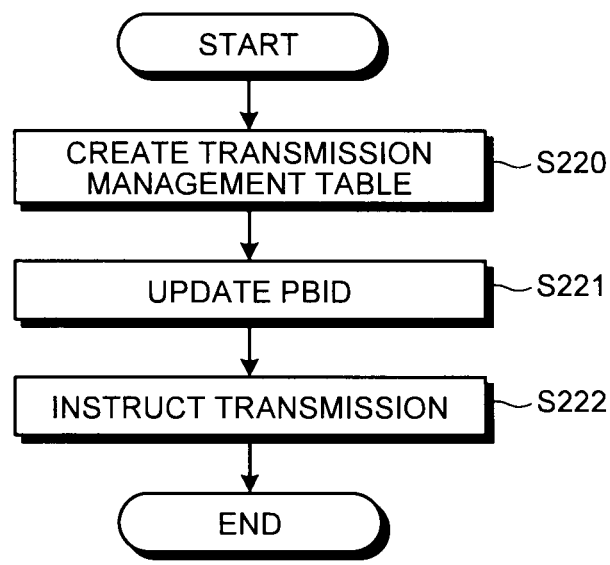
FIG. 24 is a flowchart illustrating an example of a transmission process of image data to be printed.

FIG. 24 is a flowchart illustrating an example of a transmission process of printing image data to be printed. Hereinafter, it is assumed that the printer device 13 includes the four stations $16_1$, $16_2$, $16_3$, and $16_4$.

The process in the flowchart is activated when the transmission preparation of printing image data in the upper level device 10 is completed. For example, if a print job is received from the upper level device 10 in SEQ101 or SEQ102 of the sequence chart of FIG. 10, in Step S220, the printer controller 14' creates the transmission management table. The transmission management table is created for the data transfer control units 30a, 30b, 30c, and 30d of the stations $16_1$, $16_2$, $16_3$, and $16_4$. At this time, as described with reference to FIG. 21, the data transmission source address and the bitmap printing position Y are determined for the stations $16_1$, $16_2$, $16_3$, and $16_4$ on the basis of the station identification information. The transmission management table of each of the stations $16_1$, $16_2$, $16_3$, and $16_4$ includes the station identification information representing the station.

In Step S221, the printer controller 14' increases the value of PBID by "1" and updates PBID. In Step S222, a printing image data transmission start is requested for the data transfer control units 30a, 30b, 30c, and 30d of the stations $16_1$, $16_2$, $16_3$, and $16_4$. At this time, the printer controller 14' requests to start the printing image data transmission with respect to PBID before being updated in Step S221.

Figure 25:
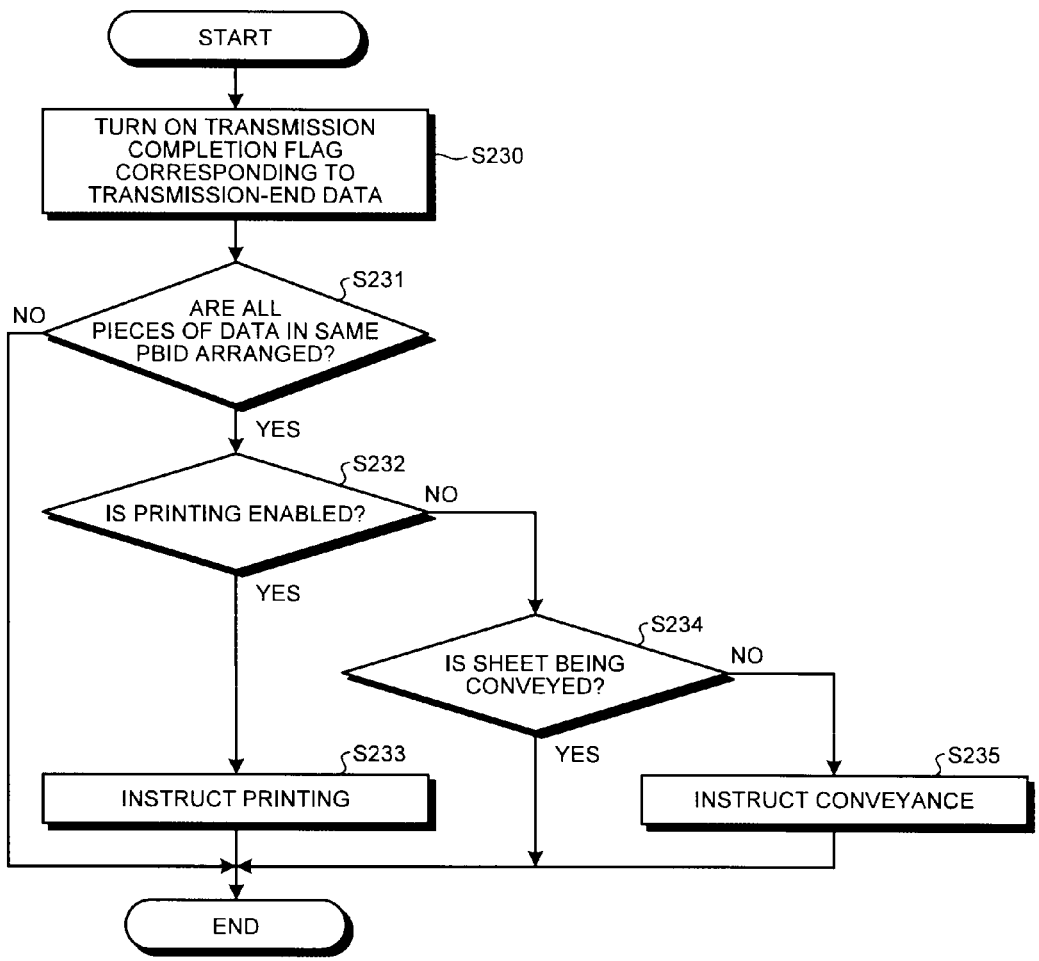
FIG. 25 is a flowchart of an example of a printing process.
Figure 26:
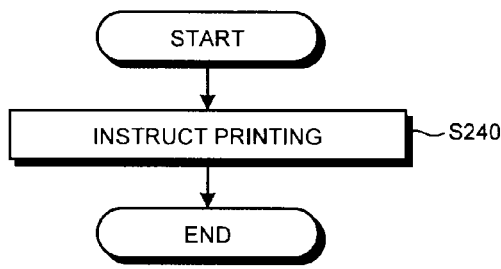
FIG. 26 is a flowchart of an example of a printing process when a printing enabled state report is received.

FIG. 25 is a flowchart of an example of a printing process. The process in the flowchart is activated when the data transmission completion is notified to the printer controller 14'. If the data transmission completion notification is received, in Step S230, the printer controller 14' turns on the transmission completion flag in the transmission management table corresponding to the data transmission control unit serving as the transmission source of the received data transmission end notification.

Next, in Step S231, it is determined whether or not the transmission of all pieces of printing image data same as printing image data whose data transmission end is notified by the corresponding PBID ends. For example, the printer controller 14' checks the transmission completions flag in all the transmission management tables having the same PBID on the basis of PBID of the transmission management table corresponding to printing image data whose data transmission end is notified. If all the transmission completion flags are set to ON, it is determined that the transmission of all pieces of printing image data ends. When it is determined that there is printing image data which is not transmitted, the process in the flowchart of FIG. 25 is skipped, and it waits for the next data transmission end notification.

If the transmission of all pieces of printing image data ends, the printer controller 14' progresses the process to Step S232 and determines whether or not the printing enabled state is reached at present. The determination on whether or not the printing enabled state is reached at present is made in accordance with whether or not the printing paper 201 is being conveyed at a predetermined speed. For example, if the control signal which is output from the conveyance control unit 51 to the conveyance control line 41 is in a predetermined state, the printer controller 14' determines that the printing paper 201 is conveyed at a predetermined speed and a printing enabled state is reached at present.

If it is determined in Step S232 that the printed enabled state is reached at present, the printer controller 14' progresses the process to Step S233. In Step S233, the printer controller 14' instructs the data transfer control units 30a to 30d of the stations $16_1$ to $16_4$ to print printing image data whose transmission in Step S231 ends. If printing is instructed, the process in the flowchart of FIG. 25 is skipped, and it waits for the data transmission end notification.

If it is determined in Step S232 that the printing enabled state is not reached at present, the printer controller 14' progresses the process to Step S234 and determines whether or not the printing paper 201 is being conveyed at present. That is, in Step S234, the determination on whether or not the printing paper 201 is being conveyed at present is made in accordance with whether or not the conveyance speed is a predetermined speed. The determination is made on the basis of a control signal which is output from the conveyance control unit 51 to the conveyance control line 41.

If it is determined in Step S234 that the printing paper 201 is being conveyed, the process in the flowchart of FIG. 25 is skipped, and it waits for printing based on printing image data whose transmission ends in Step S231. If the conveyance speed becomes a predetermined speed, as in SEQ117 of FIG. 10, for example, the conveyance control unit 51 transmits a printing enabled state report to the printer controller 14'. If the printing enabled state report is received, as in Step S240 of the flowchart of FIG. 26, the printer controller 14' instructs the data transfer control units 30a to 30d of the stations $16_1$ to $16_4$ to perform printing based on printing image data in the printing standby state.

If it is determined in Step S234 that the printing paper 201 is not being conveyed, the printer controller 14' progresses the process to Step S235 and instructs the conveyance control unit 51 to start conveyance. At this time, the printer controller 14' sets the conveyance speed $V_m$ set in Step S203, S205, S207, or Step S208 of the flowchart of FIG. 23 for the conveyance control unit 51. The conveyance control unit 51 increases or reduces the conveyance speed such that the conveyance speed becomes the set conveyance speed $V_m$.

Second Embodiment

Next, a second embodiment will be described. The second embodiment is an example where, in the foregoing first embodiment, printing image data is transmitted from the upper level device 10 to the printer device 13 by bitmap data having different sizes for the colors C, M, Y, and K. Hereinafter, description will be provided focusing on portions different from the foregoing first embodiment. Hereinafter, description will be provided as to a case where the printer device 13 includes one station 16.

Figure 27A:
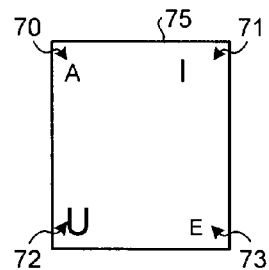
FIGS. 27A to 27C are schematic diagrams for explaining an example of a case where bitmap data having a different size for each color is transmitted.

An example of the case where the bitmap data having the different size for each of the colors is transmitted will be described using FIGS. 27A to 27C. For example, as illustrated in FIG. 27A, the case where an image 70 printed using the color C, an image 71 printed using the color M, an image 72 printed using the color Y, and an image 73 printed using the color K are disposed in a printing area 75 of one page is considered. The sizes of the images 70 to 73 are different from each other.

In this case, print image data of a minimum rectangular area including the image 70 is generated as the print image data of the color C at the side of the upper level device 10 and is transmitted to the data transfer control unit 30a. Similar to the color C, with respect to the other colors M, Y, and K, print image data of a minimum rectangular area including the images 71, 72, and 73 is generated at the side of the upper level device 10 and is transmitted to each of the data transfer control units 30b, 30c, and 30d. Thereby, the data transfer amount can be reduced, as compared with the case where print image data of one page is transmitted for each color.

In this case, a first method that performs arrangement of each print image data of the minimum rectangular area including the images 70 to 73 of the individual colors with respect to the predetermined position on the memories 31a to 31d and a second method that performs arrangement of each print image data to the predetermined position when printing is performed are used. Hereinafter, "each print image data of the minimum rectangular area including the images 70 to 73 of the individual colors" is described as "print image data of the images 70 to 73 of the individual colors".

Figure 27B:
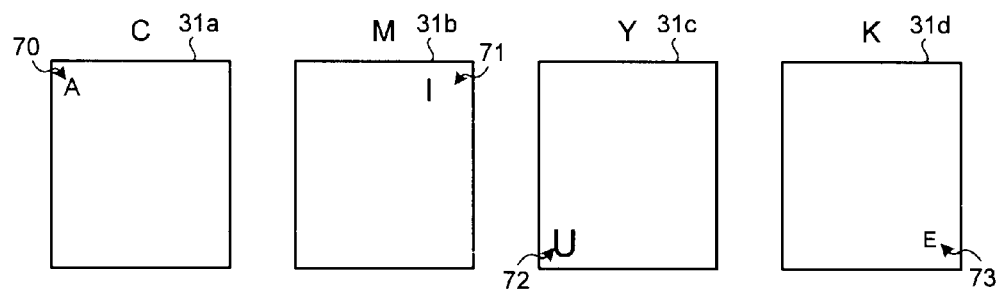

As illustrated in FIG. 27B, the first method writes the print image data of the images 70 to 73 in the addresses of the memories 31a to 31d corresponding to the printing positions of the images 70 to 73. In order to simplify the description, only a storage area of one page in the memories 31a to 31d is illustrated in FIG. 27B. According to the first method, since the area of one page is common in the memories 31a to 31d, the first virtual memory 60 that is common to the memories 31a to 31d may be prepared at the side of the printer controller 14.

In the first method, with respect to the transfer management table, address information of when the print image data of the images 70 to 73 is written in the memories 31a to 31d is described. As described above, in the memories 31a to 31d, an area where printing ends is cleared after printing of one page of each color ends and the output pointer is updated. For this reason, the data transfer control units 30a to 30d may overwrite the print image data of the images 70 to 73 with respect to the designated addresses of the memories 31a to 31d.

Figure 27C:
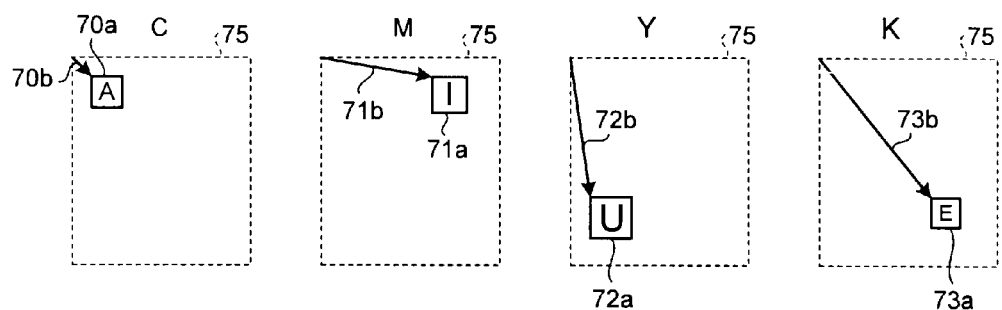

As illustrated in FIG. 27C, the second method writes the print image data of the images 70 to 73 in the memories 31a to 31d. In addition, the print image data of the images 70 to 73 that are read from the memories 31a to 31d are printed with respect to the predetermined arrangement positions of the images 70 to 73. According to the second method, the consumption amount per page in the memories 31a to 31d can be reduced.

According to the second method, there is a possibility that printing image data of images 70 to 73 is different in size. For this reason, it is necessary to describe transmission information and printing information of each color in the transmission management table. In this case, for example, in an address map 60a shown in FIG. 13B, it is considered that an input pointer (IN), an output pointer (OUT), and a write address (write) is provided in each of the memories 31a to 31d as ($IN_a$,$OUT_a$,$write_a$), ($IN_b$,$OUT_b$,$write_b$), . . . . Simultaneously, the transmission information and printing information of each color should be described in the transmission management table.

The second method will be specifically described with reference to FIG. 27C. For example, with regard to an image 70 of the color C, printing image data 70a of the minimum rectangular area including the image 70 is printed at a position represented by a printing address 70b of a printing area 75. Similarly, with regard to images 71, 72, and 73 of the colors M, Y, and K, printing image data 71a, 72a, and 73a of the minimum rectangular areas including the images 71, 72, and 73 is printed at positions represented by printing addresses 71b, 72b, and 73b of the printing area 75. Thus, as the information of the transmission management table, information representing the printing addresses 71b to 73b should be held along with the data size for printing image data 70a to 73a.

Example of Transmission Management Table of Second Embodiment

FIG. 28 illustrates an example of a transmission management table which is applied to the second embodiment. In the example of FIG. 28, it is assumed that the printer device 13 includes four stations 16. Hereinafter, with regard to the items common to the transmission management table of the first embodiment described with reference to FIG. 21, detailed description will not be provided. Similarly to the transmission management table of the foregoing first embodiment, the transmission management table of the second embodiment includes information common to the colors and information of the individual colors. In the transmission management table of the first embodiment and the transmission management table of the second embodiment, different kinds of information are included in the information common to the colors and the information of the individual colors.

The information common to the colors according to the second embodiment will be described. As illustrated in FIG. 28, in the transmission management table of the second embodiment, the information common to the colors includes PBID, the station number, and the number of pieces of data per page, and also includes a resolution, a gradation, a sheet feed length, a sheet width, and a printing surface as information for printing. Since printing image data to be transmitted is different in size between the colors, the information common to the individual colors does not include the information for data transmission.

The information of the individual colors according to the second embodiment will be described. The information of the individual colors includes a color identifier, information for data transmission, and information for printing. Of the information of the individual colors which is applied to the second embodiment, the information for data transmission includes a need for data transmission, a transmission completion flag, a data transmission source address, a data storage destination address, a single raster data transmission size, an address update value, and the number of updates.

Of these, if the printer controller 14' receives the transmission end notification of printing image data of the corresponding color from the station 16 represented by the station number, the transmission completion flag is turned on. The printer controller 14 can update the input pointer of the corresponding virtual memory 60 for a color with the transmission completion flag ON. Similarly to the transmission management table of the first embodiment described with reference to FIG. 21, it is assumed that the data transmission source address differs depending on the value represented by the station number.

Of the information of the individual colors which is applied to the second embodiment, the information for printing includes a need for printing, upper, lower, left, and right printing prohibited areas, and image information. The image information includes bitmap printing positions X and Y, a Y-direction effective size, and an X-direction effective size. Similarly to the transmission management table of the first embodiment described with reference to FIG. 21, it is assumed that the bitmap printing position Y differs depending on the value represented by the station number.

In the second embodiment, the designation of the addresses to arrange the print image data of the images 70 to 73 on the memories 31a to 31d using the first method or the designation of the printing addresses of the print image data of the images 70 to 73 using the second method can be performed by the bitmap printing positions X and Y described as the print information for each color in the transfer management table.

In the second embodiment, the method of managing the input pointer and the output pointer on the virtual memory 60, the process of when the data is received from the upper level device 10, the process of when the print image data transfer ends, and the process of when print process ends are the same as those of the first embodiment. Therefore, the redundant description will not be repeated.

Other Embodiments

In the foregoing first and second embodiments, the image data I/F 112 of the upper level device 10 corresponds to PCI Express, and the address of the RAM 103 of the upper level device 10 is directly designated on the printer device 13 side, thereby reading data from the RAM 103. That is, in the first and second embodiments, it can be thought that the data transfer control units 30a to 30d on the printer device 13 side take a DMAC (Direct Memory Access Controller) function.

Figure 29:
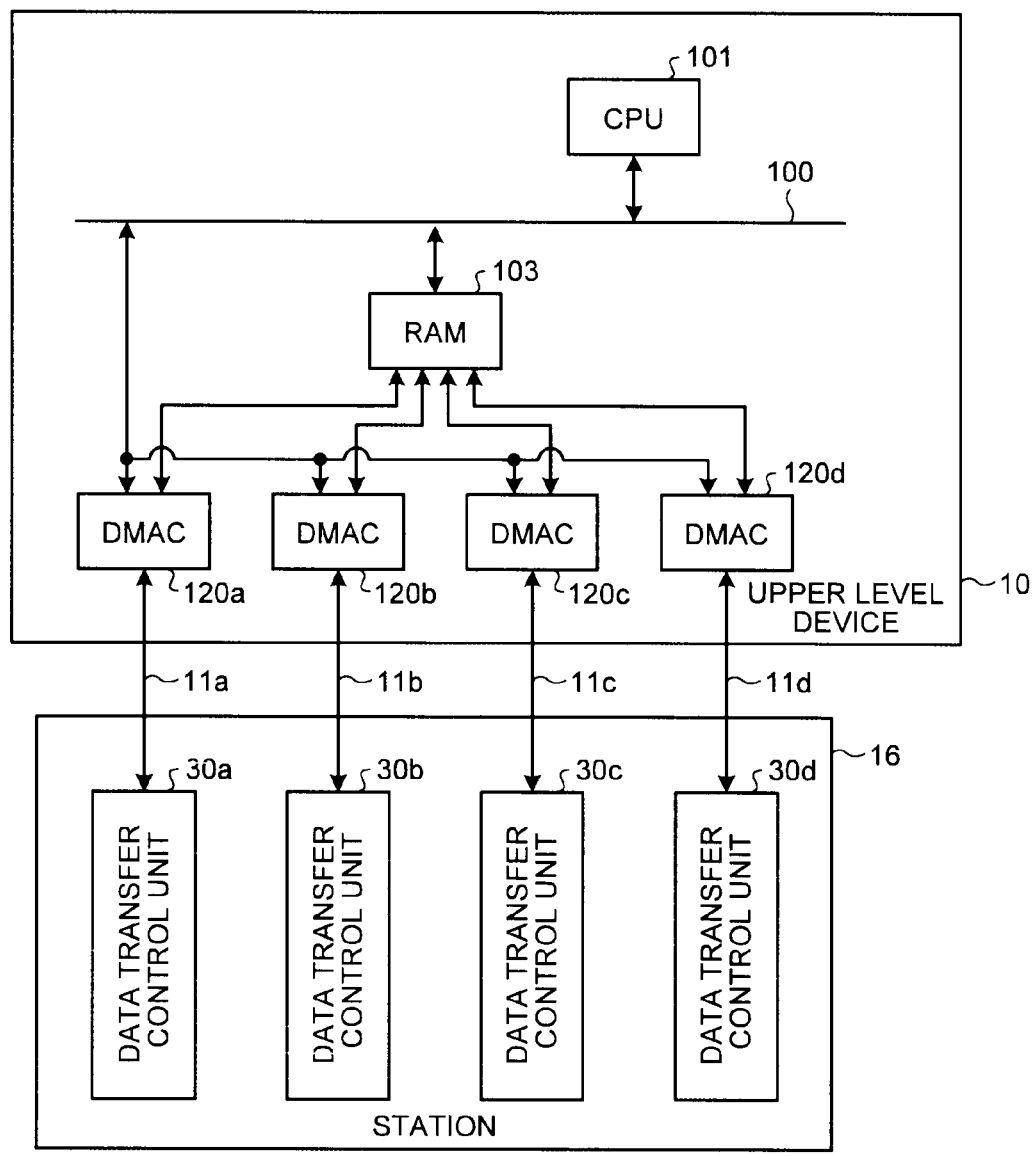
FIG. 29 is a block diagram illustrating an example of an upper level device in which a DMAC is provided.

The invention is not limited to this example, and DMACs may be provided in the upper level device 10 to correspond to the data lines 11a, 11b, 11c, and 11d. That is, as illustrated in FIG. 29, DMACs 120a, 120b, 120c, and 120d are provided in the upper level device 10 to control access to the RAM 103. The data lines 11a, 11b, 11c, and 11d are respectively connected to the DMACs 120a, 120b, 120c, and 120d. The data transfer control units 30a, 30b, 30c, and 30d issue the requests of image data for the upper level device 10 to the DMACs 120a, 120b, 120c, and 120d.

In FIG. 29, only the portions necessary for describing this example are described, and other configuration will not be provided. FIG. 29 illustrates an example where the printer device 13 includes one station 16. When the printer device 13 includes a plurality of stations $16_1$, $16_2$, . . . , DMACs corresponding to the number m of stations should be provided in the upper level device 10.

According to this method, it is not necessary to designate the address of the RAM 103 on the printer device 13 side, making it easy to process the transmission request of image data. Since the address designation of the RAM 103 is not performed on the printer device 13 side, in order to perform a thinning-out process in a line unit, the DMACs 120a, 120b, 120c, and 120d should have the transmission management tables. For this reason, it is disadvantageous in that the upper level device 10 should be conscious of the number m of stations of the printer device 13.

Although in the foregoing embodiments, the transmission of image data from the upper level device 10 is performed through thinning-out in a line unit in accordance with the number m of stations in each of a plurality of stations $16_1$, $16_2$, ..., the invention is not limited to this example.

For example, it is considered that one page is segmented into blocks in accordance with the number m of stations, and the transmission of image data to the stations $16_1$, $16_2$, ... is performed in terms of blocks. A method of segmenting one page is executed in various ways, such as the sheet width direction, the sheet conveying direction, and a matrix. It may be considered that page sorting is done for the stations $16_1$, $16_2$, ... such that the first page is allocated to the station $16_1$ and the second page is allocated to the station $16_2$.

Although in the above description, printing of the colors C, M, Y, and K is performed in the stations $16_1$, $16_2$, ..., the invention is not limited to this example. That is, each of the stations $16_1$, $16_2$, ... performs monochrome printing such that only the color C is printed in the station $16_1$ and only the color M is printed in the station $16_2$.

It is also considered that any method of the above-described line thinning-out, block segmentation, page sorting, and monochrome printing in each station 16 may be used together.

In the first embodiment and the second embodiment described above, the colors that are used for printing are the process colors of the colors C, M, Y, and K. However, the present invention is not limited to this. For example, even when colors of red (R), green (G), and blue (B) or special colors such as a gold color, a silver color, and a white color are used for printing, the first embodiment and the second embodiment can be applied as they are. Further, the number of colors is not limited to four. Even when printing is performed using five or more colors, or three or less colors, the first embodiment and the second embodiment can be applied as they are.

According to the invention, it is possible to achieve the effect of easily expanding the hardware configuration of a printing device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A printing device comprising:
   at least one station that includes
   a printing unit that prints image data of a plurality of colors generated by an upper level device on a printing medium, and
   a plurality of holding units that receive and hold the image data of the plurality of colors transmitted from the upper level device through a plurality of first transmission paths respectively corresponding to the image data of the plurality of colors; and
   a transmission control unit that exchanges one or more control signals directly with the plurality of holding units to control the plurality of holding units to receive printing information from the upper level device through a second transmission path, and to control, on the basis of the printing information, the plurality of holding units to respectively receive and hold the image data of the plurality of colors transmitted from the upper level device.

2. The printing device according to claim 1,
wherein the station further includes an identification information output unit that outputs identification information configured to identify the station itself,
the printing device further includes a determination unit that acquires the identification information output from the identification information output unit and determines the number of stations on the basis of the identification information, and
the transmission control unit controls the plurality of holding units to respectively receive partial data of the image data of the plurality of colors obtained by dividing the image data by a division number in accordance with the number of stations in units of raster.

3. The printing device according to claim 1,
wherein the station further includes an identification information output unit that outputs identification information configured to identify the station itself,
the printing device further includes a determination unit that acquires the identification information output from the identification information output unit and determines the number of stations on the basis of the identification information, and
the transmission control unit controls the plurality of holding units to respectively receive partial data of the image data of the plurality of colors of one page segmented into the number of blocks in accordance with the number of stations.

4. The printing device according to claim 1,
wherein the station further includes an identification information output unit that outputs identification information configured to identify the station itself,
the printing device further includes a determination unit that acquires the identification information output from the identification information output unit and determines the number of stations on the basis of the identification information, and
the transmission control unit controls the plurality of holding units to respectively receive partial data of the image data of the plurality of colors of multiple pages obtained by dividing the image data by a division number in accordance with the number of stations in units of page.

5. The printing device according to claim 1,
wherein the station further includes an identification information output unit that outputs identification information configured to identify the station itself,
the printing device further includes a determination unit that acquires the identification information output from the identification information output unit and determines the number of stations on the basis of the identification information,
wherein the determination unit further determines a position of the station from among the stations on the basis of the identification information, and
the transmission control unit controls the plurality of holding units to respectively receive, according to the position, partial data of the image data of the plurality of colors obtained by dividing the image data by a division number in accordance with the number of stations.

6. A method of controlling a printing device, the method comprising:
　　causing a printing unit of a station to print image data of a plurality of colors generated by an upper level device on a printing medium;
　　causing a plurality of holding units of the station to hold image data of the plurality of colors transmitted from the upper level device through a plurality of first transmission paths respectively corresponding to the image data of the plurality of colors; and
　　causing a transmission control unit to exchange one or more control signals directly with the plurality of holding units to control the plurality of holding units to receive printing information from the upper level device through a second transmission path, and to control, on the basis of the printing information, the plurality of holding units to respectively receive and hold image data of the plurality of colors transmitted from the upper level device.

7. A printing device comprising:
at least one station that includes
　　a printing unit that prints image data of a plurality of colors generated by an upper level device on a printing medium,
　　a plurality of holding units that receive and hold the image data of the plurality of colors transmitted from the upper level device through a plurality of first transmission paths respectively corresponding to the image data of the plurality of colors, and
　　an identification information output unit that outputs identification information configured to identify the station itself;
a determination unit that acquires the identification information output from the identification information output unit and determines the number of stations on the basis of the identification information; and
a transmission control unit that controls the plurality of holding units to receive printing information from the upper level device through a second transmission path, and controls, on the basis of the printing information, the plurality of holding units to respectively receive and hold the image data of the plurality of colors transmitted from the upper level device, and
the transmission control unit controls the plurality of holding units to respectively receive partial data of the image data of the plurality of colors obtained by dividing the image data by a division number in accordance with the number of stations in units of raster.

* * * * *